United States Patent

Inoue et al.

[11] Patent Number: 6,144,623
[45] Date of Patent: Nov. 7, 2000

[54] OPTICAL PICKUP APPARATUS AND OPTICAL RECORDING MEDIUM DRIVE EMPLOYING THE SAME

[75] Inventors: Yasuaki Inoue, Nagaokakyo; Takenori Goto, Moriguchi; Atsushi Tajiri, Mishima-gun; Kazushi Mori, Hirakata; Minoru Sawada, Yawata; Akira Ibaraki; Masayuki Shono, both of Hirakata, all of Japan

[73] Assignee: Sanyo Electric Co., Ltd., Osaka, Japan

[21] Appl. No.: 09/014,980

[22] Filed: Jan. 28, 1998

[30] Foreign Application Priority Data

Feb. 24, 1997 [JP] Japan .................................... 9-039594
Feb. 24, 1997 [JP] Japan .................................... 9-039597

[51] Int. Cl.⁷ ........................................................ G11B 7/00
[52] U.S. Cl. ........................ 369/44.23; 369/109; 369/112
[58] Field of Search .............................. 369/44.23, 44.24, 369/47.37, 44.41, 103, 109, 112

[56] References Cited

U.S. PATENT DOCUMENTS

| | | | |
|---|---|---|---|
| 4,817,074 | 3/1989 | Yamanaka | .................................. 369/46 |
| 4,945,529 | 7/1990 | Ono et al. | ............................... 369/109 |
| 5,065,380 | 11/1991 | Yokota | .................................. 369/44.12 |
| 5,737,296 | 4/1998 | Komma et al. | ...................... 369/109 X |

*Primary Examiner*—Paul W. Huber
*Attorney, Agent, or Firm*—Armstrong, Westerman, Hattori, McLeland & Naughton

[57] ABSTRACT

A transmission-type holographic optical element has a four-segment holographic surface divided into four regions of equal areas by virtual dividing lines which are perpendicular to each other. The first dividing line is at an angle with respect to the track direction of an optical disk and the second dividing line is at an angle with respect to the radial direction of the optical disk before tracking phase adjustment. The first dividing line coincides with the track direction of the optical disk and the second dividing line coincides with the radial direction of the optical disk after tracking phase adjustment. A four-segment photodetection part is divided into four photodetection parts of equal areas by a dividing line substantially parallel to the radial direction of the optical disk and a dividing line perpendicular thereto. Parts of a main beam diffracted in two regions located on first diagonal positions of the four-segment holographic surface are condensed as condensed spots on adjacent positions of the first dividing line of the four-segment photodetection part on opposite sides, and parts of the main beam diffracted in the remaining two regions located on second diagonal positions are condensed as condensed spots on separate positions of the second dividing line of the four-segment photodetection part on opposite sides.

34 Claims, 29 Drawing Sheets

FIG. 2
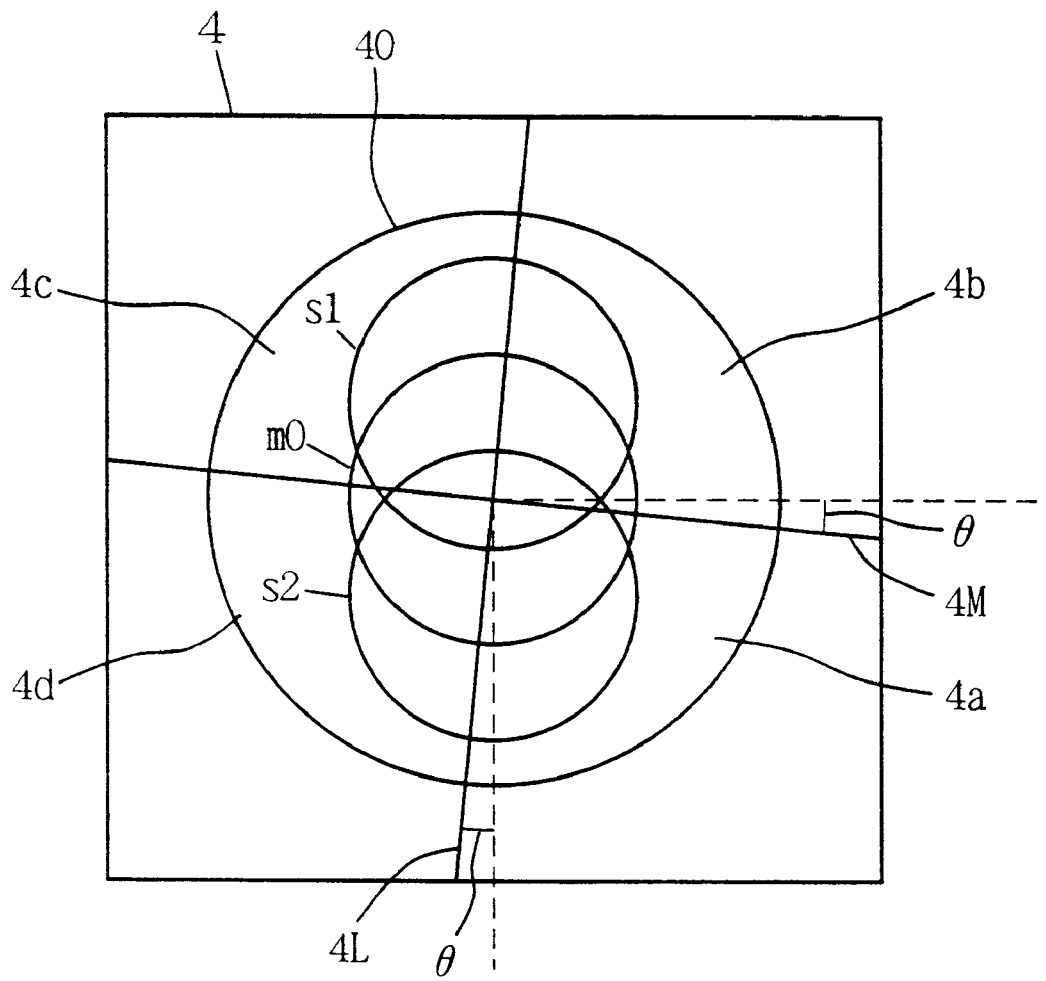
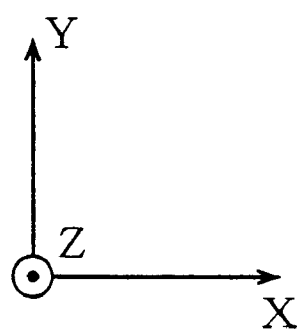

OPTICAL PICKUP APPARATUS AND OPTICAL RECORDING MEDIUM DRIVE EMPLOYING THE SAME

BACKGROUND OF THE INVENTION

1. Field of the Invention

The present invention relates to an optical pickup apparatus and an optical recording medium drive employing the same.

2. Description of the Prior Art

An optical pickup apparatus employed in an optical recording medium drive such as an optical disk drive records or reads information in or from an optical recording medium such as an optical disk or detects a servo signal with a laser beam.

Following recent requirement for miniaturization, weight reduction and cost reduction in relation to an optical pickup apparatus, research and development are made on an optical pickup apparatus employing a transmission-type holographic optical element, which is a kind of diffraction grating.

FIG. 25 schematically illustrates an optical pickup apparatus having a transmission-type holographic optical element, which is disclosed in Japanese Patent Laying-Open No. 3-76035 (1991). This optical pickup apparatus performs focus servo control with the astigmatic method and tracking servo control with the three-beam method.

Referring to FIG. 25, symbols X, Y and Z denote the radial direction of an optical disk 101, the track direction of the optical disk 101 and a direction perpendicular to the disk plane of the optical disk 101 respectively.

A semiconductor laser device 102 emits a laser beam (beam) in the direction Z. The beam emitted from the semiconductor laser device 102 is divided into a 0th order diffracted beam (main beam), a +1st order diffracted beam (subbeam) and a −1st order beam (subbeam) by a diffraction grating 103 in a plane substantially including the directions Y and Z, and transmitted through a transmission-type holographic optical element 104.

A objective lens 105 condenses the three beams transmitted through the transmission-type holographic optical element 104 on the optical disk 101 as a main spot M0 and subspots S1 and S2 positioned on both sides thereof. This objective lens 105 is supported to be movable in the direction X for a tracking operation as shown by arrow U, and movable in the direction Z for a focus operation.

The transmission-type holographic 104 diffracts the three returned beams (reflected beams) from the optical disk 101 in a plane substantially including the directions X and Z, so that a photodetector 106 detects these beams. The transmission-type holographic optical element 104 has a holographic surface 140 of an asymmetrical pattern as shown in FIG. 26, for supplying the three returned beams from the optical disk 101 with astigmatism respectively.

FIG. 27 illustrates the main spot M0 and the subspots S1 and S2 formed on the optical disk 101. As shown in FIG. 27, the optical system of the optical pickup apparatus is so adjusted that the main spot M0 scans a track TR to be reproduced and the subspots S1 and S2 scan parts located on both sides of the main spot M0 slightly over the track TR.

FIG. 28 is a typical plan view showing an exemplary structure of the photodetector 106. This photodetector 106 includes a four-segment photodetection part 160 provided on the central portion for performing focus servo control with the astigmatic method and photodetection parts E and F provided on both sides of the four-segment photodetection part 160 for performing tracking servo control with the three beam method. The returned beam (main beam) corresponding to the main spot M0 is incident on the central part of the four-segment photodetection part 160, while the returned beams (subbeams) corresponding to the subspots S1 and S2 are incident on the photodetection parts E and F respectively.

When the position of the optical disk 101 in the direction Z changes, the focal points of the returned beams change to change the shape of a light spot on the four-segment photodetection part 160 of the photodetector 106 as shown in FIG. 29. If the optical disk 101 is too close to the objective lens 105, the condensed spot S has an elliptic shape connecting the centers of photodetection parts B and D with each other along its major axis as shown in FIG. 29(a). If the optical disk 101 is on the focal (focused) position of the objective lens 105, the condensed spot S has a circular shape at the center of the photodetection part 160 as shown in FIG. 29(b). If the optical disk 101 is too far from the objective lens 105, the 10 condensed spot S has an elliptic shape connecting the centers of the photodetection parts A and C with each other along its major axis as shown in FIG. 29(c).

With output signals PA, PB, PC and PD from the photodetection parts A, B, C and D of the four-segment photodetection part 160, a focus error signal FES is obtained as follows:

$$FES=(PA+PC)-(PB+PD)$$

The above focus error signal FES becomes negative if the optical disk 101 is too close to the objective lens 105, becomes zero if the optical disk 101 is in an excellent focused state, and becomes positive if the optical disk 101 is too far from the objective lens 105.

When the main spot M0 excellently scans the track TR of the optical disk 101 to be reproduced, the two subbeams incident on the photodetection parts E and F are equal in intensity to each other. When the main spot M0 deviates to either side of the track TR to be reproduced, on the other hand, the intensity of either subbeam increases. With output signals PE and PF from the photodetection parts E and F, therefore, the following tracking error signal TES is obtained:

$$TES=PE-PF$$

FIG. 30 illustrates variation of the focus error signal FES with the position of the optical disk 101 in the direction Z. The variation of the focus error signal FES shown in FIG. 30 is called an S-curve characteristic. According to the astigmatism method, the amplitude of the S-curve characteristic can be increased with no loss in operation for obtaining an ideal S curve. Therefore, the astigmatism method is most widely employed in the optical pickup apparatuses which are put into practice at present.

The lasing wavelength of the semiconductor laser device 102 fluctuates depending on the environmental temperature. The diffraction angles of the returned beams on the transmission-type holographic optical element 104 change due to such fluctuation of the lasing wavelength.

In order to prevent fluctuation of the focus error signal FES resulting from the fluctuation of the lasing wavelength, the four-segment photodetection part 160 of the photodetector 106 is divided along a dividing line LX substantially along the moving direction of the diffracted beams on the holographic optical element 104.

Even if the photodetector 106 is arranged in consideration of wavelength fluctuation as hereinabove described, however, the condensed spot S of the diffracted beams deviates from the intersection between the dividing lines LX and LY following increase of wavelength fluctuation, and hence no correct focus error signal FES can be obtained in this case.

If the optical disk 101 is too close to the objective lens 105 and the lasing wavelength of the semiconductor laser device 102 increases, for example, the condensed spot S on the four-segment photodetection part 160 moves in the same direction (direction X) as the diffractive direction as shown by solid lines in FIG. 31. Consequently, the output signal PA from the photodetection part A increases to reduce the value of the focus error signal FES. Thus, the amplitude of the S-curve characteristic reduces to lower the detection accuracy for the focused state, as shown in FIG. 32.

In order to solve this problem, the inventors have employed a three-segment photodetection part 206 for focus servo control, which is divided by parallel dividing lines as shown in FIG. 33 in place of the aforementioned four-segment photodetection part 160 divided by the perpendicular dividing lines LX and LY, as a photodetection part for focus servo control.

With output signals $S_a$, $S_b$ and $S_c$ from photodetection parts 206a, 206b and 206c, the following focus error signal FES is obtained:

$$FES=(S_a+S_c)-S_b$$

In order to improve the S-curve characteristic indicating the amount of movement of the objective lens 105 in the optical axis direction and the intensity of the focus error signal FES, the apparatus must be so set that the condensed spot S of the diffracted beams uniformly spreads over the photodetection parts 206a and 206c. In case of employing the aforementioned photodetection part 206, however, it is difficult to adjust the apparatus so that the condensed spot S of the diffracted beams uniformly spreads over the photodetection parts 206a and 206c.

The inventor has further prepared an optical pickup apparatus shown in FIG. 34 and made experiments.

Referring to FIG. 34, a semiconductor laser device 302 emits a laser beam (beam) in a direction Z. A diffraction grating 303 divides the beam emitted from the semiconductor laser device 302 into three beams (a main beam and a pair of subbeams positioned on both sides thereof) in a plane substantially including directions Y and Z, and a transmission-type holographic optical element 304 transmits these beams. A objective lens 305 condenses the three beams transmitted through the transmission-type holographic optical element 304 on an optical disk 301 as a main spot and subspots positioned on both sides thereof.

The transmission-type holographic optical element 304 diffracts three returned beams (reflected beams) from the optical disk 301 in a plane substantially including the directions X and Z, so that a photodetector 306 detects these beams. The transmission-type holographic optical element 304 transmits the three beams, divides each of the three returned beams (reflected beams) from the optical disk 301 into two beams and diffracts the same, and supplies the divided beams with astigmatism corresponding to the focused state.

As shown in FIG. 35, the holographic optical element 304 has regions 304a and 340b divided by a dividing line 304L extending substantially along the track direction. FIG. 35 typically illustrates light spots m, $s_1$ and $s_2$ formed by the three beams M, $S_1$ and $S_2$ respectively.

As shown in FIG. 36, the photodetector 306 has a photodetection part 306a formed by photodetection parts 316a, 316b and 316c for detecting parts of the returned beam related to the main beam diffracted in the region 304a, a photodetector 306b formed by photodetection parts 316d, 316e and 316f for detecting parts of the returned beam related to the main beam diffracted in the region 304b, a photodetection part 306c for detecting parts of the returned beam related to the first subbeam diffracted in the regions 304a and 304b, and a photodetection part 306d for detecting parts of the returned beam related to the second subbeam diffracted in the regions 304a and 304b respectively.

On the basis of output signals $S_a$, $S_b$, $S_c$, $S_d$, $S_e$ and $S_f$ obtained from the photodetection parts 316a, 316b, 316c, 316d and 316f respectively and output signals $S_A$ and $S_B$ obtained from the photodetection parts 306c and 306d respectively, a focus error signal FES and a tracking error signal TES are obtained as follows:

$$FES=(S_a+S_c+S_e)-(S_b+S_d+S_f)$$

$$TES=S_A-S_B$$

Even if the condensed spot deviates from the centers of the photodetection parts 306a and 306b, therefore, an operation is made to correct this deviation to obtain a correct focus error signal FES.

When the objective lens 305 is moved in a direction (radial direction of the optical disk 301) substantially perpendicular to the track direction in the optical pickup apparatus employing the two-segment holographic optical element 304 as shown in FIG. 37 for moving the condensed spot on a desired track position, for example, the parts of the returned beams pass through portions of different sizes in the regions 304a and 304b of the holographic optical element 304 as shown in FIG. 38.

Therefore, the detected light quantities of the parts of the returned beam related to the main beam received in the photodetection parts 306a and 306b fluctuate following the radial movement of the objective lens 305. Thus, when the objective lens 305 radially moves by 0 $\mu$m±400 $\mu$m, for example, S-curve characteristics are as shown in FIG. 39 and no correct focus error signal FES can be obtained.

SUMMARY OF THE INVENTION

An object of the present invention is to provide an optical pickup apparatus which can perform desirable focus servo control regardless of movement of a track position or wavelength fluctuation of a light source and an optical recording medium drive employing the same.

Another object of the present invention is to provide an optical pickup apparatus which can correctly detect a focused state on an optical recording medium regardless of movement of a objective lens for a tracking operation and an optical recording medium drive employing the same.

Still another object of the present invention is to provide an optical pickup apparatus which can correctly detect a focused state on an optical recording medium regardless of movement of a objective lens for a tracking operation or change of a diffraction angle of a returned beam resulting from wavelength fluctuation of a light source and an optical recording medium drive employing the same.

A further object of the present invention is to provide an optical pickup apparatus which can correctly detect a focused state on an optical recording medium regardless of change of a diffraction angle of a returned beam resulting from wavelength fluctuation of a light source and an optical recording medium employing the same.

A further object of the present invention is to provide a holographic optical element which can correctly detect a focused state on an optical recording medium regardless of change of a diffraction angle of a returned beam resulting from wavelength fluctuation of a light source.

The optical pickup apparatus according to the present invention, which is adapted to irradiate an optical recording medium with a beam for detecting a returned beam from the optical recording medium, comprises a light source for emitting the beam, a objective lens for irradiating the optical recording medium with the beam emitted from the light source, a first diffraction element for diffracting the returned beam supplied from the optical recording medium through the objective lens, and a photodetector having first and second photodetection parts for detecting the returned beam diffracted by the first diffraction element. The first diffraction element has four regions divided by a first dividing line extending substantially along a radial direction of the optical recording medium and a second dividing line perpendicular to the first dividing line, the objective lens is provided to be movable substantially along the radial direction of the optical recording medium for a tracking operation, the first photodetection part of the photodetector detects parts of the returned beam diffracted in two of the four regions of the first diffraction element located on first diagonal positions, the second photodetection part detects parts of the returned beam diffracted in the remaining two of the four regions of the first diffraction element located on second diagonal positions, and each of the first and second photodetection parts has a length not shorter than the distance of movement of a condensed spot of the diffracted returned beam resulting from wavelength fluctuation of the light source in the direction of the movement.

In the optical pickup apparatus according to the present invention, the first photodetection part detects the parts of the returned beam diffracted in the two of the four regions of the first diffraction element located on the first diagonal positions, while the second photodetection part detects the parts of the returned beam diffracted in the remaining two of the four regions of the first diffraction element located on the second diagonal positions. Therefore, a focus error signal can be obtained by comparing the areas of the parts of the returned beam received in the first and second photodetection parts with each other.

Further, the first diffraction element has the four regions divided by the first dividing line extending substantially along the radial direction of the optical recording medium and the second dividing line perpendicular to the first dividing line, while the objective lens is provided to move substantially along the radial direction of the optical recording medium for the tracking operation. Even if the position of the returned beam on the first diffraction element changes due to the tracking operation of the objective lens, therefore, the areas of the parts of the returned beam incident on the two regions located on the first diagonal positions of the first diffraction element and the remaining two regions located on the second diagonal positions of the first diffraction element substantially remain unchanged. Thus, deterioration of the focus error signal following movement of the objective lens in the tracking operation is suppressed.

In addition, each of the first and second photodetection parts for detecting a focused state has the length equal to or longer than the distance of movement of the condensed spot of the diffracted returned beam resulting from wavelength fluctuation of the light source in the direction of the movement for positioning the moving condensed spot in the photodetection part, whereby the light quantity of the part of the returned beam detected in each photodetection part of the photodetector remains unchanged regardless of wavelength fluctuation of the light source. Thus, deterioration of the focus error signal resulting from wavelength fluctuation of the light source is suppressed.

Consequently, the optical pickup apparatus is improved in focus and beam characteristics.

The two regions on the first diagonal positions of the first diffraction element and the remaining two regions on the second diagonal positions may supply the parts of the returned beam with spatial variation corresponding to the focused state, so that the focused state can be detected by comparing the parts of the returned beam diffracted in the two regions located on the first diagonal positions with those diffracted in the remaining two regions located on the second diagonal positions.

In this case, the first photodetection part of the photodetector detects the parts of the returned beam diffracted and supplied with the spatial variation corresponding to the focused state in the two of the four regions of the first diffraction element located on the first diagonal positions, and the second photodetection part of the photodetector detects the parts of the returned beam diffracted and supplied with the spatial variation corresponding to the focused state in the remaining two regions located on the second diagonal positions.

Also when the objective lens moves along the radial direction of the optical recording medium for the tracking operation, therefore, the total area of the parts of the returned beam incident on the two regions located on the first diagonal positions of the first diffraction element and that of the parts of the returned beam incident on the remaining two regions located on the second diagonal positions remain unchanged, while the total of the light quantities in the first photodetection part and that of the light quantities in the second photodetection part also remain unchanged. Thus, the focused state on the optical recording medium can be correctly detected also in the tracking operation.

The light source is preferably a semiconductor laser. Among the four regions of the first diffraction element, the two regions located on the first diagonal positions and the remaining two regions located on the second diagonal positions preferably supply the parts of the returned beam diffracted therein with reciprocal spatial variation.

Each of the first and second photodetection parts may include a plurality of photoreceiving regions divided by a virtual dividing line which is substantially along the direction of movement of the condensed spot of the diffracted returned beam resulting from wavelength fluctuation of the light source.

The plurality of photoreceiving regions may include a first photoreceiving region and two second photoreceiving regions, wider than the first photoreceiving region, which are arranged on both sides of the first photoreceiving region.

In this case, the optical system can be relatively readily set so that opposite points of two condensed spots based on the parts of the returned beam diffracted in the regions on the diagonal positions of the first diffraction element are positioned in the narrower photoreceiving regions. Output signals obtained from the wider photoreceiving regions can be added up with each other in the first and second photodetection parts respectively, for comparing the received areas of the parts of the returned beam diffracted in the two regions on the first diagonal positions and those of the parts of the returned beam diffracted in the remaining two regions on the second diagonal positions on the basis of the difference between the results of the addition.

Further, the output signals obtained from the respective narrower photoreceiving regions can be utilized for obtaining a reproduction signal. Namely, the sum of the output signals from the narrower photoreceiving regions of the first and second photodetection parts and the wider photoreceiving regions located on both sides thereof is obtained, thereby increasing the intensity of the reproduction signal. Consequently, an excellent reproduction signal is obtained.

A light spot formed on the first diffraction element by the returned beam from the optical recording medium may have a substantially symmetrical shape about the first dividing line.

In this case, the areas of the parts of the returned beam incident on the two regions on the first diagonal positions of the first diffraction element are further equalized with those of the parts of the returned beam incident on the remaining two regions on the second diagonal positions regardless of movement of the objective lens for the tracking operation, whereby deterioration of the focus error signal resulting from the movement of the objective lens is further suppressed.

The radial direction of the optical recording medium may be substantially parallel to the direction of movement of the condensed spot resulting from wavelength fluctuation of the light source.

In this case, the first photodetection part of the photodetector can detect the parts of the returned beam diffracted in the two regions on the first diagonal positions and the second photodetection part can detect those of the returned beam diffracted in the remaining two regions on the second diagonal positions while holding the ratio of the areas of the parts incident on the former to those of the parts incident on the latter, whereby deterioration of the focus error signal is further suppressed.

The radial direction of the optical recording medium may be substantially perpendicular to the direction of movement of the condensed spot resulting from wavelength fluctuation of the light source.

In this case, the first photodetection part of the photodetector can detect the parts of the returned beam diffracted in the two regions on the first diagonal positions and the second photodetection part can detect those of the returned beam diffracted in the remaining two regions on the second diagonal positions while holding the ratio of the areas of the parts incident on the former to those of the parts incident on the latter, whereby deterioration of the focus error signal is further suppressed.

When the first and second photodetection parts of the photodetector align with each other substantially along the direction perpendicular to the direction of movement of the condensed spot resulting from wavelength fluctuation of the light source, optical axis adjustment can be readily performed by rotation of the first diffraction element. In this case, the longitudinal directions of the photoreceiving regions forming the first and second photodetection parts of the photodetector are preferably substantially along the track direction, in consideration of symmetry of the light spot.

The spatial variation may be astigmatism. In this case, focus servo control can be performed with the astigmatism method.

The two regions on the first diagonal positions of the first diffraction element and the remaining two regions on the second diagonal positions may supply the parts of the returned beam diffracted therein with perpendicular astigmatism respectively.

One of the perpendicular directions is preferably substantially parallel to the dividing lines in the first and second photodetection parts of the photodetector. In this case, the difference between the aforementioned received areas increases, whereby an excellent focus error signal can be obtained.

The two regions on the first diagonal positions of the first diffraction element and the remaining two regions on the second diagonal positions may supply the parts of the returned beam with spatial variation so that focal positions of the parts of the returned beam diffracted in the former and those of the parts of the returned beam diffracted in the latter are located on different heights in focusing respectively.

In this case, the sizes of condensed spots formed by the parts of the returned beam differ from each other in the first and second photodetection parts of the photodetector in response to the focused state, whereby focus servo control can be performed.

In focusing, the focal positions of the parts of the returned beam diffracted in the two regions on the first diagonal positions of the first diffraction element are located in front of the photoreceiving surface of the photodetector, while those of the parts of the returned beam diffracted in the remaining two regions of the second diagonal positions of the first diffraction element are positioned at the back of the photoreceiving surface of the photodetector.

In this case, the apparatus can be so set that the sizes of the condensed spots formed by the parts of the returned beam change to be reverse to each other in the first and second photodetection parts of the photodetector in response to the focused state and the sizes of the condensed spots formed by the parts of the returned beam are substantially identical to each other in the first and second photodetection parts in the focused state, whereby focus servo control can be readily performed.

The optical pickup apparatus may further comprise a second diffraction element provided in the optical path between the light source and the first diffraction element for dividing the beam emitted from the light source into a main beam and a subbeam for detecting the tracking state, so that the objective lens irradiates the optical recording medium with the main beam and the subbeam divided by the second diffraction element, the first diffraction element diffracts the main beam and the subbeam supplied from the optical recording medium through the objective lens, the first photodetection part of the photodetector detects parts of the main beam diffracted in the two regions on the first diagonal positions of the first diffraction element, the second photodetector detects parts of the main beam diffracted in the remaining two regions on the second diagonal positions of the first diffraction element, the photodetector includes a third photodetection part for detecting the parts of the subbeam diffracted in the two regions on the first diagonal positions of the first diffraction element and those of the subbeam diffracted in the remaining two regions on the second diagonal positions of the first diffraction element, and the third photodetection part has a length not shorter than the distance of movement of a condensed spot of the diffracted subbeam in the direction of movement of the condensed spot resulting from wavelength fluctuation of the light source.

In this case, tracking servo control can be performed with the three-beam method while preventing deterioration of the focus error signal caused by movement of the objective lens resulting from wavelength fluctuation of the light source or the tracking operation.

The first dividing line of the first diffraction element may be provided to form a prescribed angle with respect to a plane including the optical axes of the main beam and the subbeam divided by the second diffraction element.

In this case, the first dividing line of the first diffraction element is parallel to the direction of movement of the objective lens while the main beam and the subbeam divided by the second diffraction element enter positional relation allowing detection of the tracking state with respect to the track of the optical recording medium. Thus, the tracking state and the focused state can be correctly detected.

The second and first diffraction elements may be provided to be rotatable about prescribed axes so that the positional relation between the main beam and the subbeam with respect to the track of the optical recording medium allows detection of the tracking state, and the first dividing line of the first diffraction element may be provided to form a prescribed angle with respect to the plane including the optical axes of the main beam and the subbeam before adjustment of the positional relation, to be parallel to the direction of movement of the objective lens after adjustment of the positional relation.

After adjusting the positional relation of the main beam and the subbeam with respect to the track of the optical recording medium to allow detection of the tracking state by rotating the second and first diffraction elements about the prescribed axes, the first dividing line of the first diffraction element becomes parallel to the direction of movement of the objective lens. After adjustment of the positional relation, therefore, the focused state on the optical recording medium can be correctly detected regardless of movement of the objective lens in the radial direction of the optical recording medium for the tracking operation.

Diffraction grooves of the second diffraction element may be provided to form a prescribed angle with respect to a tangential direction of the track so that the positional relation of the main beam and the subbeam with respect to the track of the optical recording medium allows detection of the tracking state.

In this case, the positional relation of the main beam and the subbeam with respect to the track of the optical recording medium allows detection of the tracking state and the first dividing line of the first diffraction element becomes parallel to the direction of movement of the objective lens without rotating the second and first diffraction elements about the prescribed axes. Therefore, the focused state on the optical recording medium can be correctly detected regardless of movement of the objective lens along the radial direction of the optical recording medium for the tracking operation.

The subbeam may include two subbeams positioned on both sides of the main beam, and the third photodetection part of the photodetector may include two third photodetection parts arranged to hold the first and second photodetection parts therebetween for detecting the two subbeams respectively.

The two regions on the first diagonal positions of the first diffraction element may have diffraction surface patterns for diffracting the parts of the returned beam so that two condensed spots formed on the first photodetection part of the photodetector align with each other substantially along the direction perpendicular to the direction of movement resulting from wavelength fluctuation of the light source, and the remaining two regions on the second diagonal positions of the first diffraction element may have diffraction surface patterns for diffracting the parts of the returned beam so that two condensed spots formed on the second photodetection part of the photodetector align with each other substantially along the direction perpendicular to the direction of movement resulting from wavelength fluctuation of the light source.

An optical recording medium drive for driving an optical recording medium according to another aspect of the present invention comprises a rotation driving mechanism for rotating the optical recording medium, an optical pickup apparatus for irradiating the optical recording medium with a beam, a pickup driving mechanism for moving the optical pickup apparatus in the radial direction of the optical recording medium, and a signal processing circuit for processing an output signal from the optical pickup apparatus. The optical pickup apparatus comprises a light source for emitting the beam, a objective lens for irradiating the optical recording medium with the beam emitted from the light source, a first diffraction element for diffracting a returned beam supplied from the optical recording medium through the objective lens, and a photodetector having first and second photodetection parts for detecting the returned beam diffracted by the first diffraction element, and the first diffraction element has four regions divided by a first dividing line extending substantially along the radial direction of the optical recording medium and a second dividing line perpendicular to the first dividing line, the objective lens is provided to be movable substantially along the radial direction of the optical recording medium for a tracking operation, the first photodetection part detects parts of the returned beam diffracted in two of the four regions of the first diffraction element located on first diagonal positions, the second photodetection part detects parts of the returned beam diffracted in the remaining two of the four regions of the first diffraction element located on second diagonal positions, and each of the first and second photodetection parts has a length not shorter than the distance of movement of a condensed spot of the diffracted returned beam resulting from wavelength fluctuation of the light source.

The optical recording medium drive, which employs the aforementioned optical pickup apparatus, can perform preferable focus servo control regardless of movement of a track position or wavelength fluctuation of the light source.

An optical pickup apparatus for irradiating an optical recording medium with a beam and detecting a returned beam from the optical recording medium according to still another aspect of the present invention comprises a light source for emitting the beam, a objective lens for irradiating the optical recording medium with the beam emitted from the light source, a first diffraction element for diffracting the returned beam supplied from the optical recording medium through the objective lens, and a photodetector for receiving the returned beam diffracted by the first diffraction element. The objective lens is provided to be movable along a radial direction of the optical recording medium for a tracking operation, and the first diffraction element has a plurality of regions divided by a first dividing line parallel to the direction of movement of the objective lens.

In the optical pickup apparatus, the first diffraction element is divided into the plurality of regions by the first dividing line parallel to the direction of movement of the objective lens, whereby the area of the returned beam incident on each region of the first diffraction element remains unchanged regardless of movement of the objective lens along the radial direction of the optical recording medium for the tracking operation. Therefore, a focused state on the optical recording medium can be correctly detected also in the tracking operation.

The first diffraction element may have four regions divided by the first dividing line and a second dividing line perpendicular to the first dividing line, and the photodetector may have a plurality of photodetection parts for detecting parts of the returned beam diffracted in the respective regions of the first diffraction element.

In this case, the first diffraction element is divided into the four regions by the first dividing line parallel to the direction of movement of the objective lens and the second dividing line perpendicular to the first dividing line and the photodetector has the plurality of photodetection parts for detecting the parts of the returned beam diffracted in the respective regions of the first diffraction element, whereby the total area of the parts of the returned beam incident on two regions located on first diagonal positions of the first diffraction element and that of the parts of the returned beam incident on the remaining two regions located on second diagonal positions remain unchanged while the total of the light quantities of the parts of the returned beam diffracted in the former and those of the parts of the returned beam diffracted in the latter also remain unchanged regardless of movement of the objective lens along the radial direction of the optical recording medium for the tracking operation. Therefore, the focused state on the optical recording medium can be correctly detected also in the tracking operation.

The optical pickup apparatus may further comprise a second diffraction element provided in the optical path between the light source and the first diffraction element for dividing the beam emitted from the light source into a main beam and a subbeam for detecting a tracking state, so that the objective lens irradiates the optical recording medium with the main beam and the subbeam divided by the second diffraction element, the first diffraction element diffracts the main beam and the subbeam supplied from the optical recording medium through the objective lens, the plurality of photodetection parts of the photodetector detects the main beam diffracted by the first diffraction element, and the photodetector further includes a photodetection part for detecting the subbeam diffracted by the first diffraction element.

The first dividing line of the first diffraction element may be provided to form a prescribed angle with respect to a plane including the optical axes of the main beam and the subbeam divided by the second diffraction element.

In this case, the first dividing line of the first diffraction element becomes parallel to the direction of movement of the objective lens while the positional relation of the main beam and the subbeam divided by the second diffraction element allows detection of the tracking state with respect to the track of the optical recording medium. Thus, the tracking state and the focused state can be correctly detected.

The second and first diffraction elements may be provided to be rotatable about prescribed axes so that the positional relation of the main beam and the subbeam with respect to the track of the optical recording medium allows detection of the tracking state, and the first dividing line of the first diffraction element may be provided to form a prescribed angle with respect to the plane including the optical axes of the main beam and the subbeam before adjustment of the positional relation, to be parallel to the direction of movement of the objective lens after adjustment of the positional relation.

After adjusting the positional relation of the main beam and the subbeam with respect to the track of the optical recording medium to allow detection of the tracking state by rotating the second and first diffraction elements about the prescribed axes, the first dividing line of the first diffraction element becomes parallel to the direction of movement of the objective lens. After adjustment of the positional relation, therefore, the focused state on the optical recording medium can be correctly detected regardless of movement of the objective lens in the radial direction of the optical recording medium for the tracking operation.

Diffraction grooves of the second diffraction element may be provided to form a prescribed angle with respect to a tangential direction of the track so that the positional relation of the main beam and the subbeam with respect to the track of the optical recording medium allows detection of the tracking state.

In this case, the positional relation of the main beam and the subbeam with respect to the track of the optical recording medium allows detection of the tracking state and the first dividing line of the first diffraction element becomes parallel to the direction of movement of the objective lens without rotating the second and first diffraction elements about the prescribed axes. Therefore, the focused state on the optical recording medium can be correctly detected regardless of movement of the objective lens along the radial direction of the optical recording medium for the tracking operation.

An optical recording medium drive for driving an optical recording medium according to a further aspect of the present invention comprises a rotation driving mechanism for rotating the optical recording medium, an optical pickup apparatus for irradiating the optical recording medium with a beam, a pickup driving mechanism for moving the optical pickup apparatus in the radial direction of the optical recording medium, and a signal processing circuit for processing an output signal from the optical pickup apparatus, and the optical pickup apparatus comprises a light source for emitting the beam, a objective lens for irradiating the optical recording medium with the beam emitted from the light source, a first diffraction element for diffracting a returned beam supplied from the optical recording medium through the objective lens, and the photodetector for detecting the returned beam diffracted by the first diffraction element. The objective lens is provided to be movable along a radial direction of the optical recording medium for a tracking operation, and the first diffraction element has a plurality of regions divided by a first dividing line parallel to the direction of movement of the objective lens.

This optical recording medium drive employs the aforementioned optical pickup apparatus, whereby a focused state on the optical recording medium can be correctly detected also in the tracking operation.

An optical pickup apparatus for irradiating an optical recording medium with a beam and detecting a returned beam from the optical recording medium according to a further aspect of the present invention comprises a light source for emitting the beam, a diffraction element for diffracting a returned beam based on the beam emitted from the light source, and a photodetector for detecting the returned beam diffracted by the diffraction element. The diffraction element has four regions divided by perpendicular dividing lines, the photodetector has four photodetection parts divided by a first dividing line substantially parallel to a direction of movement of a condensed spot of the returned beam diffracted by the diffraction element resulting from wavelength fluctuation of the light source and a second dividing line perpendicular to the first dividing line, parts of the returned beam diffracted in two regions located on first diagonal positions of the diffraction element form condensed spots on adjacent positions of the second dividing line on opposite sides with reference to the intersection between the first and second dividing lines of the photodetector respectively, and parts of the returned beam diffracted in the remaining two regions located on second diagonal positions of the diffraction element form condensed spots on separate positions of the first dividing line on opposite sides with reference to the intersection between the first and second dividing lines of the photodetector respectively.

In this optical pickup apparatus, the parts of the returned beam diffracted in the two regions on the first diagonal positions of the diffraction element form the condensed spots on the adjacent positions of the second dividing line on the opposite sides with reference to the intersection between the first and second dividing lines of the photodetector respectively while the parts of the returned beam diffracted in the remaining two regions on the second diagonal positions of the diffraction element form the condensed spots on the separate positions of the first dividing line on the opposite sides with reference to the intersection between the first and second dividing lines of the photodetector respectively.

When the diffraction angle of the returned beam is changed by wavelength fluctuation of the light source, a condensed spot moves along the first dividing line on the photodetector. In this case, the condensed spots formed by the parts of the returned beam from the two regions on the first diagonal positions of the diffraction element move from the second dividing line to either side of the photodetection parts. However, the condensed spots formed by the parts of the returned beam from the remaining two regions on the second diagonal positions, which are formed on the positions of the second dividing line separating from the intersection between the first and second dividing lines before movement, do not move beyond the second dividing line following movement along the first dividing line.

Thus, changes of output signals from the photodetection parts resulting from movement of the condensed spots are suppressed to not more than halves. Thus, the focused state on the optical recording medium can be correctly detected regardless of wavelength fluctuation of the light source.

Further, the amplitude of an S-curve characteristic can be enhanced similarly to the prior art while outputs of four photodetection parts in a focused state are uniformalized, whereby adjustment can be readily performed.

In particular, the two regions on the first diagonal positions of the diffraction element and the remaining two regions on the second diagonal positions may supply the parts of the returned beam with spatial variation corresponding to the focused state so that the focused state on the optical recording medium can be detected by operating the outputs of the four photodetection parts.

In this case, the parts of the returned beam diffracted in the two regions on the first diagonal positions of the diffraction element are supplied with spatial variation corresponding to the focused state to be received in the photodetection parts provided on both sides of the second dividing line of the photodetector while those of the returned beam diffracted in the remaining two regions on the second diagonal positions are supplied with spatial variation corresponding to the focused state to be received in the photodetection parts provided on both sides of the first dividing line of the photodetector.

Thus, the focused state on the optical recording medium can be detected by comparing the output signals from the two photodetection parts located on the first diagonal positions with those from the remaining two photodetection parts on the second diagonal positions.

The spatial variation corresponding to the focused state may be astigmatism. If the optical recording medium enters a defocused state, the shape of the condensed spot formed on the photodetector is flattened to change the output signals from the respective photodetection parts of the photodetector. Therefore, the focused state on the optical recording medium can be detected by comparing the total of the output signals from the two photodetection parts on the first diagonal positions of the photodetector with that of the output signals from the remaining two photodetection parts on the second diagonal positions.

The astigmatism may be supplied in directions of about 45° with respect to the first and second dividing lines of the photodetector. When the optical recording medium enters a defocused state in this case, the condensed spot formed on the photodetector becomes an elliptic shape having a major axis forming an angle of about 45° with respect to the first and second dividing lines.

The four regions of the diffraction element may be formed to share the intersection between the dividing lines of the diffraction element as a common origin, the two regions on the first diagonal positions of the diffraction element may have holographic patterns set with reference to the intersection between the first and second dividing lines of the photodetector, and the remaining two regions on the second diagonal positions of the diffraction element may have holographic patterns set with reference to two points on the first dividing line separating from the intersection between the first and second dividing lines of the photodetector respectively.

In particular, the two regions on the first diagonal positions of the diffraction element may be arranged along a direction substantially parallel to the direction of movement of the condensed spot formed by the returned beam diffracted by the diffraction element resulting from wavelength fluctuation of the light source, and the remaining two regions on the second diagonal positions of the diffraction element may be arranged in a direction substantially parallel to the direction of movement of the condensed spot formed by the returned beam diffracted by the diffraction element resulting from wavelength fluctuation of the light source.

The dividing lines of the diffraction element may be at an angle of about 45° with respect to the first and second dividing lines of the photodetector.

The light source may emit a beam having an elliptic far-field pattern, the returned beam may form an elliptic condensed spot on the diffraction element, and the positional relation between the light source and the diffraction element may be so set that the minor axis of the elliptic light spot extends toward the two regions on the first diagonal positions and the major axis extends toward the remaining two regions on the second diagonal positions.

In this case, the areas of the parts of the returned beam incident on the two regions on the first diagonal positions of the diffraction element are smaller than those of the parts of the returned beam incident on the remaining two regions on the second diagonal positions. Thus, the light intensity of the condensed spots formed on the second dividing line of the photodetector becomes lower than that of the condensed spots formed on the first dividing line of the photodetector.

When the condensed spot formed on the photodetector moves along the first dividing line due to wavelength fluctuation of the light source, therefore, change of the output signal from each photodetection part of the photodetector becomes small. Consequently, the focused state on the optical recording medium can be further correctly detected regardless of wavelength fluctuation of the light source.

A holographic optical element according to a further aspect of the present invention comprises a diffraction surface for diffracting an incident beam and forming a condensed spot of the diffracted beam on a virtual plane. The diffraction surface is divided into four regions by perpendicular dividing lines, the perpendicular dividing lines are at an angle of about 45° with respect to the intersection between a plane including the optical axes of the incident and diffracted beams and the diffraction surface, and the diffraction surface supplies the diffracted beam with astigmatism.

A holographic optical element according to a further aspect of the present invention comprises a diffraction surface for diffracting an incident beam and forming a condensed spot of the diffracted beam on a virtual plane, the diffraction surface is divided into four regions by perpendicular dividing lines, two of the four regions located on first diagonal positions have holographic patterns for forming condensed spots on adjacent positions of a second virtual line on opposite sides with reference to the intersection between a first virtual line on the virtual plane and the second virtual line perpendicular to the first virtual line, the remaining two of the four regions located on second diagonal positions have holographic patterns for forming condensed spots on separate positions of the first virtual line on opposite sides with reference to the intersection between the first and second virtual lines, and the first virtual line is in a plane including the optical axis of the incident beam and that of the diffracted beam.

An optical recording medium drive for driving an optical recording medium according to a further aspect of the present invention comprises a rotation driving mechanism for rotating the optical recording medium, an optical pickup apparatus for irradiating the optical recording medium with a beam, a pickup driving mechanism for moving the optical pickup apparatus in the radial direction of the optical recording medium, and a signal processing circuit for processing an output signal from the optical pickup apparatus. The optical pickup apparatus comprises a light source for emitting the beam, a diffraction element for diffracting a returned beam based on the beam emitted from the light source, and the photodetector for detecting the returned beam diffracted by the diffraction element. The diffraction element has four regions divided by perpendicular dividing lines, the photodetector has four photodetection parts divided by a first dividing line substantially parallel to the direction movement of a condensed spot formed by the returned beam diffracted by the diffraction element resulting from wavelength fluctuation of the light source and a second dividing line perpendicular to the first dividing line, parts of the returned beam diffracted in two regions located on first diagonal positions of the diffraction element form condensed spots on adjacent positions of the second dividing line on opposite sides with reference to the intersection between the first and second dividing lines of the photodetector, and parts of the returned beam diffracted in the remaining two regions located on second diagonal positions of the diffraction element form condensed spots on separate positions of the first dividing line on opposite sides with reference to the intersection between the first and second dividing lines of the photodetector.

This optical recording medium drive employs the aforementioned optical pickup apparatus, whereby a focused state on the optical recording medium can be correctly detected regardless of wavelength fluctuation of the light source.

The foregoing and other objects, features, aspects and advantages of the present invention will become more apparent from the following detailed description of the present invention when taken in conjunction with the accompanying drawings.

BRIEF DESCRIPTION OF THE INVENTION

FIG. 1 schematically illustrates an optical pickup apparatus according to a first embodiment of the present invention;

FIG. 2 is a plan view of a transmission-type holographic optical element in the optical pickup apparatus shown in FIG. 1;

Figure 11:
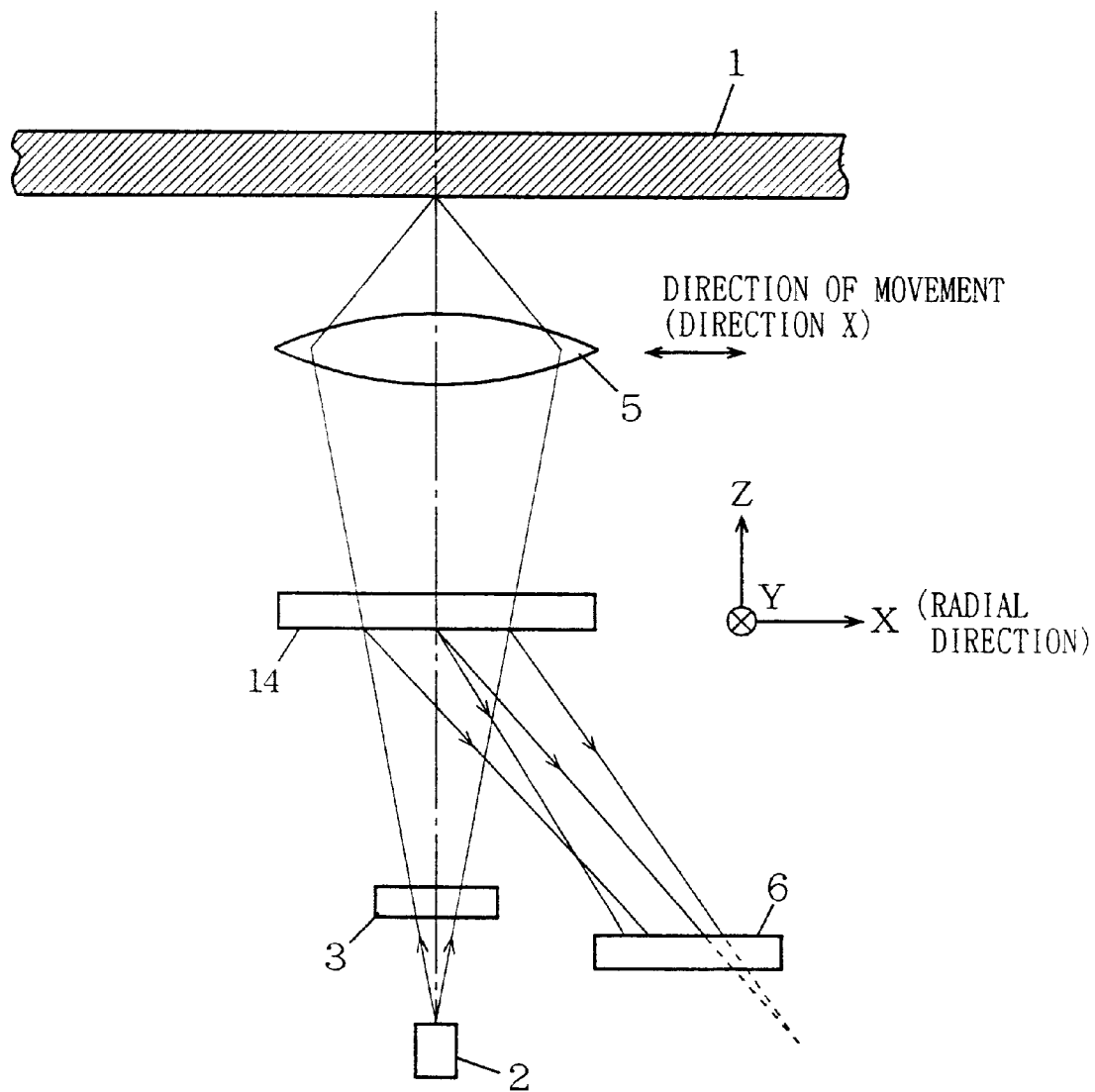
Figure 12:
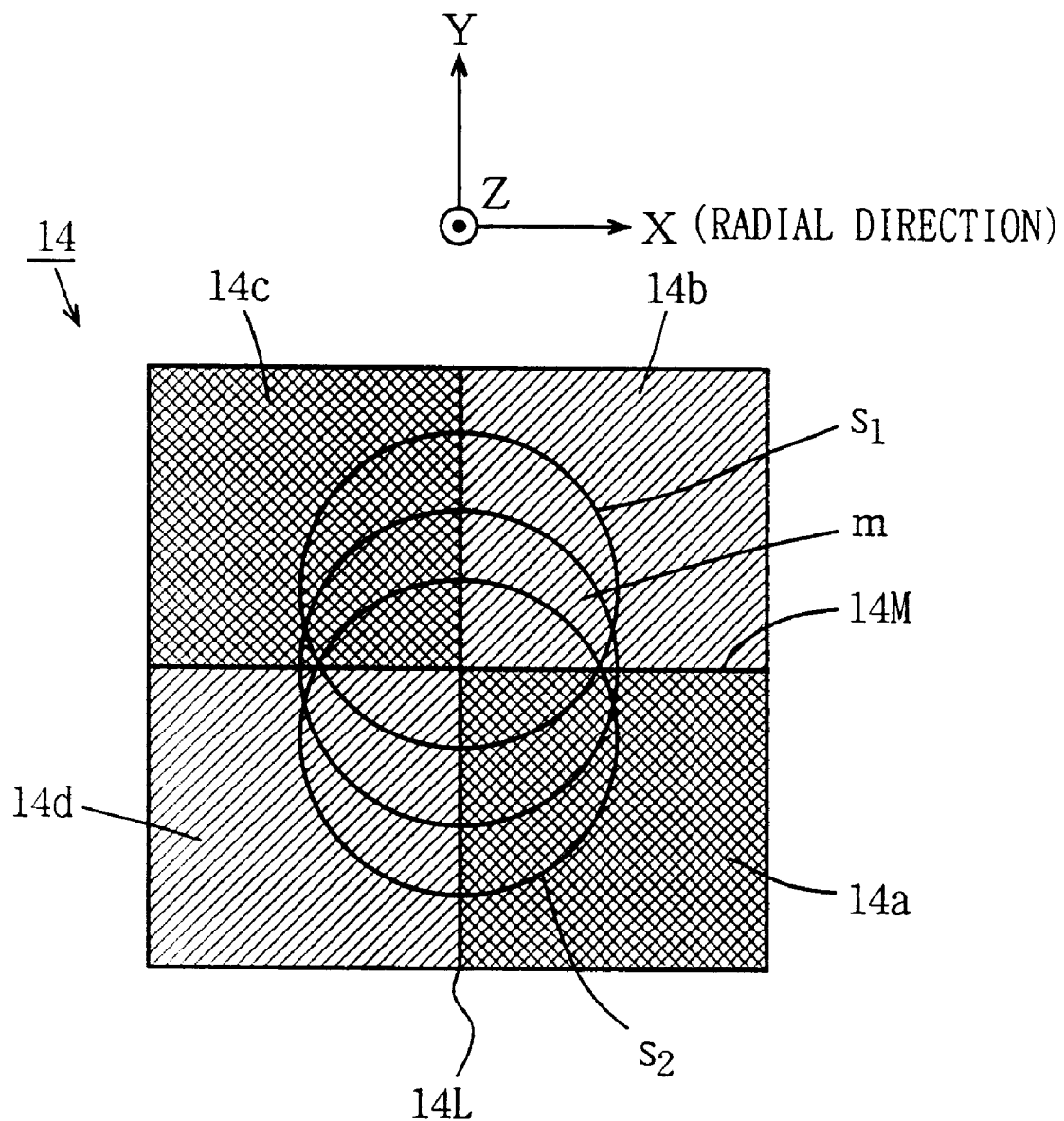
Figure 13:
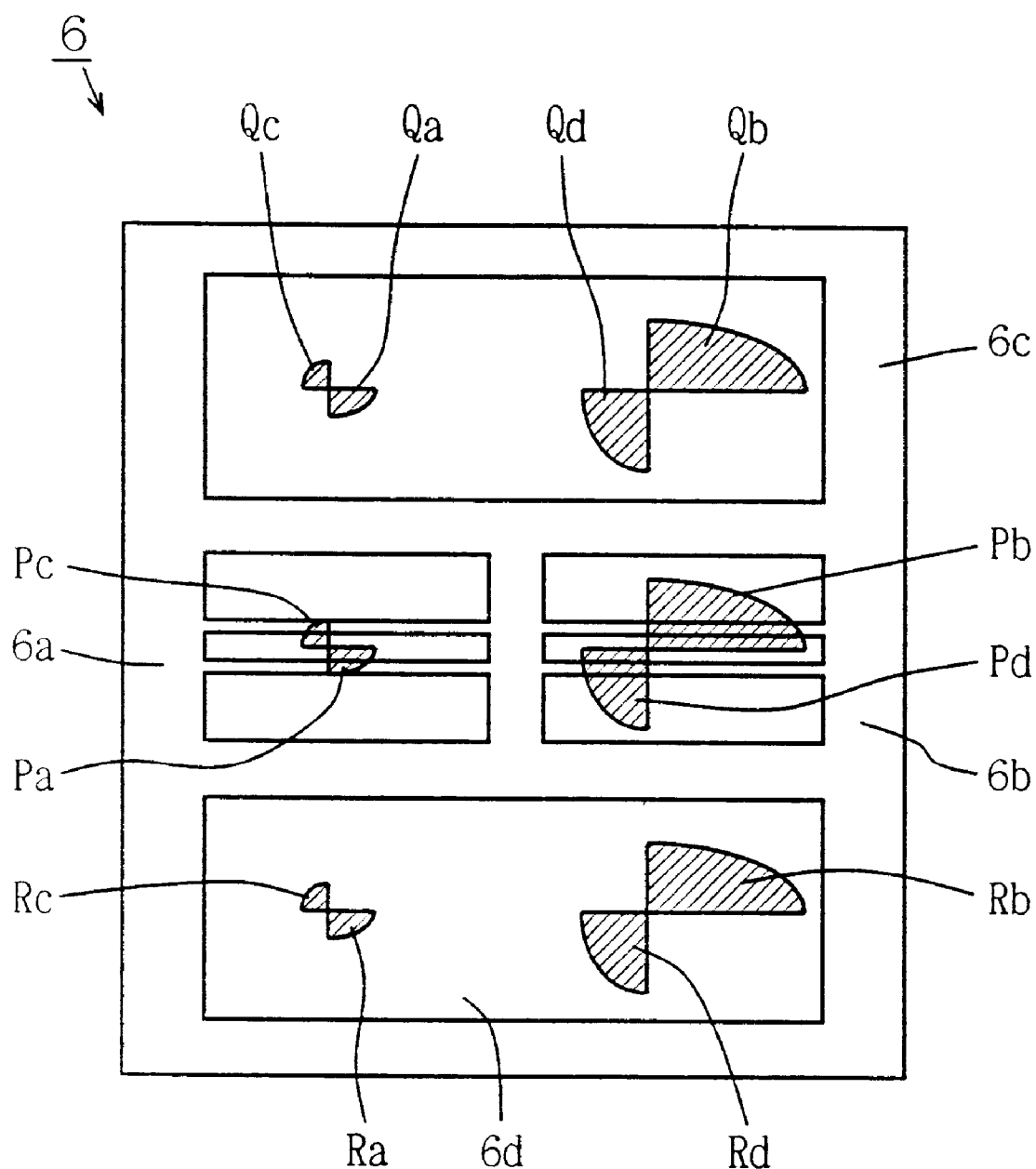
Figure 14:
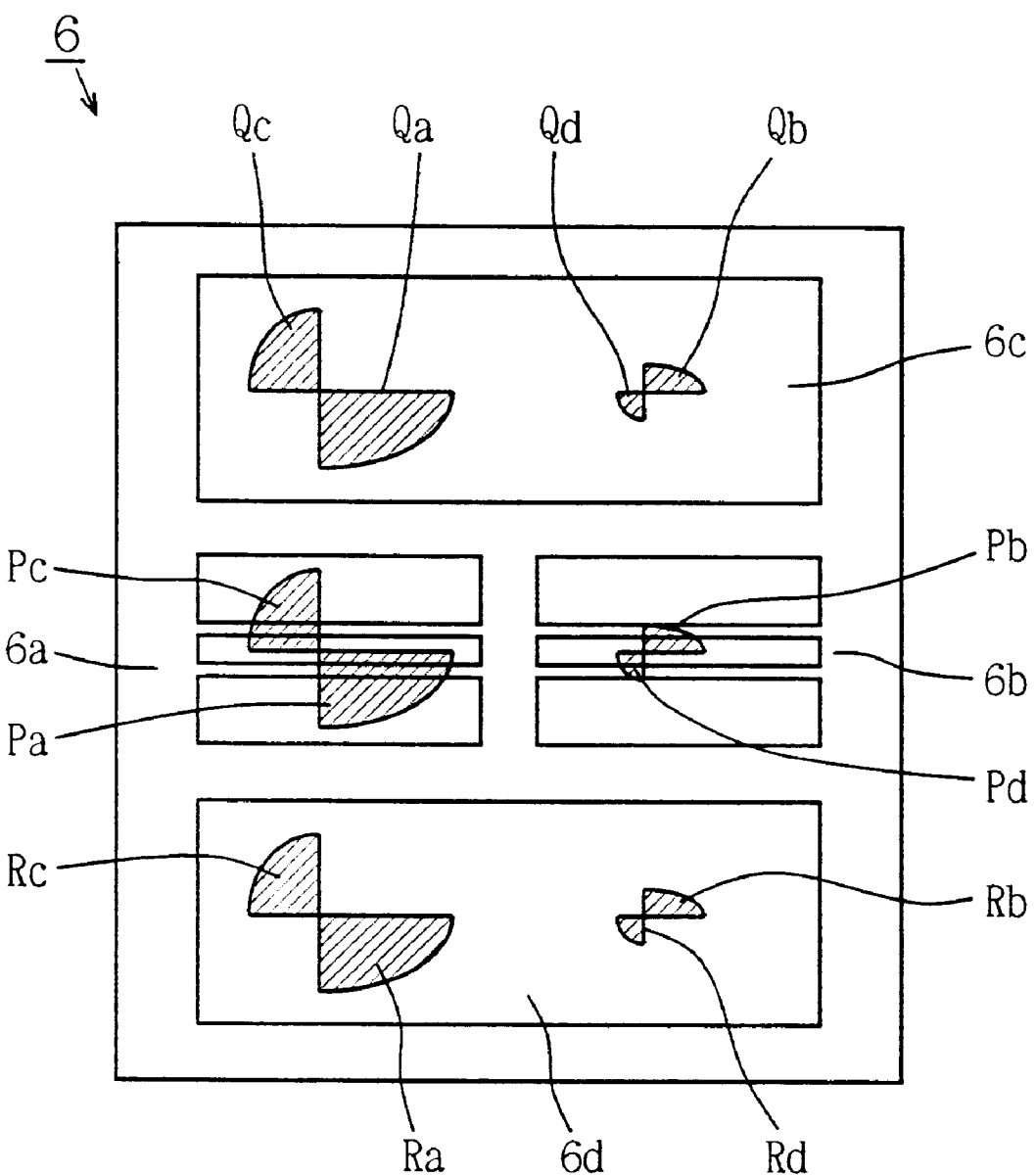
Figure 15:
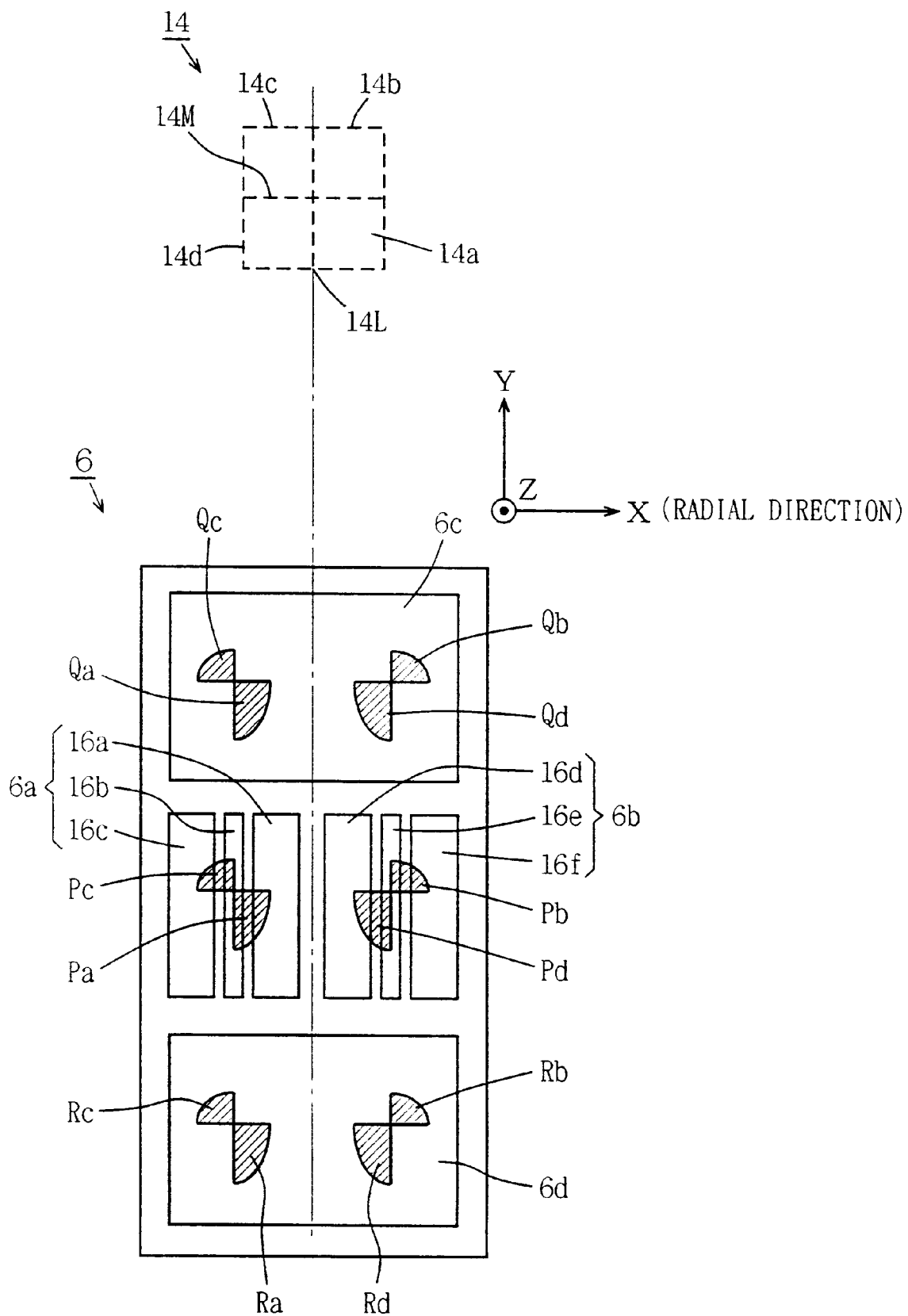
Figure 16:
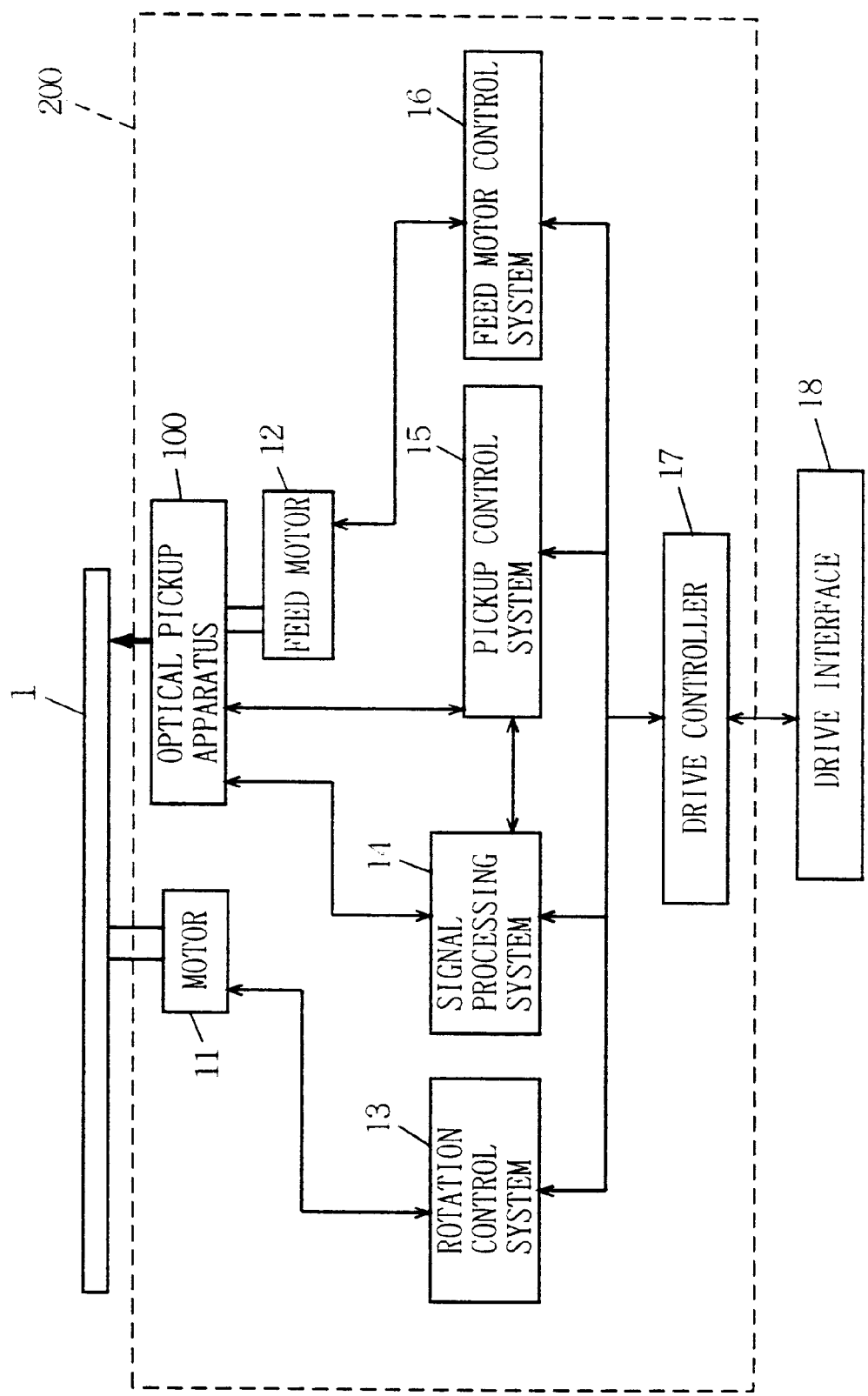
Figure 17:
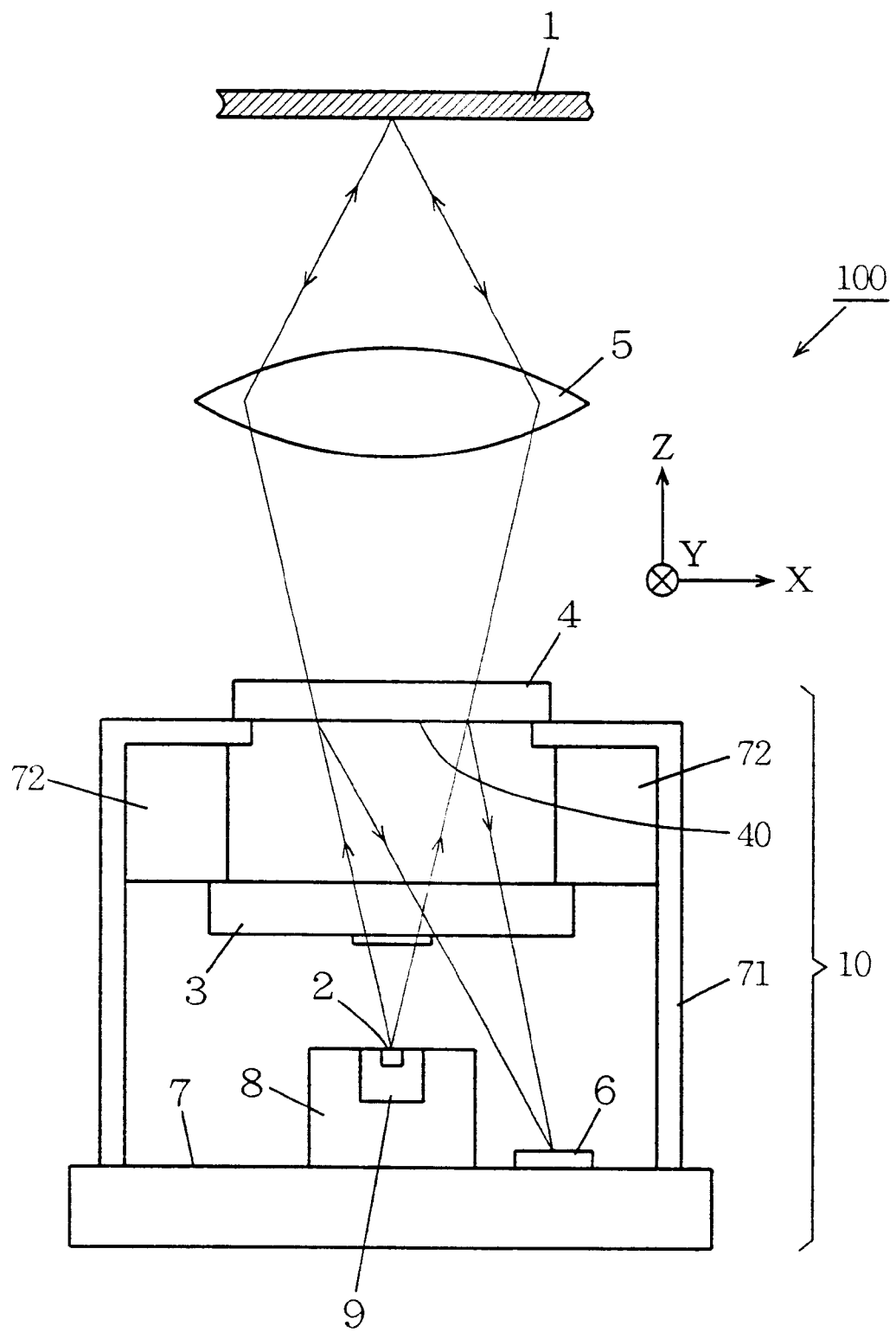
Figure 18:
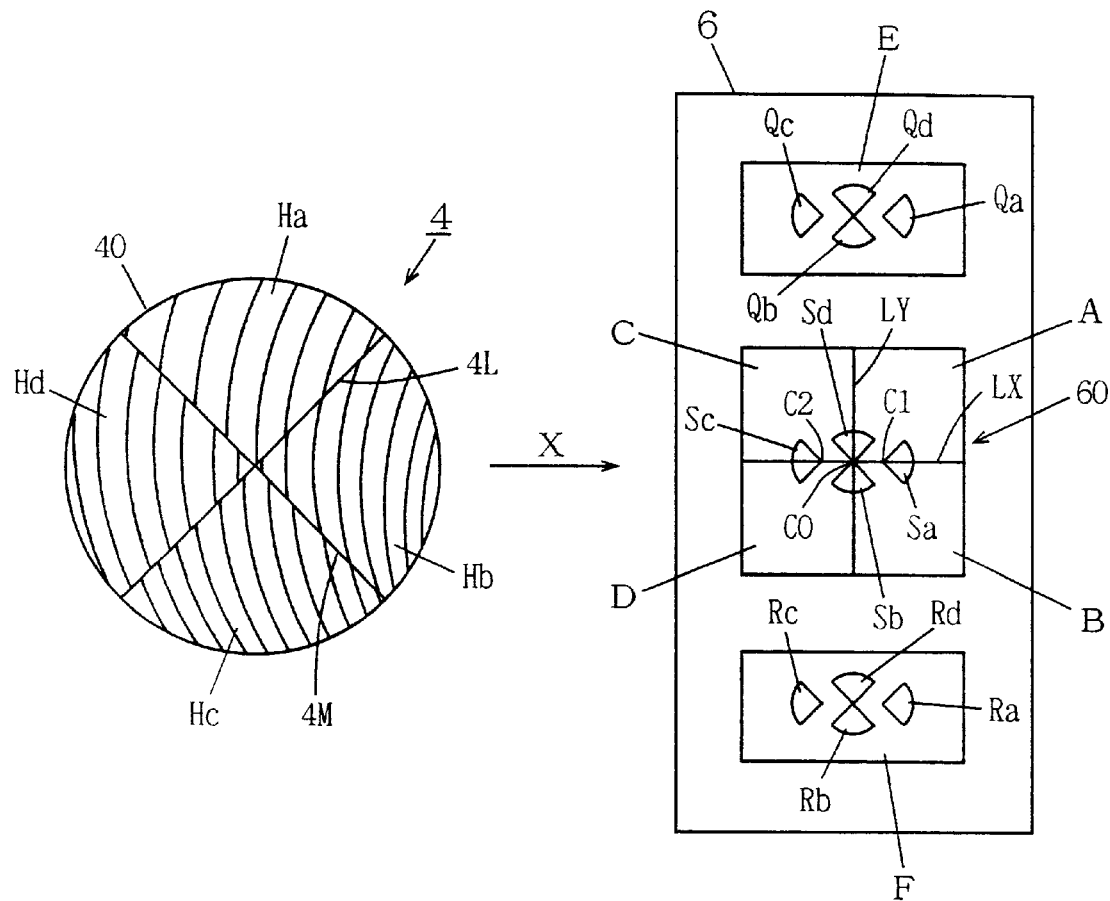
Figure 19:
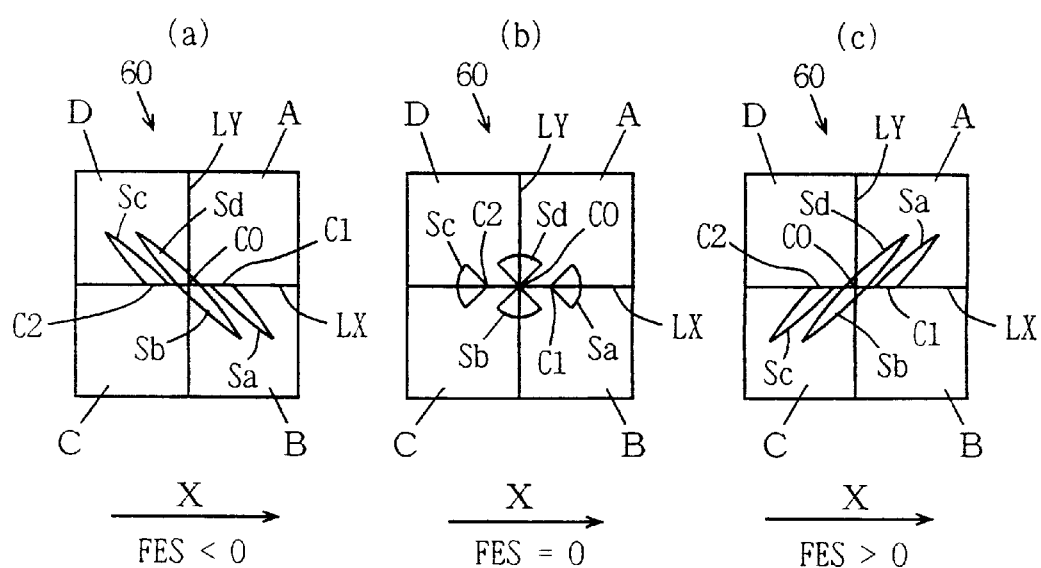
Figure 20:
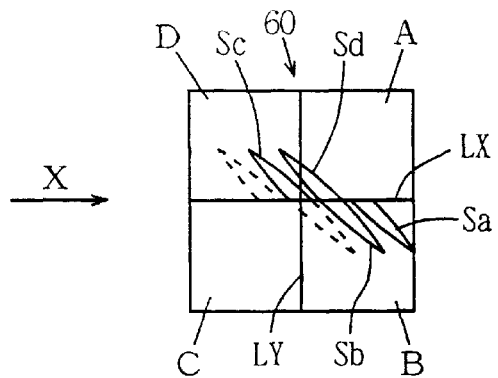
Figure 21:
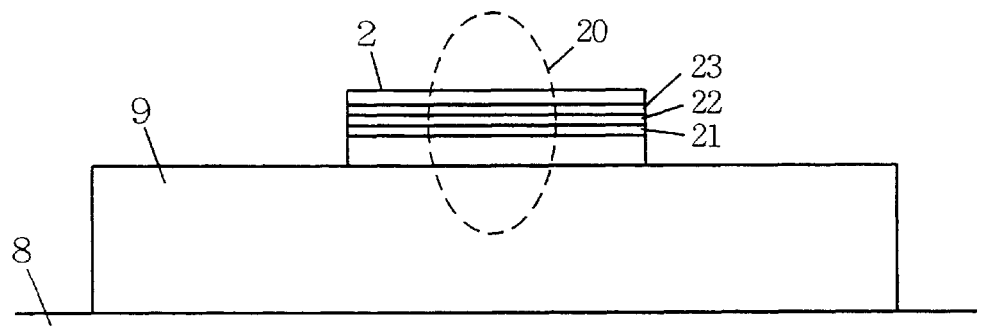
Figure 22:
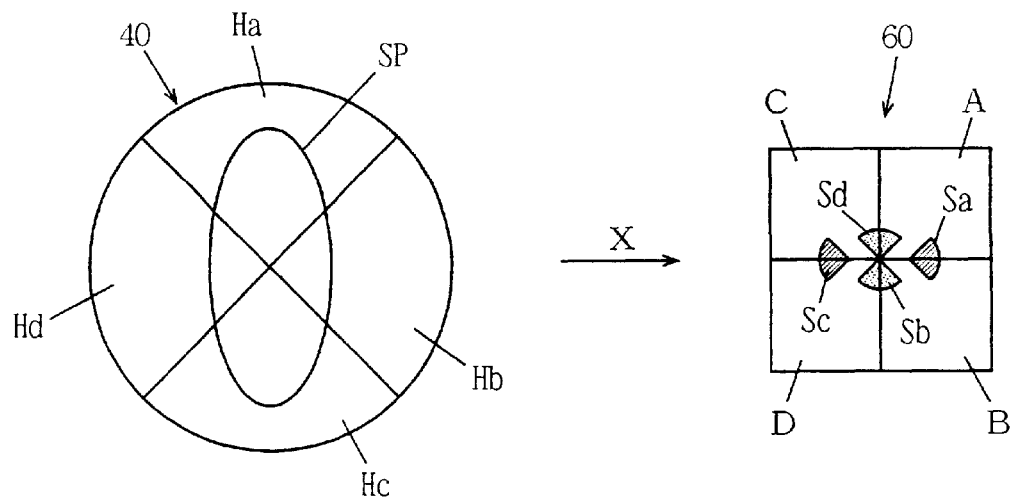
Figure 23:
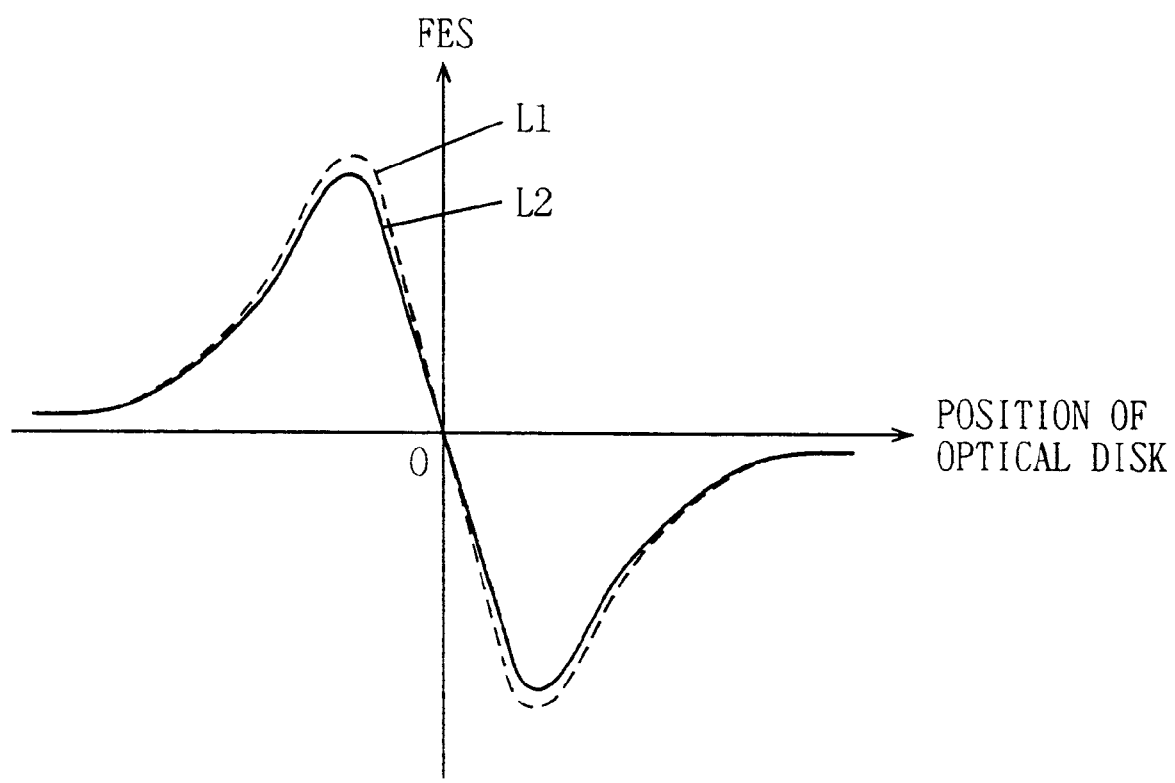
Figure 24:
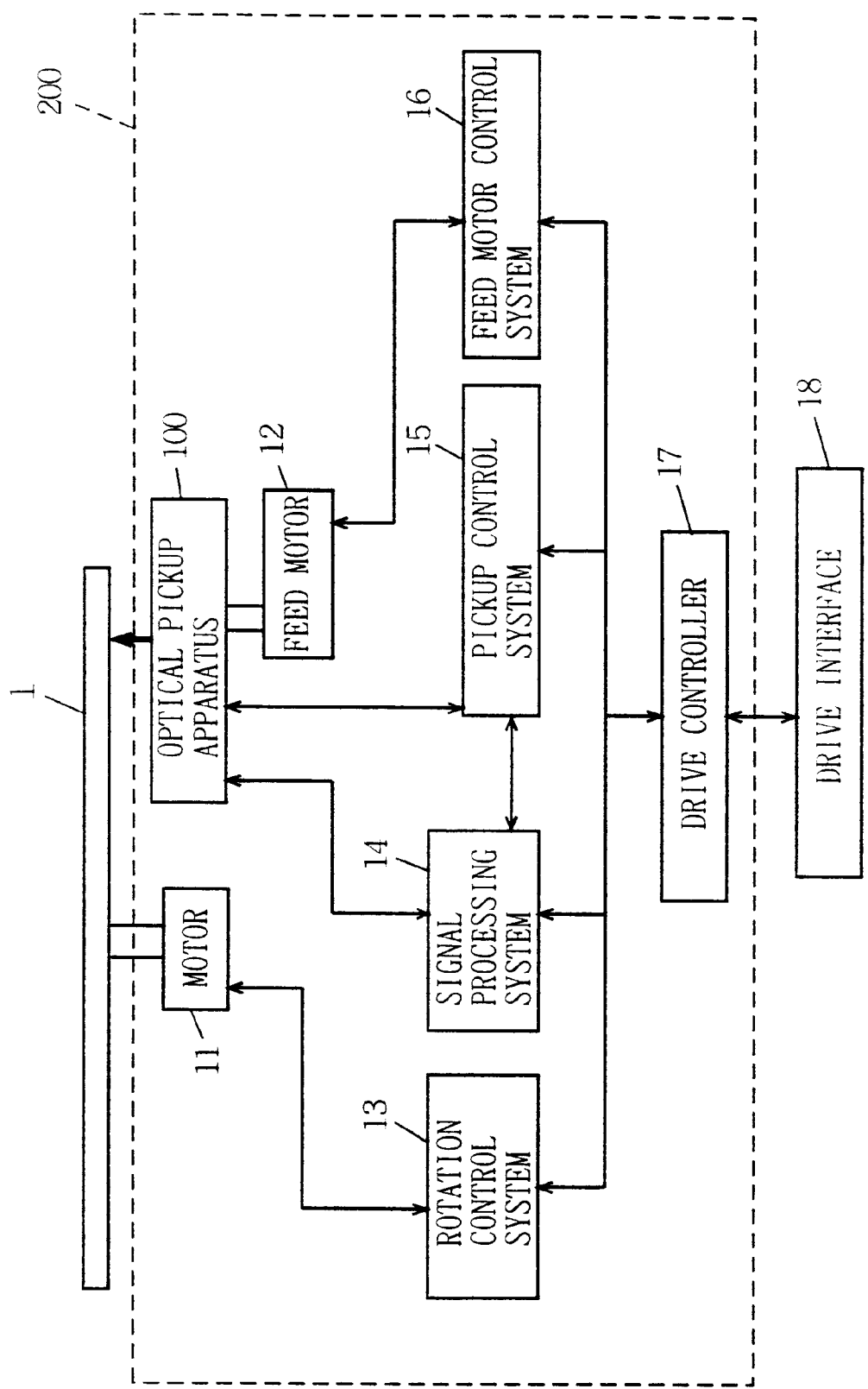
Figure 25:
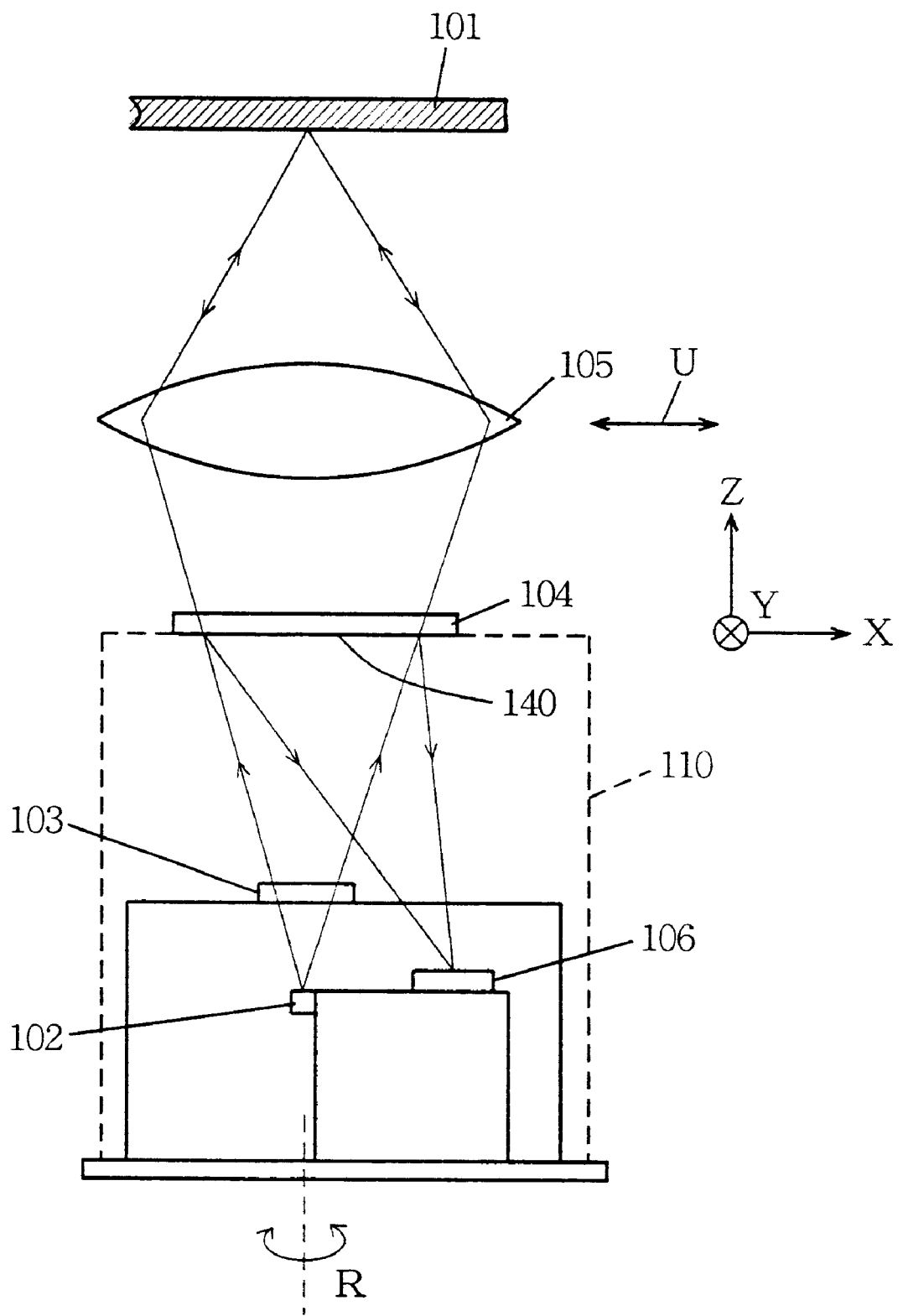
Figure 26:
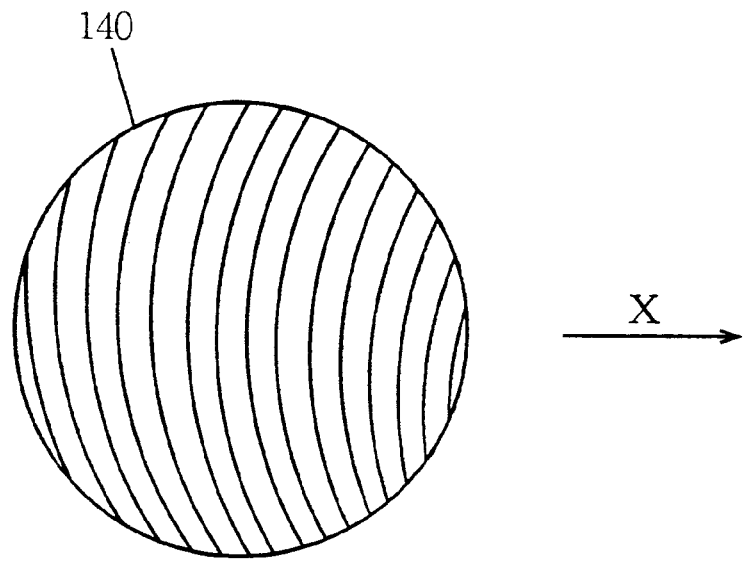
Figure 27:
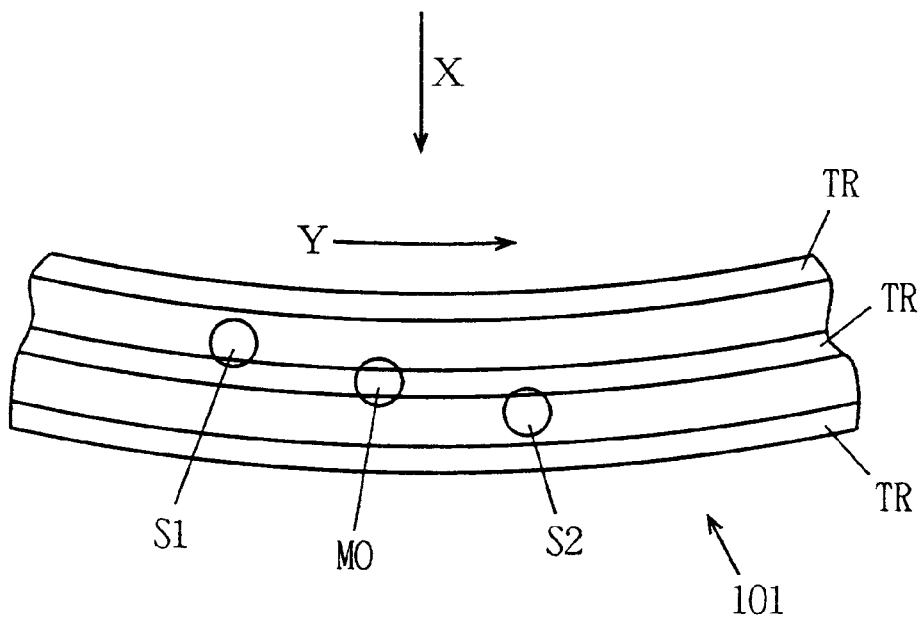
Figure 28:
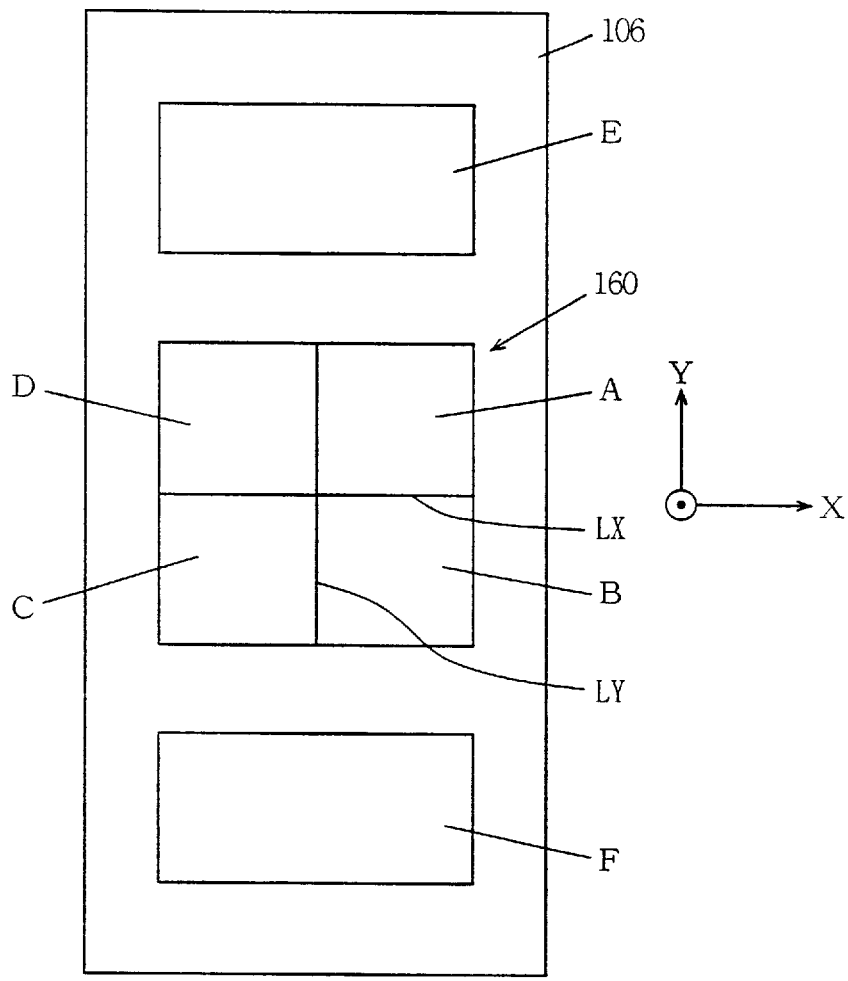
Figure 29:
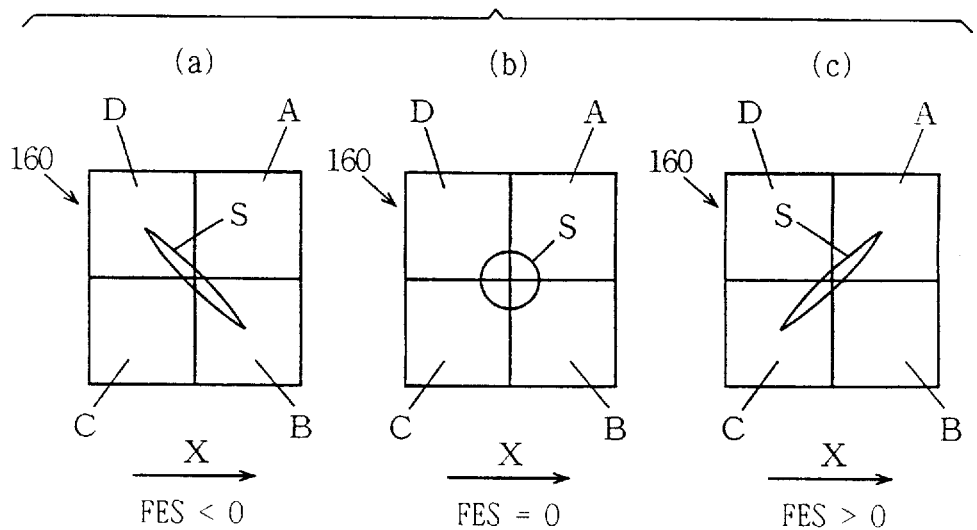
Figure 30:
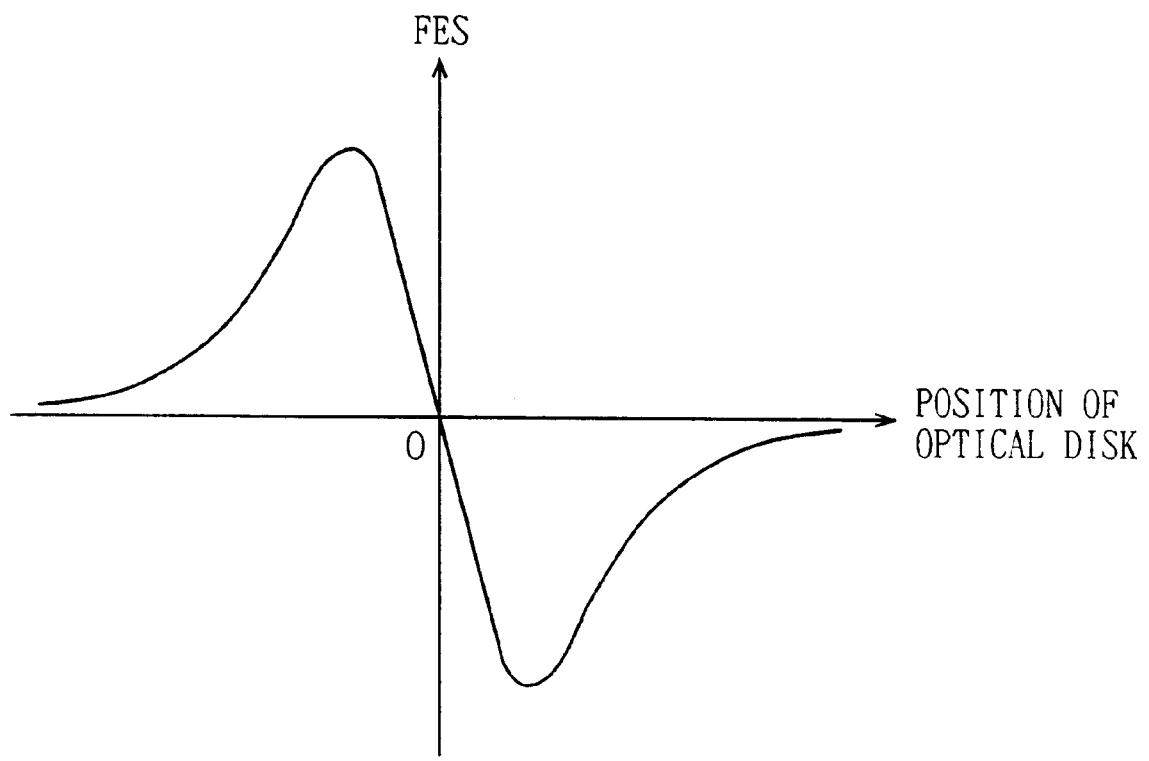
Figure 31:
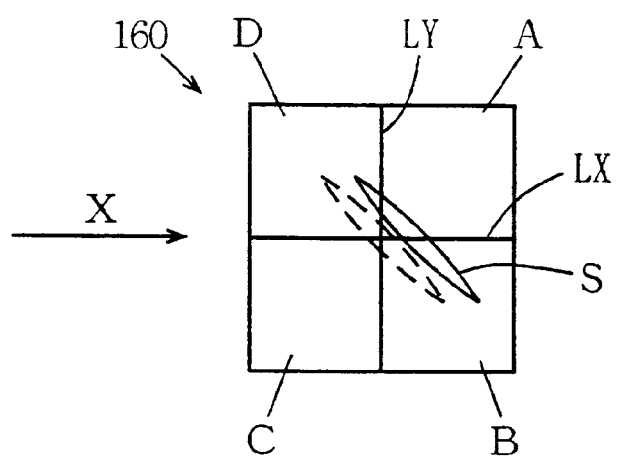
Figure 32:
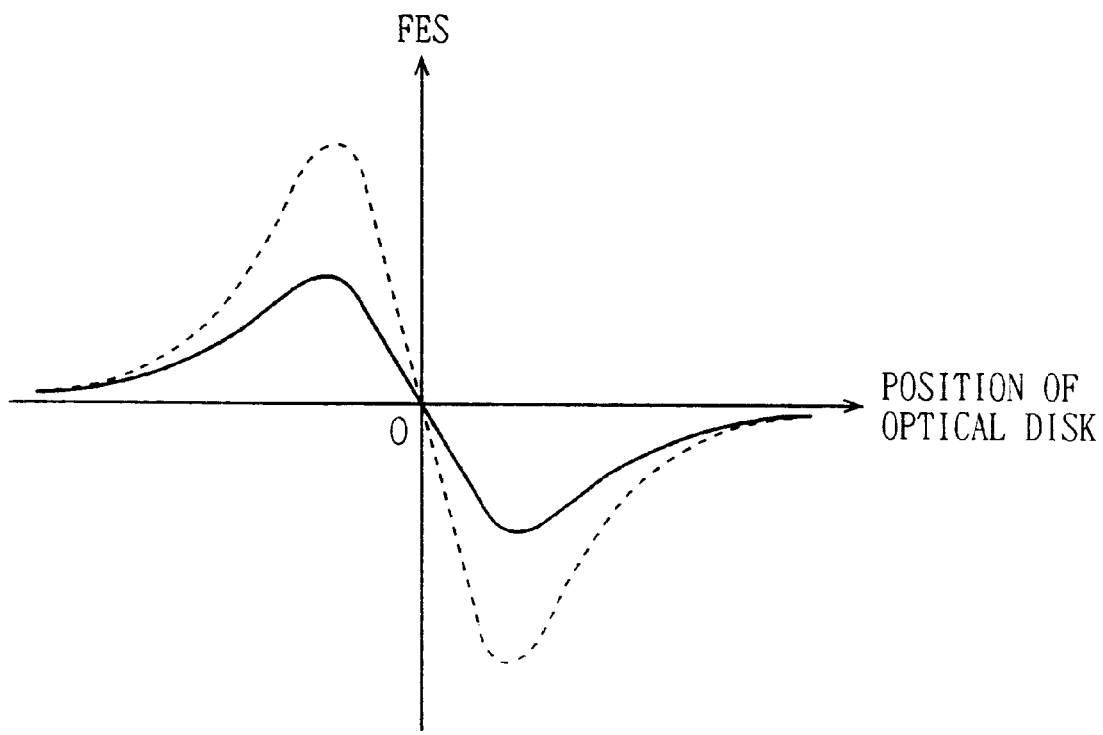
Figure 33:
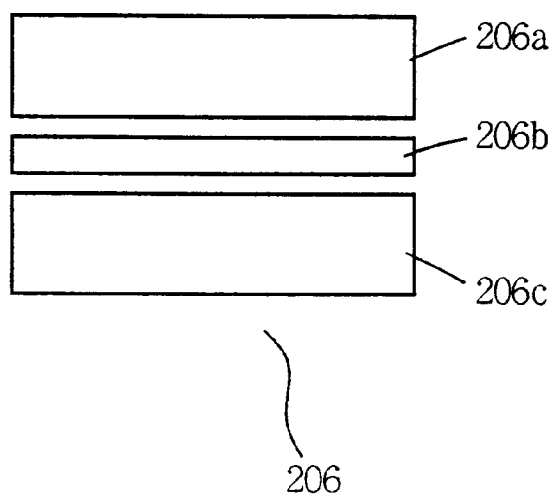
Figure 34:
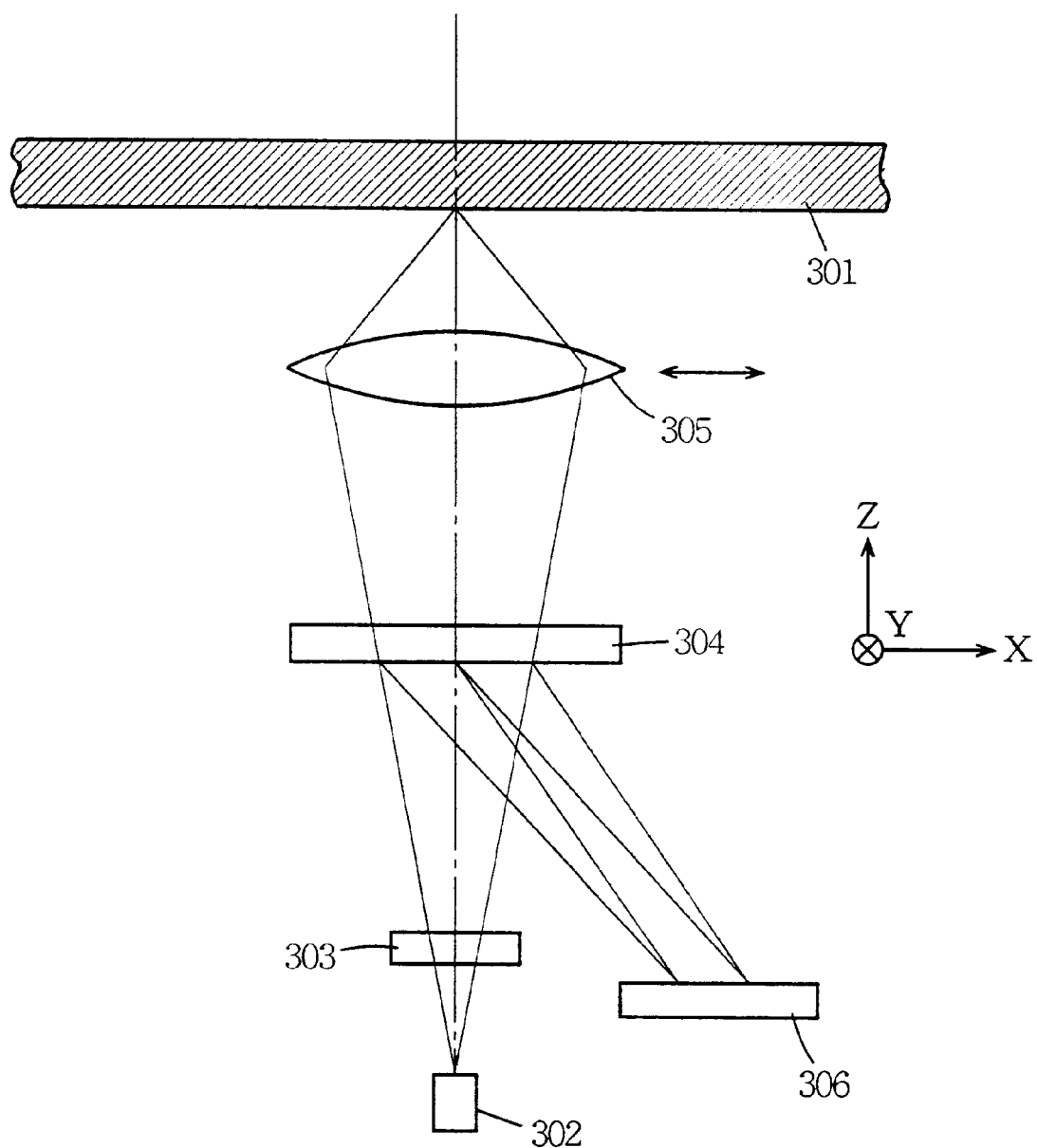
Figure 35:
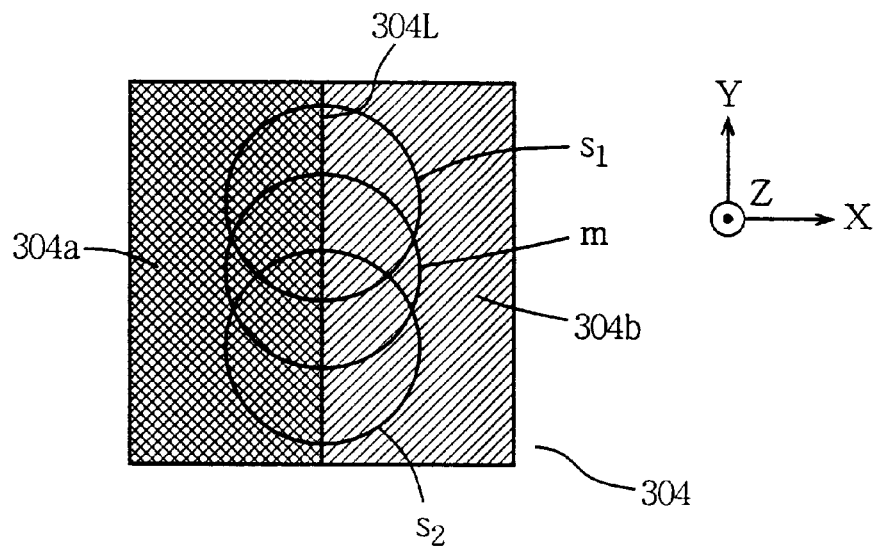
Figure 36:
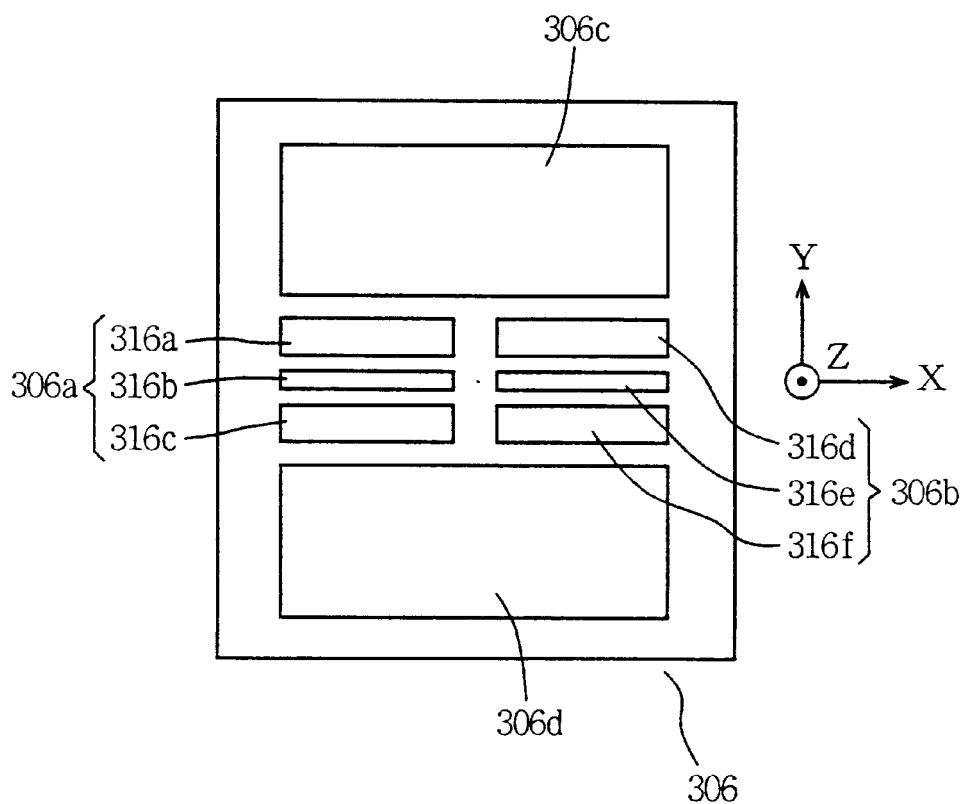
Figure 37:
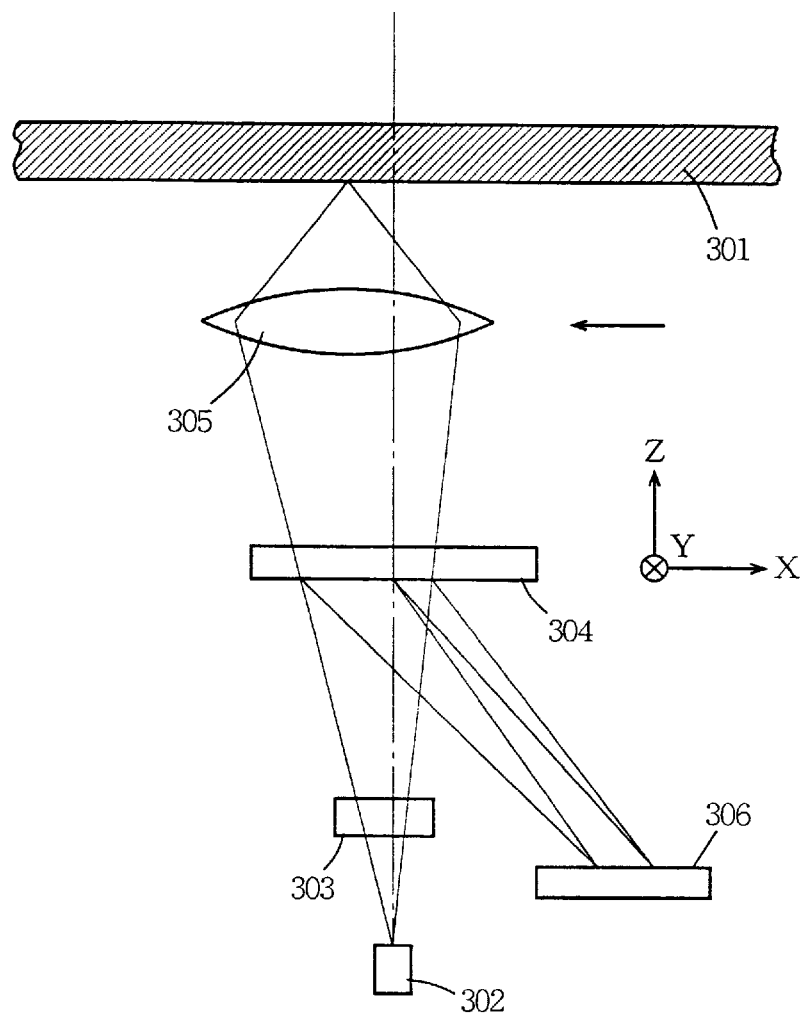
Figure 38:
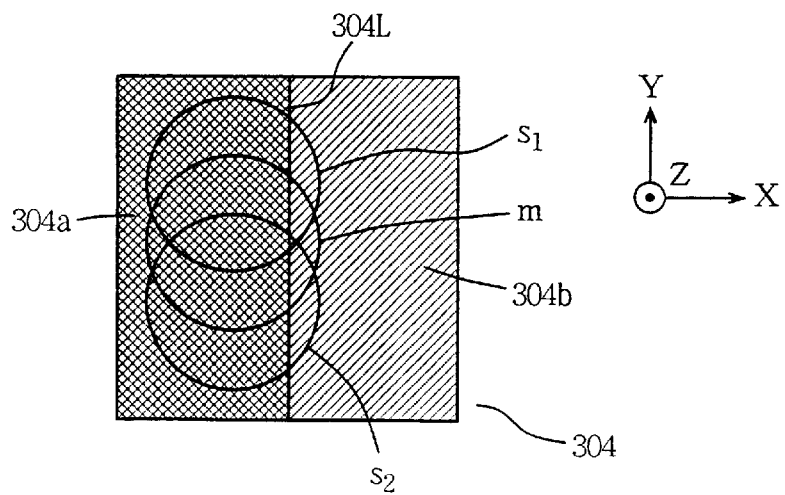
Figure 39:
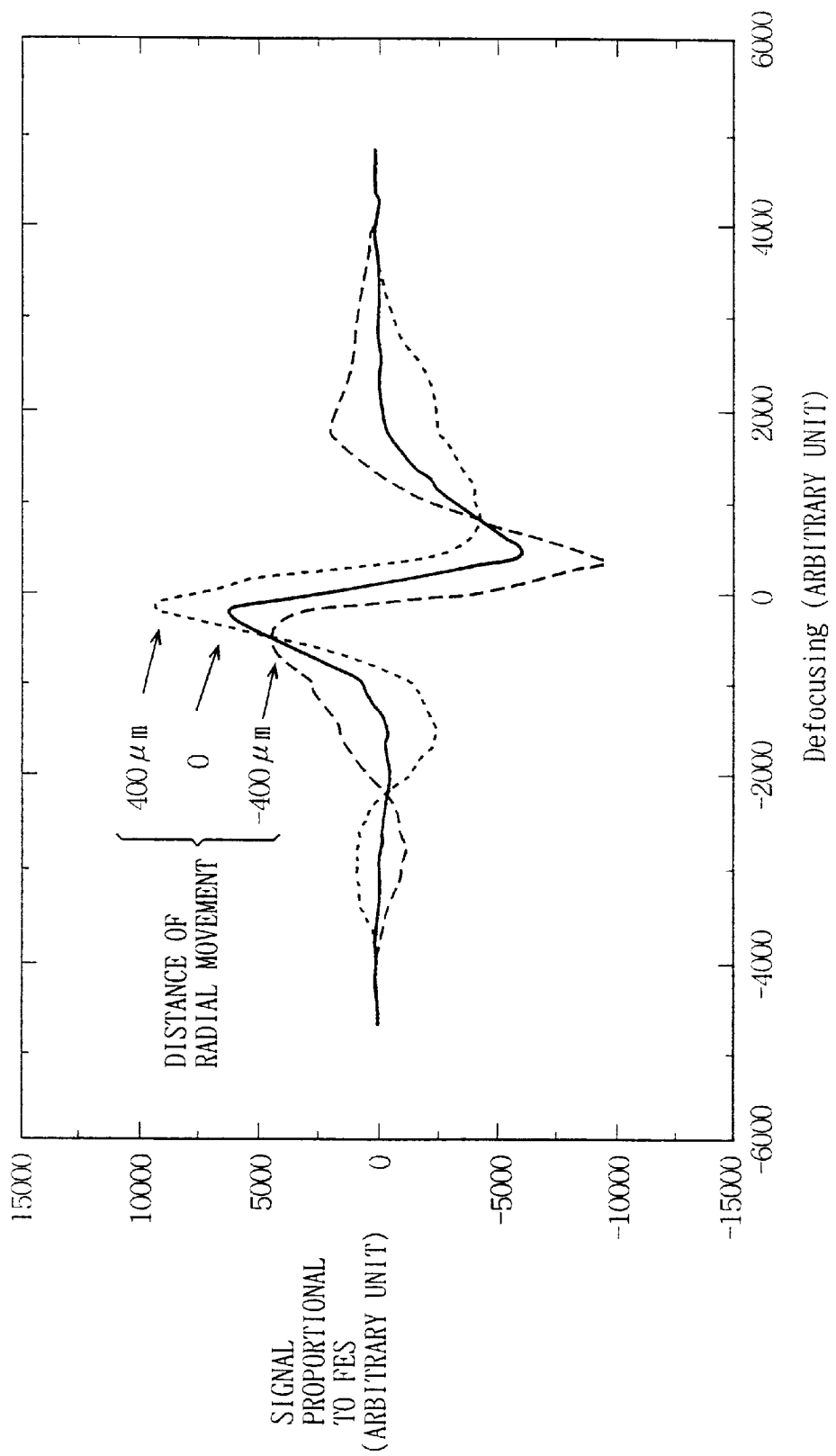

FIG. 11 schematically illustrates an optical pickup apparatus according to a third embodiment of the present invention;

FIG. 12 is a plan view of a transmission-type holographic optical element in the optical pickup apparatus shown in FIG. 11;

FIG. 13 is a typical plan view showing a condensed state on a photodetector in relation to an optical disk approaching a objective lens and entering a focus error state;

FIG. 14 is a typical plan view showing a condensed state on the photodetector in relation to the optical disk separating from the objective lens and entering a focus error state;

FIG. 15 is a typical plan view showing another example of the photodetector;

FIG. 16 is a block diagram showing the structure of an optical recording medium drive employing the optical pickup apparatus according to the first, second or third embodiment of the present invention;

FIG. 17 schematically illustrates an optical pickup apparatus according to a fourth embodiment of the present invention;

FIG. 18 shows plan views of a transmission-type holographic optical element and a photodetector in the optical pickup apparatus shown in FIG. 17;

FIGS. 19 is typical plan views showing condensed states of a main beam on a four-segment photodetection part;

FIG. 20 is a typical plan view showing movement of a condensed spot on the four-segment photodetection part resulting from fluctuation of a lasing wavelength of a semiconductor laser device;

FIG. 21 is a top plan view of the semiconductor laser device in the optical pickup apparatus shown in FIG. 17;

FIG. 22 shows typical plan views illustrating a light spot on a four-segment holographic surface and condensed spots on the four-segment photodetection part with an optimized direction of a far-field pattern of a laser beam;

FIG. 23 illustrates an S-curve characteristic in optical adjustment and wavelength fluctuation;

FIG. 24 is a block diagram showing the structure of an optical recording medium drive employing the optical pickup apparatus according to the fourth embodiment of the present invention;

FIG. 25 schematically illustrates a conventional optical pickup apparatus having a transmission-type holographic optical element;

FIG. 26 is a plan view of the transmission-type holographic optical element employed in the conventional optical pickup apparatus;

FIG. 27 illustrates a main spot and subspots formed on an optical disk;

FIG. 28 is a typical plan view showing an exemplary photodetector;

FIGS. 29 is typical plan views showing condensed states on the photodetector in the conventional optical pickup apparatus;

FIG. 30 illustrates an S-curve characteristic in the optical pickup apparatus:

FIG. 31 illustrates movement of a condensed spot on a four-segment photodetection part resulting from fluctuation of a lasing wavelength of a semiconductor laser device;

FIG. 32 illustrates change of the S-curve characteristic resulting from fluctuation of the lasing wavelength of the semiconductor laser device;

FIG. 33 is a typical plan view showing a photodetection art of another photodetector;

FIG. 34 schematically illustrates another exemplary optical pickup apparatus;

FIG. 35 is a plan view of a transmission-type holographic optical element employed in the optical pickup apparatus shown in FIG. 34;

FIG. 36 is a plan view of a photodetector employed in the optical pickup apparatus shown in FIG. 34;

FIG. 37 schematically illustrates a moving state of a objective lens in the optical pickup apparatus shown in FIG. 34;

FIG. 38 is a typical plan view showing the state of a light spot on the transparent holographic optical element with the objective lens moving in the optical pickup apparatus shown in FIG. 34; and FIG. 39 is an S-curve characteristic diagram in relation to the objective lens moving in the optical pickup apparatus shown in FIG. 34.

DESCRIPTION OF THE PREFERRED EMBODIMENTS

Figure 1:
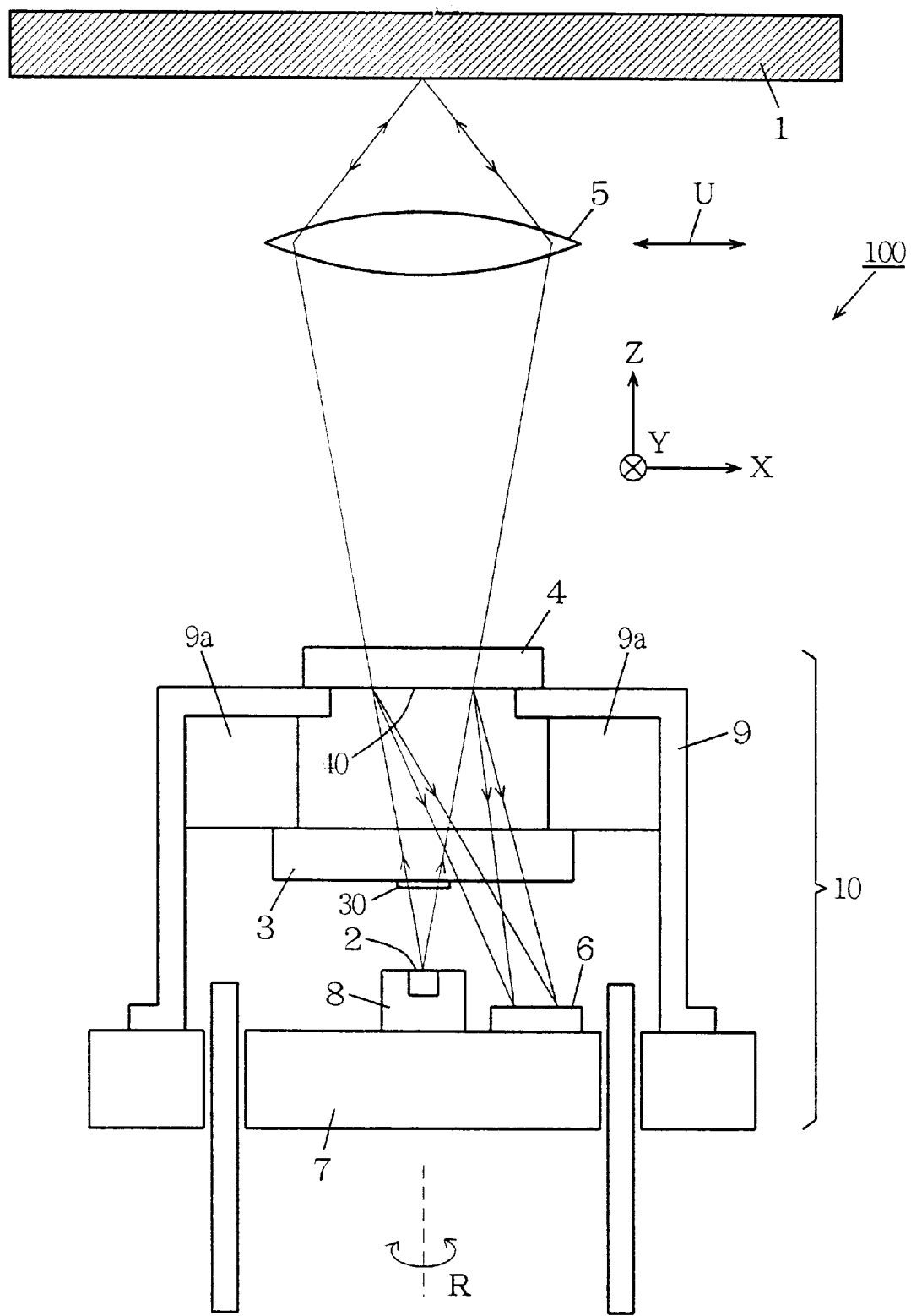

FIG. 1 schematically illustrates an optical pickup apparatus 100 according to a first embodiment of the present invention. The optical pickup apparatus 100 performs focus servo control with the astigmatism method and tracking servo control with the three-beam method.

Referring to FIG. 1, symbols X, Y and Z denote the radial direction of a reflection type optical disk 1 such as a CD (compact disk), the track direction of the optical disk 1 and a direction perpendicular to the disk plane of the optical disk 1 respectively.

The optical pickup apparatus 100 comprises a projecting/photoreceiving unit 10 and a objective lens 5. The projecting/photoreceiving unit 10 is formed by a semiconductor laser device 2, a transmission-type diffraction grating 3, a transmission-type holographic optical element 4 and a photodetector 6.

The semiconductor laser device 2 is mounted on a side surface of a heat sink 8 provided on a stem 7, and the photodetector 6 is mounted on the stem 7. The diffraction grating 3, which is made of optical glass or optical resin, is arranged in a holder 9 through a spacer 9a. The transmission-type holographic optical element 4 is arranged in an opening on the upper surface of the holder 9.

The semiconductor laser device 2 emits a laser beam (beam) in the direction Z. The diffraction grating 3 has a diffraction surface 30, for dividing the beam emitted from the semiconductor laser device 2 into three beams including a 0th order diffracted beam (main beam) M, a +1st order diffracted beam (subbeam) $S_1$ and a −1st order diffracted beam (subbeam) $S_2$ and transmitting the same through the transmission-type holographic optical element 4. FIG. 1 shows the three beams M, $S_1$ and $S_2$ as a single beam.

The objective lens 5 is supported to be movable in the radial direction (direction X) of the optical disk 1 for tracking servo control as shown by arrow U, and movable in the vertical direction (direction Z) for focus servo control. This objective lens 5 condenses the main beam M and the two subbeams $S_1$ and $S_2$ diffracted in and transmitted through the transmission-type holographic optical element 4 in the 0th order on the optical disk 1 as a main spot M0 and subspots S1 and S2 positioned on both sides thereof respectively.

The transmission-type holographic optical element 4 has a four-segment holographic surface 40, for dividing each of the three returned beams (reflected beams) M, $S_1$ and $S_2$ from the optical disk 1 into four beams, diffracting the same in the 1st order in a plane substantially including the directions X and Y and introducing the same into the photodetector 6.

At this time, the transmission-type holographic optical element 4 supplies the three returned beams M, $S_1$ and $S_2$ from the optical disk 1 with spatial variation (astigmatism in this embodiment) corresponding to the focused state on the optical disk 1 respectively.

The photodetector 6 detects the three beams M, $S_1$ and $S_2$ reflected by the optical disk 1, transmitted through the objective lens 5 and transmitted through and diffracted in the transmission-type holographic optical element 4 in the 1st order.

According to this embodiment, the optical disk 1, the semiconductor laser device 2, the transmission-type holographic optical element 4 and the diffraction grating 3 correspond to the optical recording medium, the light source, the first diffraction element and the second diffraction element respectively.

This optical pickup apparatus 100 must perform tracking phase adjustment so that the main spot M0 scans the track TR to be reproduced and the subspots S1 and S2 scan parts located on both sides of the main spot M0 slightly over the track TR, as shown in FIG. 27. The optical pickup apparatus 100 performs this tracking phase adjustment by rotating the projecting/photoreceiving unit 10 by a prescribed angle θ about the direction Z along arrow R. The angle θ is 1 to 3°.

FIG. 2 is a plan view of the transmission-type holographic optical element 4 in the optical pickup apparatus 100 shown in FIG. 1. The four-segment holographic surface 40 of this transmission-type holographic optical element 4 is divided into four regions 4a, 4b, 4c and 4d of equal areas by virtual dividing lines 4L and 4M which are perpendicular to each other. Referring to FIG. 2, symbols m0, s1 and s2 denote light spots formed by the main beam M and the two subbeams $S_1$ and $S_2$ among the returned beams from the optical disk 1.

Before the tracking phase adjustment, the dividing line 4L is at the angle θ with respect to the track direction (direction Y) of the optical disk 1 and the dividing line 4M is at the angle θ with respect to the radial direction (direction X) of the optical disk 1 respectively.

The regions 4a and 4c located on first symmetrical positions (first diagonal positions) with reference to the intersection between the dividing lines 4L and 4M have the same holographic surface patterns (diffraction surface patterns), and the regions 4b and 4d located on second symmetrical positions (second diagonal positions) have the same holographic surface patterns. The regions 4a and 4c and the regions 4b and 4d supply parts of the returned beams from the optical disk 1 with reverse spatial variation (perpendicular astigmatism in this embodiment).

Figure 3:
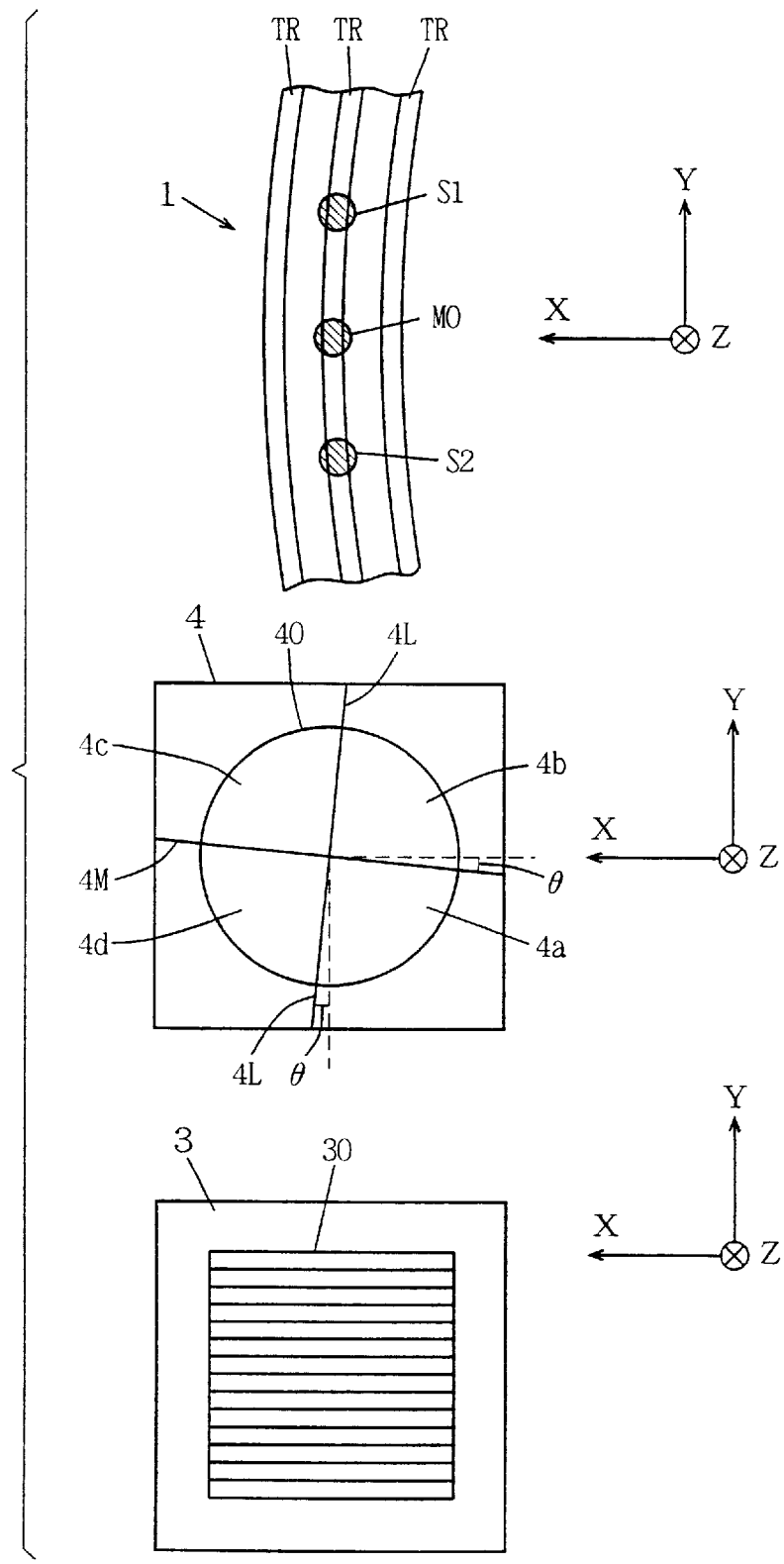
FIG. 3 illustrates states of a track of an optical disk, the transmission-type holographic optical element and a diffraction grating before tracking phase adjustment.
Figure 4:
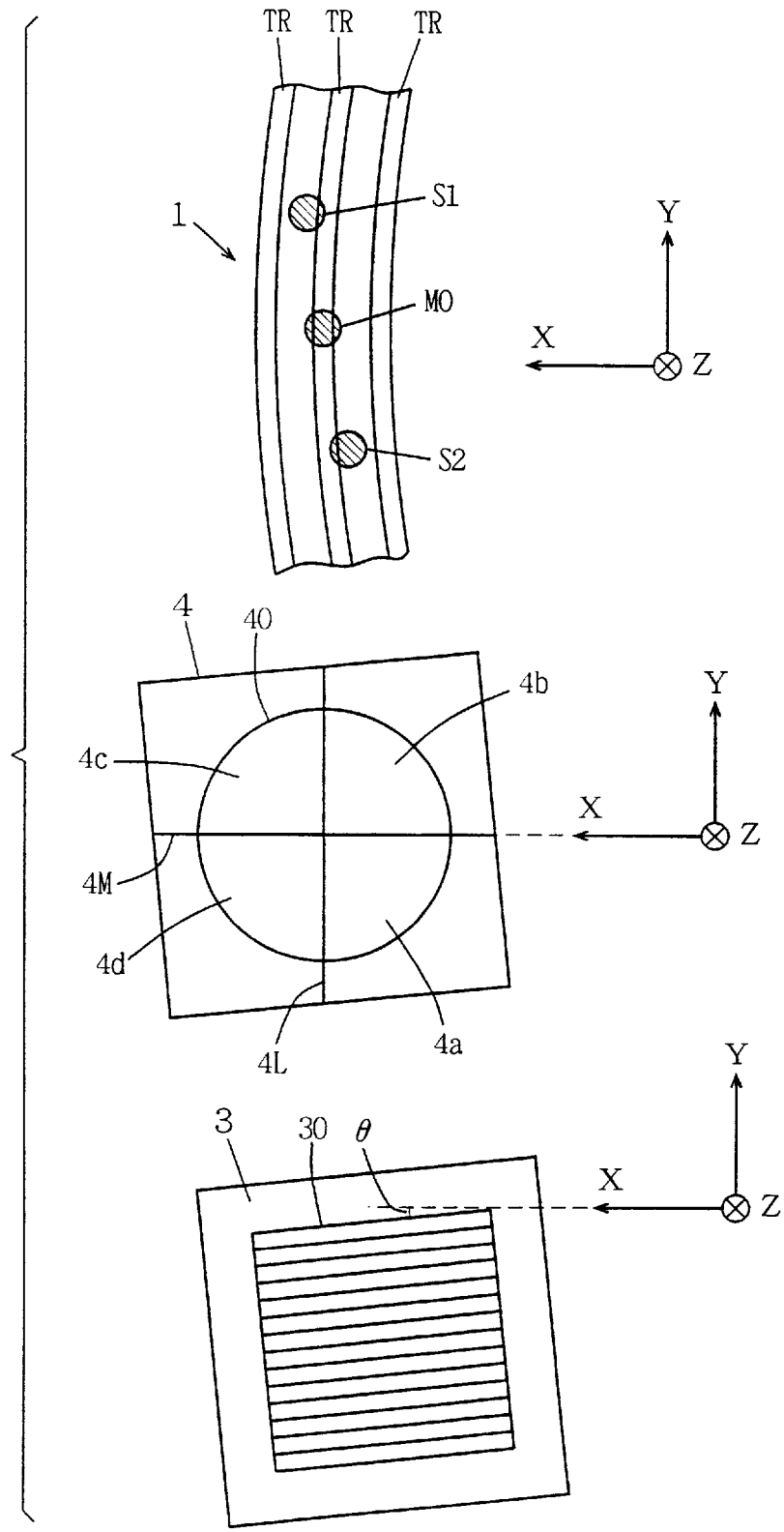
FIG. 4 illustrates states of the track of the optical disk, the transmission-type holographic optical element and the diffraction grating after tracking phase adjustment.

FIG. 3 illustrates plan views showing the states of the track TR of the optical disk 1, the transmission-type holographic optical element 4 and the diffraction grating 3 before the tracking phase adjustment. FIG. 4 illustrates plan views showing the states of the track TR of the optical disk 1, the transmission-type holographic optical element 4 and the diffraction grating 3 after the tracking phase adjustment.

Before the tracking phase adjustment, the main spot M0 and the two subspots $S_1$ and $S_2$ are formed on a single path of the track TR of the optical disk 1, as shown in FIG. 3. At this time, the dividing line 4L of the transmission-type holographic optical element 4 is at the angle θ with respect to the track direction (direction Y) of the optical disk 1, while the dividing line 4L is at the angle θ with respect to the radial direction (direction X) of the optical disk 1. On the other hand, the direction of diffraction grooves of the diffraction grating 3 coincides with the direction X. In other words, the dividing line 4M of the transmission-type holographic optical element 4 is at the angle θ with respect to the diffraction grooves of the diffraction grating 3.

After the tracking phase adjustment, the main spot M0 is formed on the single path of the track TR of the optical disk 1 and the two subspots S1 and S2 are formed on parts located on both sides of the main spot M0 slightly over the track TR.

Reflectance is highly set in the exterior of the track TR as compared with the track TR. If the main spot M0 deviates from the track TR, therefore, difference is caused between reflected beams from the subspots S1 and S2. The main spot M0 and the subspots S1 and S2 are so arranged that the major or minor axes thereof are substantially perpendicular to the track TR.

At this time, the dividing line 4L of the transmission-type holographic optical element 4 coincides with the track direction (direction Y) of the optical disk 1, and the dividing line 4M coincides with the radial direction (direction X) of the optical disk 1. On the other hand, the direction of the diffraction grooves provided in the diffraction surface 30 of the diffraction grating 3 is at the angle θ with respect to the direction X.

When the objective lens 5 is moved in the direction X for a tracking operation as shown by arrow U in FIG. 1, therefore, the light spots formed on the transmission-type holographic optical element 4 move along the dividing line 4M. Thus, the total light quantity of the parts of the returned beams transmitted through the regions 4a and 4c and that of the parts of the returned beams transmitted through the regions 4b and 4d remain unchanged.

Figure 5:
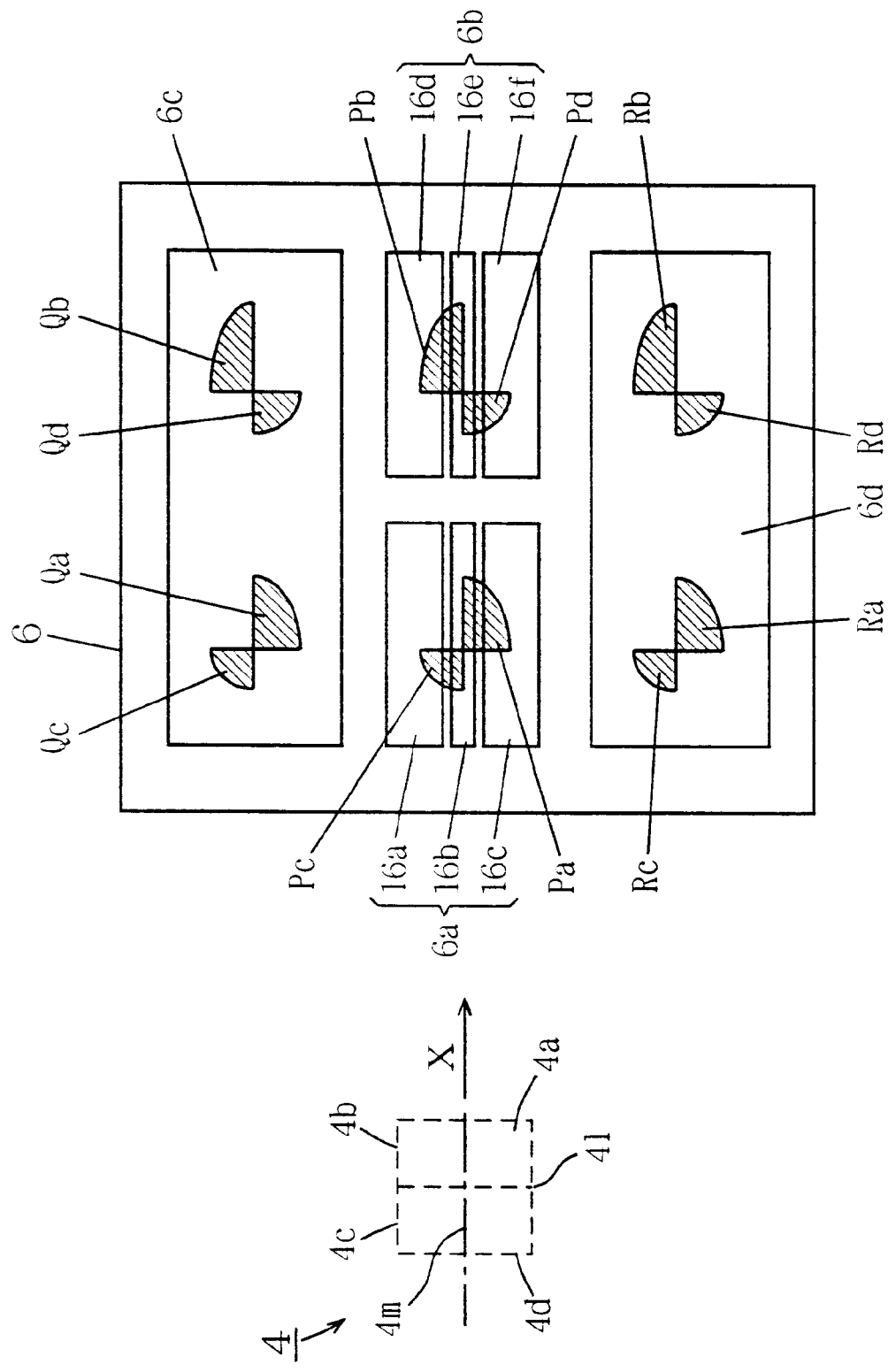
FIG. 5 is a typical plan view showing a condensed state on a photodetector in relation to a main beam focused on the optical disk.

FIG. 5 is a typical plan view showing a condensed state on the photodetector 6 in relation to the main beam M focused on the optical disk 1.

The photodetector 6 comprises a pair of photodetection parts 6a and 6b for focus servo control aligning with each other substantially along the radial direction (direction X) of the optical disk 1, and another pair of photodetection parts 6c and 6d for tracking servo control which are arranged on both sides of the photodetection parts 6a and 6b to be opposed thereto while extending substantially in the radial direction (direction X) of the optical disk 1.

The photodetection part 6a is formed by rectangular photodetection parts 16a, 16b and 16c extending in the direction X substantially in parallel with each other. The narrower photodetection part 16b is arranged between the photodetection parts 16a and 16c having the same width. The photodetection part 6b is formed by rectangular photodetection parts 16d, 16e and 16f extending in the direction X substantially in parallel with each other, similarly to the photodetection part 6a. The narrower photodetection part 16e is arranged between the photodetection parts 16d and 16f having the same width.

The length of the photodetection parts 6c, 6d and 16a to 16f in the direction X is set to be larger than that of movement of a condensed spot formed by the returned beams diffracted by the transmission-type holographic optical element 4 resulting from fluctuation of the lasing wavelength of the semiconductor laser device 2.

According to this embodiment, the photodetection parts 6a and 6b are divided into the photodetection parts 16a to 16c and the photodetection parts 16a to 16f by virtual dividing lines along a direction of movement of the condensed spot, based on the returned beams diffracted by the holographic optical element 4, on the photodetector 6 resulting from fluctuation of the lasing wavelength of the semiconductor laser device 2.

In this optical pickup apparatus 100, the optical system is so set that the center of the main beam M in the returned beams from the optical disk 1 is substantially located on the dividing line 4M for tracking. The main beam M from the optical disk 1 is divisionally diffracted in the regions 4a to 4d of the transmission-type holographic optical element 4. The parts of the main beam M incident on the regions 4a and 4c of the transmission-type holographic optical element 4 are transmitted and diffracted in the 1st order to be received in the photodetection part 6a, and the parts of the main beam M incident on the regions 4b and 4d are transmitted and diffracted in the 1st order to be received by the photodetection part 6b.

The parts of the main beam M diffracted in the regions 4a and 4c in the 1st order are condensed on the photodetection part 6a as condensed spots Pa and Pc respectively, and the parts of the main beam M diffracted in the regions 4b and 4d in the 1st order are condensed on the photodetection part 6b as condensed spots Pb and Pd respectively.

The two subbeams $S_1$ and $S_2$ among the returned beams from the optical disk 1 are also divisionally diffracted in the regions 4a to 4d of the transmission-type holographic optical element 4. The parts of the subbeam $S_1$ diffracted in the regions 4a and 4c in the 1st order are condensed on a side of the photodetection part 6c closer to the photodetection part 6a as condensed spots Qa and Qc respectively, and the parts of the subbeam $S_1$ diffracted in the regions 4b and 4d in the 1st order are condensed on the other side of the photodetection part 6c closer to the photodetection part 6b as condensed spots Qb and Qd respectively. Similarly, parts of the subbeam$_2$ are condensed on the photodetection part 6d as condensed spots Ra, Rb, Rc and Rd in correspondence to the regions 4a to 4d respectively.

Figure 6:
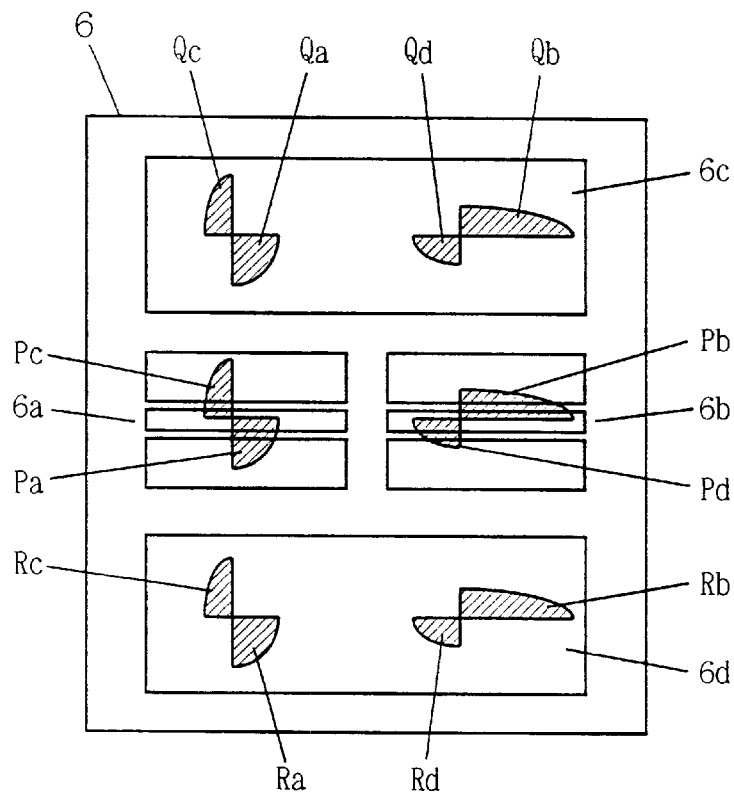
FIG. 6 is a typical plan view showing a condensed state on the photodetector in relation to the optical disk approaching a objective lens and entering a focus error state.

FIG. 6 is a typical plan view showing a condensed state on the photodetector 6 in relation to the optical disk 1 approaching the objective lens 5 and entering a focus error state.

In this case, the condensed spots Pa and Pc formed on the photodetection part 6a extend in the direction (direction Y) perpendicular to the diffractive direction, while the condensed spots Pb and Pd formed on the photodetection part 6b extend in the diffractive direction (direction X).

Figure 7:
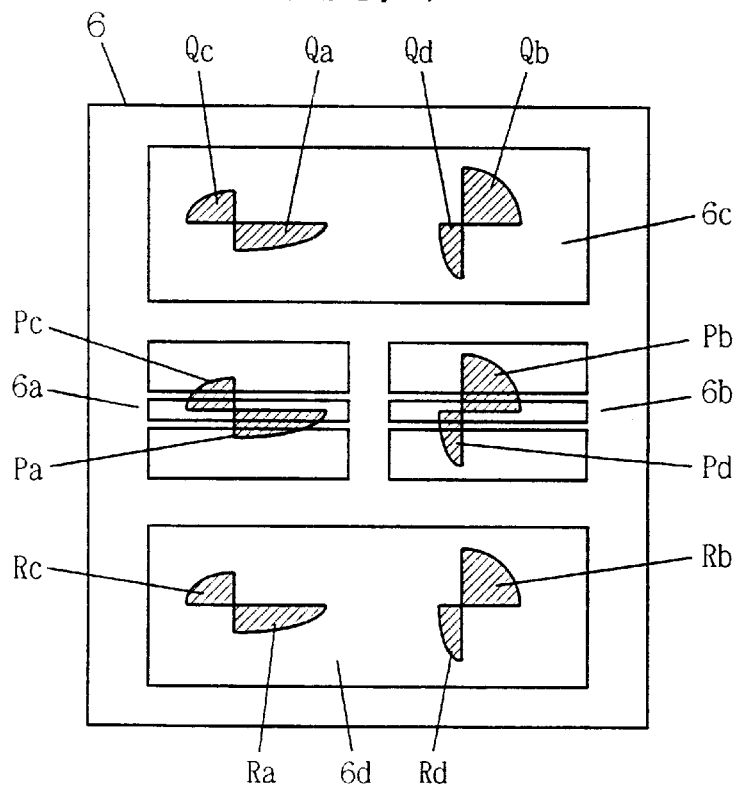
FIG. 7 is a typical plan view showing a condensed state on the photodetector in relation to the optical disk separating from the objective lens and entering a focus error state.

FIG. 7 is a typical plan view showing a condensed state on the photodetector 6 in relation to the optical disk 1 separating from the objective lens 5 and entering a focus error state.

In this case, the condensed spots Pa and Pc formed on the photodetection part 6a extend in the diffractive direction (direction X), while the condensed spots Pb and Pd formed on the photodetection part 6b extend in the direction (direction Y) perpendicular to the diffractive direction.

Thus, a focus error signal FES is obtained on the basis of output signals from the photodetection part 6a for detecting the parts of the main beam M from the regions 4a and 4c on the first diagonal positions of the transmission-type holographic optical element 4 and the photodetection part 6b for detecting the parts of the main beam M from the regions 4b and 4d on the second diagonal positions of the transmission-type holographic optical element 4.

Assuming that Sa to Sf represent the output signals of the photodetection parts 16a to 16f respectively, the focus error signal FES is obtained as follows:

FES=(Sa+Sc+Se)−(Sb+Sd+Sf)

In the focused state shown in FIG. 5, the condensed spots Pb and Pd, separating from the transmission-type holographic optical element 4 with respect to the condensed spots Pa and Pc, extend in the diffractive direction (direction X), while the condensed spots Pa to Pd are equal in light quantity to each other and condensed in the same scale along the direction (direction Y) perpendicular to the diffractive direction. Hence, FES=0.

On the other hand, FES>0 when the optical disk 1 approaches the objective lens 5 and enters a focus error state as shown in FIG. 6, while FES<0 when the optical disk 1 separates from the objective lens 5 and enters a focus error state as shown in FIG. 7.

A reproduction signal RF is obtained as follows:

RF=(Sa+Sb+Sc+Sd+Se+Sf)

With output signals SA and SB from the photodetection arts 6c and 6d, a tracking error signal TES is obtained as follows:

TES=(SA−SB)

In the optical pickup apparatus 100 according to this embodiment, the four-segment holographic surface 40 of the transparent holographic optical element 4 is divided into the regions 4a, 4b, 4c and 4d by the dividing line 4L along the track direction (direction Y) of the optical disk 1 and the dividing line 4M along the radial direction (direction X) of the optical disk 1 after tracking phase adjustment, as hereinabove described.

The photodetection parts 6a and 6b of the photodetector 6 detect the parts of the main beam M from the regions 4a and 4c located on the first diagonal positions among the regions 4a to 4d of the transmission-type holographic optical element 4 divided by the dividing lines 4L and 4M and from the regions 4b and 4d located on the second diagonal positions respectively.

Further, the photodetection parts 6a and 6b of the photodetector 6 are formed by the photodetection parts 16a to 16c and 16d to 16f divided substantially along the radial direction (direction X), while the photodetection parts 16a to 16f as well as the photodetection parts 6c and 6d are in the form of rectangles extending in the radial direction (direction X).

When the objective lens 5 moves along the direction X as shown by arrow U for the tracking operation, therefore, the center of the main beam M moves along the dividing line 4M on the transmission-type holographic optical element 4. The four-segment holographic surface 40 of the transmission-type holographic optical element 4 is orthogonally divided by the dividing line 4M along the direction X and the dividing line 4L perpendicular thereto, whereby the total area of the parts of the main beam M incident on the regions 4a and 4c is substantially equal to that of the parts of the main beam M incident on the regions 4b and 4d in this case. Consequently, the focus error signal FES is prevented from deterioration resulting from the tracking operation of the objective lens 5.

Further, the photodetection parts 6a and 6b of the photodetector 6 are divided by the dividing line substantially along the direction (direction X) of movement of the main beam M diffracted by the transmission-type holographic optical element 4 resulting from fluctuation of the lasing wavelength of the semiconductor laser device 2 and in the form of rectangles having the longitudinal directions substantially parallel to the direction of movement, whereby the focus error signal FES is also prevented from deterioration resulting from wavelength fluctuation.

The photodetection parts 6c and 6d are also in the form of rectangles extending in the direction substantially parallel to the direction (direction X) of movement of the subbeams $S_1$ and $S_2$ diffracted by the transmission-type holographic optical element 4, whereby the tracking error signal TES is prevented from deterioration resulting from wavelength fluctuation.

In addition, the shape of the light spot formed by the main beam M on the transmission-type holographic optical element 4 is symmetrical about the dividing line 4M extending along the radial direction (direction X) of the optical disk 1. Thus, the areas of the parts of the main beam M incident on the two regions 4a and 4c located on the first diagonal positions are equal to those of the parts of the main beam M incident on the remaining two regions 4b and 4d located on the second diagonal positions even if the objective lens 5 moves in the direction X for the tracking operation, whereby deterioration of the focus error signal FES is further suppressed.

In particular, the radial direction (direction X) of the optical disk 1 and the direction of movement of the condensed spot resulting from fluctuation of the lasing wavelength of the semiconductor laser device 2 are substantially parallel to each other. Thus, the photodetection parts 6a and 6b can detect the parts of the main beam M diffracted in the two regions 4a and 4c located on the first diagonal positions and those of the main beam M diffracted in the two regions 4b and 4d located on the second diagonal positions respectively while substantially holding the ratio of the areas of the parts of the main beam M incident on the former to those of the parts of the main beam M incident on the latter. Thus, deterioration of the focus error signal FES is further suppressed.

Figure 8:
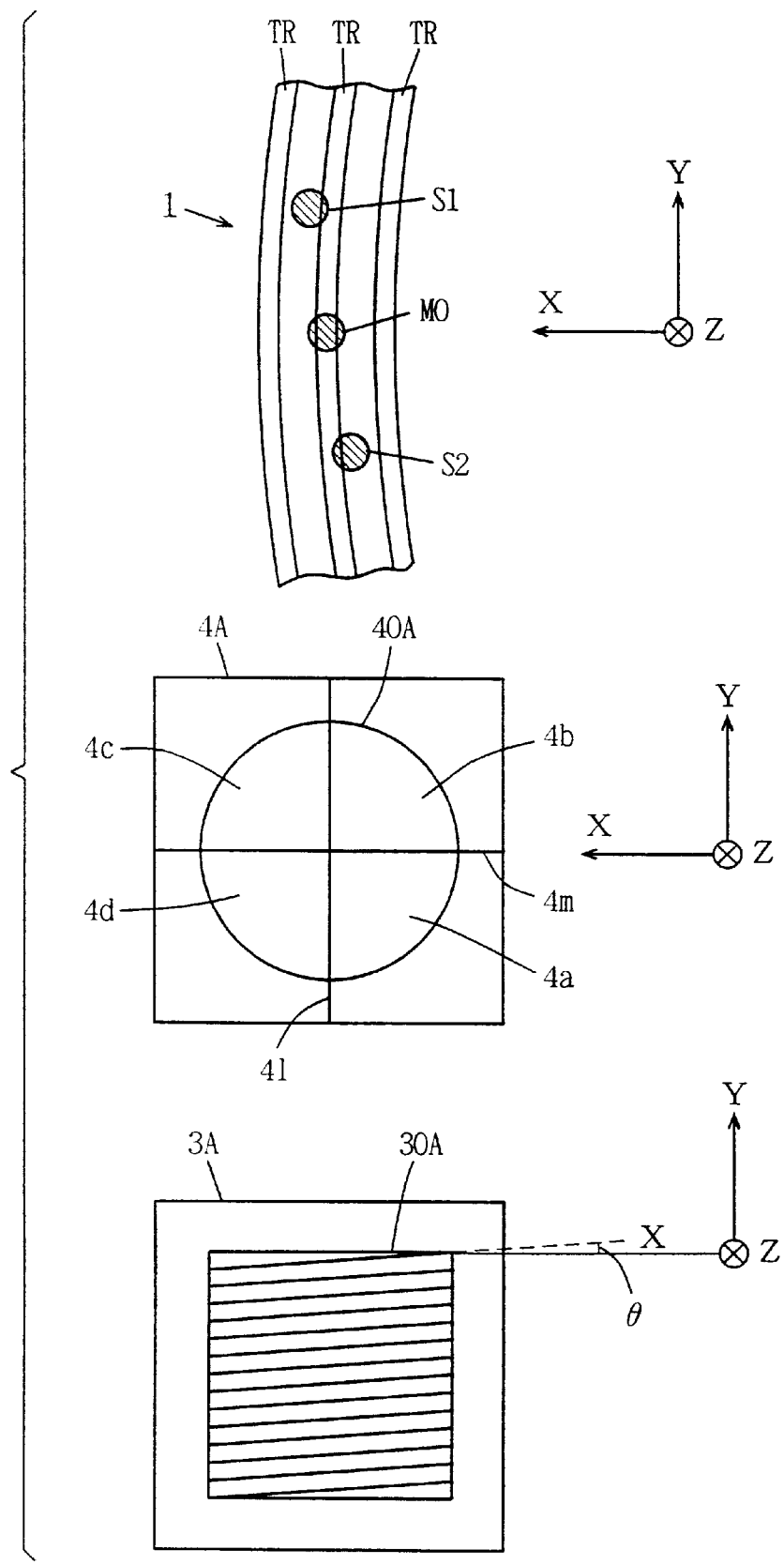
FIG. 8 shows plan views of principal parts of an optical pickup apparatus according to a second embodiment of the present invention.

FIG. 8 illustrates plan views of principal parts of an optical pickup apparatus according to a second embodiment of the present invention. This figure shows states of a track TR of an optical disk 1, a transmission-type holographic optical element 4A and a diffraction grating 3A. The structures of the remaining parts of the optical pickup apparatus according to the second embodiment are identical to those shown in FIG. 1.

In the transmission-type holographic optical element 4A, dividing lines 4l and 4m coincide with the track direction (direction Y) and the radial direction (X) of the optical disk 1 respectively in a state with no tracking phase adjustment, as shown in FIG. 8. On the other hand, the direction of diffraction grooves on a diffraction surface 30A of the diffraction grating 3A is at an angle θ with respect to the direction X. Thus, a main spot M0 is formed on a single path of the track TR and two subspots S1 and S2 are formed on parts located on both sides of the main spot M0 slightly over the track TR. Thus, no tracking phase adjustment may be performed by rotating a projecting/photoreceiving unit 10 (see FIG. 1) about an axis in the direction Z.

When a objective lens 5 moves along the direction X for a tracking operation as shown by arrow U in FIG. 1, therefore, a light spot formed on the transmission-type holographic optical element 4A moves along the dividing line 4m. Thus, the total area of parts of a main beam incident on regions 4a and 4c is substantially equal to that of parts of the main beam incident on regions 4b and 4d.

Figure 9A:
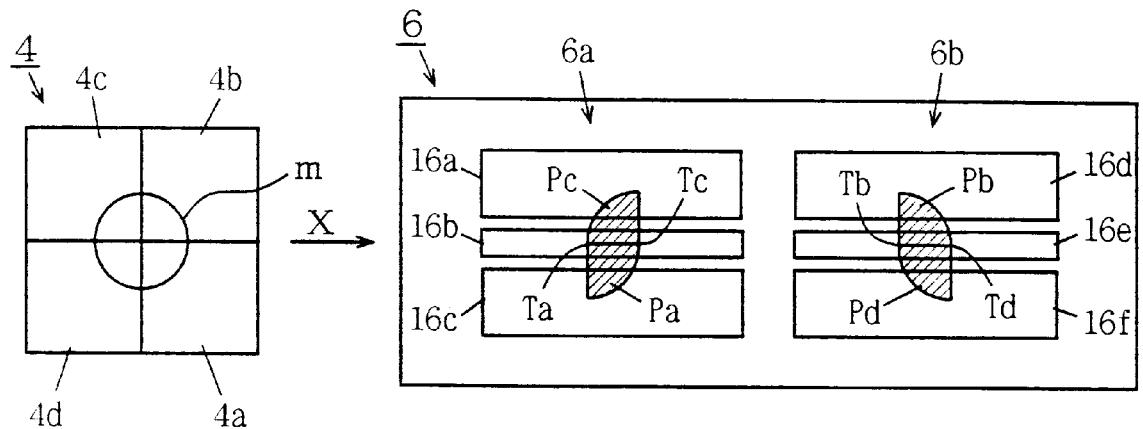
FIGS. 9A, 9B and 9C are typical plan views showing exemplary beam shapes of condensed spots on a photodetector.
Figure 9B:
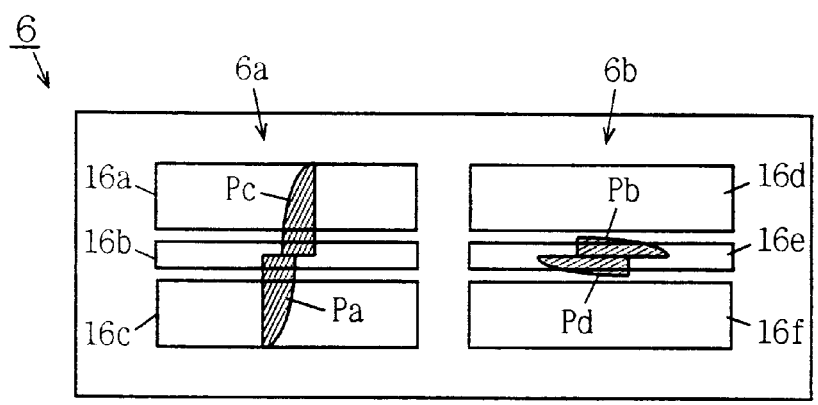
Figure 9C:
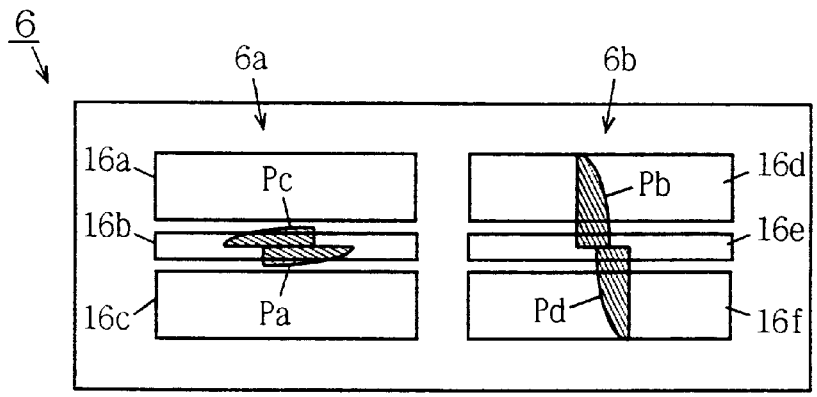

FIGS. 9A, 9B and 9C are typical plan views showing exemplary beam shapes of condensed spots formed on a photodetector 6. A main beam M is focused on an optical disk 1 in FIG. 9A, the optical disk 1 approaches a objective lens 5 and enters a focus error state in FIG. 9B, and the optical disk 1 separates from the objective lens 5 and enters a focus error state in FIG. 9C.

While each of FIGS. 9A, 9B and 9C shows only photodetection parts 6a and 6b of the photodetector 6 and condensed spots based on the main beam M, the shapes of condensed spots based on subbeams $S_1$ and $S_2$ are similar to those of the illustrated ones.

In this case, the photodetector 6 is similar in structure to that according to the first or second embodiment, while holographic surface patterns (diffraction surface patterns) of a transmission-type holographic optical element 4 shown in FIG. 9A are different from those of the transmission-type holographic optical element 4 or 4A shown in FIG. 2 or 8.

Referring to FIG. 9A, parts of the main beam M diffracted in regions 4a and 4c of the transmission-type holographic optical element 4 in the 1st order are condensed on the photodetection part 6a as condensed spots $P_a$ and $P_c$ respectively, while those of the main beam M diffracted in regions 4b and 4d in the 1st order are condensed on the photodetection part 6b as condensed spots $P_b$ and $P_d$ respectively.

In this case, the holographic surface patterns (diffraction surface patterns) of the regions 4a and 4c of the holographic optical element 4 are so designed that the centers Ta and Tc of the quarter-circular condensed spots $P_a$ and $P_c$ deviate to be closer to and farther from the holographic optical element 4 with reference to the center of the photodetection part 6a respectively. Similarly, the holographic surface patterns (diffraction surface patterns) of the regions 4b and 4d of the holographic optical element 4 are so designed that the centers Tb and Td of the quarter-circular condensed spots $P_b$ and $P_d$ deviate to be closer to and farther from the holographic optical element 4 with reference to the center of the photodetection part 6b respectively.

When the optical disk 1 approaches the objective lens 5 and enters a focus error state, the condensed spots $P_a$ and $P_c$ formed on the photodetection part 6a extend in the direction perpendicular to the diffractive direction while the condensed spots $P_b$ and $P_d$ formed on the photodetection part 6b extend in the diffractive direction, as shown in FIG. 9B.

When the optical disk 1 separates from the objective lens 5 and enters a focus error state, the condensed spots $P_a$ and $P_c$ formed on the photodetection part 6a extend in the diffractive direction while the condensed spots $P_b$ and $P_d$ formed on the photodetection part 6b extend in the direction perpendicular to the diffractive direction, as shown in FIG. 9C.

Also in this case, a focus error signal FES, a tracking error signal TES and a reproduction signal RF can be obtained similarly to the first and second embodiments.

Due to the aforementioned design of the holographic surface patterns (diffraction surface patterns) of the holographic optical element 4, the widths of the condensed spots formed on the photodetection parts 6a, 6b, 6c and 6d are reduced. Thus, the areas of the photodetection parts 6a, 6b, 6c and 6d of the photodetector 6 can be reduced in the diffractive direction, thereby miniaturizing the photodetector 6. Consequently, floating capacity on the photodetector 6 is reduced to enable a high-speed operation.

When the areas of the photodetection parts 6a, 6b, 6c and 6d are constant, the condensed spots are movable over wider ranges on the photodetection parts 6a, 6b, 6c and 6d due to the reduction of the widths thereof. Thus, the temperature characteristic of the optical pickup apparatus can be improved for spreading the temperature range applicable to the optical pickup apparatus.

Figure 10:
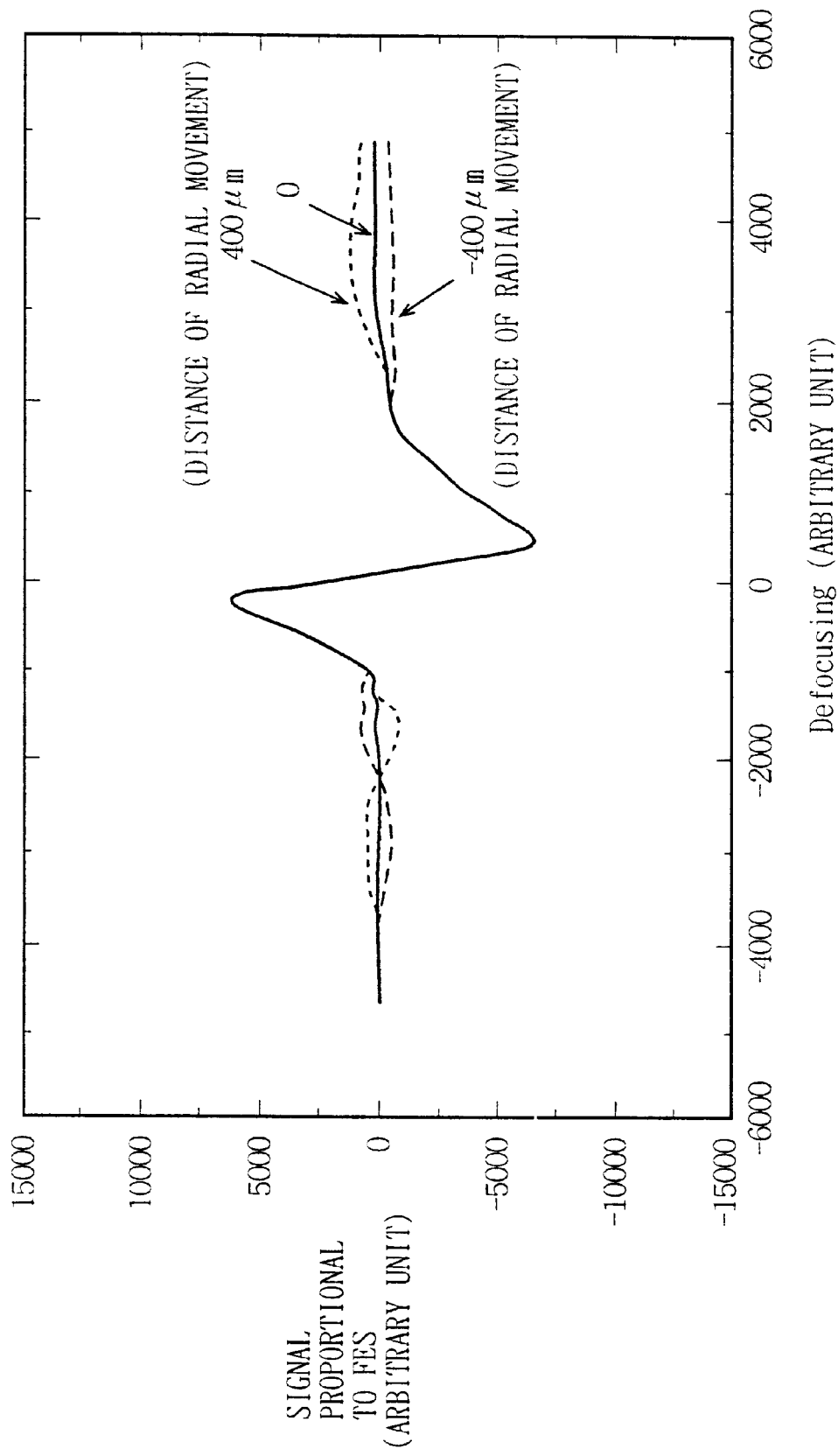
FIG. 10 is an S curve characteristic diagram in relation to a objective lens moving in the optical pickup apparatus according to the first or second embodiment.

Each of the optical pickup apparatuses according to the first and second embodiments of the present invention can obtain an excellent S-curve characteristic even if the objective lens 5 radially moves ±400 μm, as shown in FIG. 10.

While the transmission-type holographic optical element 4 or 4A diffracts the returned beams from the optical disk 1 to supply the same with astigmatism as spatial variation corresponding to the focused state on the optical disk 1 in each of the aforementioned embodiments, the type of the spatial variation corresponding to the focused state is not restricted to this but two regions located on first diagonal positions of a transmission-type holographic optical element and other two regions located on second diagonal positions may supply parts of returned beams from an optical disk 1 with spatial variation of reverse relation (reciprocal relation) in a non-focused state, as in a third embodiment of the present invention described below.

FIG. 11 schematically illustrates an optical pickup apparatus according to the third embodiment of the present invention. This embodiment is similar to the first or second embodiment except that a transmission-type holographic optical element 14 supplies diffracted returned beams with no astigmatism, and hence parts similar to those in the first or second embodiment are denoted by the same reference numerals, to omit redundant description.

As shown in FIG. 12, the transmission-type holographic optical element 14 is divided into four regions 14a, 14b, 14c and 14d of equal areas by a virtual dividing line 14L extending along a direction Y substantially parallel to the track direction (the direction of extension of the track) of an optical disk 1 and a virtual dividing line 14M perpendicular to the dividing line 14L, i.e., extending substantially along the radial direction (direction X) of the optical disk 1. Referring to FIG. 12, symbols m, $s_1$ and $s_2$ denote light spots formed by three beams M, $S_1$ and $S_2$ respectively.

The regions 14a and 14c located on first symmetrical positions (first diagonal positions) about the intersection between the dividing lines 14L and 14M have the same holographic surface patterns (diffraction surface patterns), and the regions 14b and 14d located on second symmetrical positions (second diagonal positions) have the same holographic surface patterns (diffraction surface patterns). The regions 14a and 14c and the regions 14b and 14d supply parts of diffracted beams with spatial variation of reverse relation (reciprocal relation) in a non-focused state.

According to this embodiment, focal positions of the parts of the returned beams diffracted in the two regions 14a and 14c and those of the parts of the returned beams diffracted in the remaining two regions 14b and 14d are located on heights different from each other in focusing.

In a focused state, the focal positions of the parts of the returned beams diffracted in the regions 14a and 14c are in front of respective photodetection parts 6a, 6c and 6d of a photodetector 6 and those of the parts of the returned beams diffracted in the regions 14b and 14d are at the back of the photodetection parts 6b, 6c and 6d of the photodetector 6 as shown in FIG. 11, whereby condensed spots are obtained on the photodetector 6 similarly to those shown in FIG. 5.

Parts of a main beam M diffracted in the regions 14a and 14c in the 1st order are condensed on the photodetection part 6a as condensed spots $P_a$ and $P_c$ respectively, while parts of the main beam M diffracted in the regions 14b and 14d in the 1st order are condensed on the photodetection part 6b as condensed spots $P_b$ and $P_d$ respectively.

Further, parts of a subbeam $S_1$ diffracted in the regions 14a and 14c in the 1st order are condensed on a side of the photodetection part 6c closer to the photodetection part 6a as condensed spots Qa and Qc respectively, and the parts of the subbeam $S_1$ diffracted in the regions 4b and 4d in the 1st order are condensed on the other side of the photodetection part 6c closer to the photodetection part 6b as condensed spots Qb and Qd respectively. Similarly, parts of a subbeam$_2$ are condensed on the photodetection part 6d as condensed spots Ra to Rd in correspondence to the regions 14a to 14d respectively.

When the optical disk 1 approaches a objective lens 5 and enters a focus error state, the condensed spots $P_a$ and $P_c$ formed on the photodetection part 6a become small and the condensed spots $P_b$ and $P_d$ formed on the photodetection part 6b become large as shown in FIG. 13.

When the optical disk 1 separates from the objective lens 5 and enters a focus error state, on the other hand, the condensed spots $P_a$ and $P_c$ formed on the photodetector part 6a become large and the condensed spots $P_b$ and $P_d$ formed on the photodetection part 6b become small, as shown in FIG. 14.

Also in this embodiment, a focus error signal FES is obtained through operation processing of FES=(Sa+Sc+Se)−(Sb+Sd+Sf), similarly to the first embodiment. Further, a reproduction signal RF and a tracking error signal TES are obtained through operation processing of RF=Sa+Sb+Sc+Sd+Se+Sf and TES=SA−SB respectively. The optical pickup apparatus according to this embodiment can attain effects similar to those of the first and second embodiments.

While the photodetection parts 6a and 6b of the photodetector 6 are serially arranged substantially along the radial direction (direction X) of the optical disk 1 in each of the aforementioned first to third embodiments, these photodetection parts 6a and 6b may be arranged substantially along the radial direction (direction X) in parallel with each other, as shown in FIG. 15. In this case, the photodetection parts 6a and 6b are divided into photodetection parts (photoreceiving surfaces) 16a to 16c and 16d to 16f respectively by dividing lines substantially along the track direction (direction Y).

An optical pickup apparatus employing such a photodetector 6 can perform optical axis adjustment so that condensed spots of returned beams are positioned on the photodetection parts 6a and 6b due to rotation of the holographic optical element 4 or 14. Therefore, the optical axis adjustment can be further readily performed as compared with the optical pickup apparatuses employing the photodetectors 6 according to the first and second embodiments.

In this case, the holographic surface patterns of the regions 4a to 4d or 14a to 14d of the holographic optical element 4 or 14 are set to differ from those of the aforementioned embodiments, as a matter of course.

While the radial direction of the optical disk 1 is substantially perpendicular to the direction of movement of the condensed spots resulting from fluctuation of the lasing wavelength of the semiconductor laser device 2 in this case, the photodetection part 6a detects the parts of the returned beams diffracted in the two regions 4a and 4c (14a and 14c) located on the first diagonal positions and the photodetection part 6b detects the parts of the returned beams diffracted in the two regions 4b and 4d (14b and 14d) located on the second diagonal positions while substantially holding the ratio of the areas of the parts of the returned beams incident on the former to those of the parts of the returned beams incident on the latter, whereby deterioration of the focus error signal FES is further suppressed.

While the photodetector 6 is arranged along the dividing lines 4M or 14M and 4L or 14L of the holographic optical element 4 or 14 in each of the aforementioned first to third embodiments, an effect can be attained also in case of arranging the photodetector 6 at an angle with respect to these dividing lines. In this case, however, the focus error signal FES is deteriorated as compared with the aforementioned embodiments.

FIG. 16 is a block diagram showing the structure of an optical recording medium drive 200 employing an optical pickup apparatus 100 according to the first, second or third embodiment of the present invention. The optical recording medium drive 200 shown in FIG. 16 is an optical disk drive for reading information from an optical disk 1.

The optical recording medium drive 200 includes the optical pickup apparatus 100, a motor 11, a feed motor 12, a rotation control system 13, a signal processing system 14, a pickup control system 15, a feed motor control system 16 and a drive controller 17.

The motor 11 rotates the optical disk 1 at a prescribed speed. The rotation control system 13 controls the rotational operation of the motor 11. The feed motor 12 moves the optical pickup apparatus 100 in the radial direction of the optical disk 1. The feed motor control system 16 controls the operation of the feed motor 12. The optical pickup apparatus 100 irradiates the optical disk 1 with a laser beam and receives a returned beam from the optical disk 1. The pickup control system 15 controls the projecting/photoreceiving operation of the optical pickup apparatus 100.

The signal processing system 14 receives an output signal from a photodetector 6 of the optical pickup apparatus 100 and calculates a reproduction signal, a focus error signal and a tracking error signal for supplying the reproduction signal to the drive controller 17 while supplying the focus error signal and the tracking error signal to the pickup control system 15. The drive controller 17 controls the rotation control system 13, the signal processing system 14, the pickup control system 15 and the feed motor control system 16 in accordance with instructions supplied through a drive interface 18, and outputs the reproduction signal through the drive interface 18.

According to this embodiment, the feed motor 11 and the rotation control system 13 correspond to the rotation driving mechanism, the feed motor 12 and the feed motor control system 16 correspond to the pickup driving mechanism, and the signal processing system 14 corresponds to the signal processing circuit.

The optical recording medium drive 200 shown in FIG. 16 employs the optical pickup apparatus 100 according to the first, second or third embodiment of the present invention, whereby a correct focus error signal can be obtained regardless of movement of the objective lens 5 for the tracking operation or wavelength fluctuation of the laser beam. Thus, focus servo control is performed in high accuracy, for obtaining a high-quality reproduction signal.

While each of the first to third embodiments employs the transmission-type holographic optical element 4 or 4A as the first diffraction element, the present invention is also applicable to an optical pickup apparatus employing a reflection type diffraction element as the first diffraction element.

While each of the first to third embodiments employs the transmission-type diffraction grating 3 or 3A as the second diffraction element, the present invention is also applicable to an optical pickup apparatus employing a reflection type diffraction element as the second diffraction element. Further, a reflection member such as a mirror may be interposed between the light source and the optical recording medium for refracting the optical path. In addition, the diffraction grating 3 or 3A and the transmission-type holographic optical element 4 or 4A may be integrated into a single optical element. Further, tracking servo control may be performed by a method other than the aforementioned three-beam method.

While each of the photodetection parts 6a and 6b of the photodetector 6 is divided into three photoreceiving surfaces (photodetection parts) to attain excellent photosensitivity in each of the first to third embodiments, each of these photodetection parts 6a and 6b may be divided into two photoreceiving surfaces.

While each of the first to third embodiments employs the transmission-type holographic optical element 4 or 4A having the four-segment holographic surface 40 or 40A as the first diffraction element, the present invention is also applicable to an optical pickup apparatus employing a diffraction element having a two-segment holographic surface. In this case, the diffraction element is so set that a dividing line for the two-segment holographic surface coincides with the direction of movement of the objective lens 5.

FIG. 17 schematically illustrates an optical pickup apparatus 100 according to a fourth embodiment of the present invention. The optical pickup apparatus 100 shown in FIG. 17 performs focus servo control by the astigmatism method and tracking servo control by the three-beam method.

Referring to FIG. 17, symbols X, Y and Z denote the radial direction of a reflection type optical disk 1 such as a CD (compact disk), the track direction thereof and a direction perpendicular to the disk plane of the optical disk 1 respectively.

The optical pickup apparatus 100 comprises a projecting/photoreceiving unit 10 and a objective lens 5. The projecting/photoreceiving unit 10 is formed by a semiconductor laser device 2, a transmission-type diffraction grating 3, a transmission-type holographic optical element 4 and a photodetector 6.

A block 8 is provided on a base 7, and a heat sink 9 is mounted on a side surface of the block 8. The semiconductor laser device 2 is mounted on a surface end of the heat sink 9. The diffraction grating 3, which is made of optical glass or optical resin, is arranged in a holder 71 through a spacer 72. The transmission-type holographic optical element 4 is arranged in an opening on the upper surface of the holder 71.

The semiconductor laser device 2 emits a laser beam (beam) in the direction Z. The diffraction grating 3 divides the beam emitted from the semiconductor laser device 2 into three beams including a 0th order diffracted beam (main beam), a +1st order diffracted beam (subbeam) and a −1st order diffracted beam (subbeam), and transmits the same through the transmission-type holographic optical element 4. FIG. 17 shows the three beams as a single beam.

The objective lens 5 is supported to be movable in the radial direction (direction X) of the optical disk 1 for tracking servo control, and movable in the vertical direction (direction Z) for focus servo control. This objective lens condenses the main beam and the two subbeams diffracted and transmitted through the transmission-type holographic optical element 4 in the 0th order on the optical disk 1 as a main spot M0 and subspots S1 and S2 positioned on both sides thereof respectively.

The transmission-type holographic optical element 4 has a four-segment holographic surface 40, for dividing each of three returned beams (reflected beams) from the optical disk 1 into four, diffracts the same in a plane substantially including the directions X and Z in the 1st order, and introduces the same into the photodetector 6. At this time, the transmission-type holographic optical element 4 supplies the three returned beams from the optical disk 1 with astigmatism respectively.

According to this embodiment, the optical disk 1 corresponds to the optical recording medium, the semiconductor laser device 2 corresponds to the light source, and the transmission-type holographic optical element 4 corresponds to the diffraction element.

FIG. 18 illustrates plan views of the transmission-type holographic optical element 4 and the photodetector 6 in the optical pickup apparatus 100 shown in FIG. 17.

The four-segment holographic surface 40 of the transmission-type holographic optical element 4 is divided into four regions Ha, Hb, Hc and Hd of equal areas by virtual dividing lines 4L and 4M which are perpendicular to each other. The dividing lines 4L and 4M are at an angle of about 45° with respect to the radial direction (direction X) of the optical disk 1.

Namely, the dividing lines 4L and 4M are at an angle of about 45° with respect to the intersectional line between a plane including the optical axes of the beams incident on the four-segment holographic surface 40 and the diffracted beams and the four-segment holographic surface 40. This transmission-type holographic optical element 4 diffracts the incident beams and forms a condensed spot of the diffracted beams on a virtual plane (the photoreceiving surface of the photodetector 6 in this embodiment).

The structure of the photodetector 6 is similar to that of the photodetector 106 shown in FIG. 28. Namely, the photodetector 6 includes a four-segment photodetection part 60 provided at the center for performing focus servo control with the astigmatism method, and photodetection parts E and F provided on both sides of the four-segment photodetection part 60 for performing tracking servo control with the three-beam method. The four-segment photodetection part 60 is divided into four photodetection parts A, B, C and D of equal areas by perpendicular dividing lines LX and LY. The dividing lines LX and LY are arranged substantially in parallel with the radial direction (direction X) and the track direction (direction Y) of the optical disk 1 respectively.

The holographic patterns of the two regions Hb and Hd located on second diagonal positions of the transmission-type holographic optical element 4 are designed with reference to the central point (intersection between the dividing lines Lx and LY) C0 of the four-segment photodetection part 60 of the photodetector 6. The holographic patterns of the two regions Ha and Hc located on first diagonal positions of the transmission-type holographic element 4 are designed with reference to points C1 and C2 on the dividing line LX of the four-segment photodetection part 60 respectively. The points C1 and C2 are on positions separating from the central point C0 by a prescribed distance. The common origin for preparation of the holographic patterns of the four regions Ha, Hc, Hb and Hd is positioned on the intersection between the dividing lines 4L and 4M (center of the circle).

Parts of a main beam diffracted in the regions Ha and Hc of the four-segment holographic surface 40 are condensed as condensed spots Sa and Sc on positions opposite to each other with reference to the points C1 and C2 on the dividing line LX of the four-segment photodetection part 60 respectively. On the other hand, parts of the main beam diffracted in the regions Hb and Hd of the four-segment holographic surface 40 are condensed as condensed spots Sb and Sd on positions opposite to each other with reference to the central point C0 of the four-segment photodetection part 60 respectively.

Similarly, parts of a first subbeam diffracted in the regions Ha, Hb, Hc and Hd of the four-segment holographic surface 40 are condensed on the photodetection part E as condensed spots Qa, Qb, Qc and Qd respectively, and parts of a second beam diffracted in the regions Ha, Hb, Hc and Hd are condensed on the photodetection part F as condensed spots Ra, Rb, Rc and Rd respectively.

Thus, each condensed spot is divided into four, and the two condensed spots Sa and Sc are arranged along the direction X on positions oppositely deviating from each other. The points C1 and C2 are set on positions separating from the central point C0, for preventing the condensed spots Sa and Sc from passing the dividing line LY due to fluctuation of the lasing wavelength of the semiconductor laser device 2.

FIGS. 19 is typical plan views showing condensed states of the main beam on the four-segment detection part 60. When the optical disk 1 approaches the objective lens 5 and enters a focus error state, the condensed spots Sb and Sd extend from the central point C0 into the photodetection parts B and D respectively, the condensed spot Sa extends from the point C1 on the dividing line LX into the photodetection part B, and the condensed spot Sc extends from the point C2 on the dividing line LX into the photodetection part D as shown in FIG. 19(a).

When the main beam is focused on the optical disk 1 (focused state), the condensed spot Sa becomes a quarter-circle located in the photodetection parts A and B symmetrically about the point C1 on the dividing line LX, the condensed spot Sc becomes a quarter-circle located in the photodetection parts C and D symmetrically about the point C2 on the dividing line LX, the condensed spot Sb becomes a quarter-circle located in the photodetection parts B and C symmetrically about the central point C0, and the condensed spot Sd becomes a quarter-circle located in the photodetection parts A and D symmetrically about the central point C0, as shown in FIG. 19(b).

When the optical disk 1 separates from the objective lens 5 and enters a focus error state, the condensed spots Sb and Sd extend from the central point C0 into the photodetection parts C and A respectively, the condensed spot Sa extends from the point C on the dividing line LX into the photodetection part A, and the condensed spot Sc extends from the point C2 on the dividing line LX into the photodetection part C, as shown in FIG. 19(c).

Thus, the condensed spots Sb and Sd change just similarly to those formed through the conventional holographic surface 140 shown in FIG. 26, the condensed spot Sa changes to virtually move in the photodetection parts A and B, and the condensed spot Sc changes to virtually move between the photodetection parts C and D.

Similarly to the case of employing the four-segment photodetection part 160 shown in FIG. 28, a focus error signal FES is obtained with output signals PA, PB, PC and PD from the photodetection parts A, B, C and D as follows:

FES=(PA+PC)−(PB+PD)

This focus error signal FES becomes negative when the optical disk 1 is too close to the objective lens 5, becomes zero in an excellent focused state, and becomes positive when the optical disk 1 is too far from the objective lens 5.

FIG. 20 is a typical plan view showing movement of the condensed spots Sa, Sb, Sc and Sd on the four-segment photodetection part 60 resulting from fluctuation of the lasing wavelength of the semiconductor laser device 2. In this case, the optical disk 1 is close to the objective lens 5.

When the lasing wavelength of the semiconductor laser device 2 fluctuates, the diffraction angle of the returned beams on the transmission-type holographic optical element 4 changes. Thus, the condensed spots Sa, Sb, Sc and Sd move in the direction X along the dividing line LX on the four-segment photodetection part 60. When the lasing wavelength of the semiconductor laser device 2 increases, for example, the condensed spots Sa, Sb, Sc and Sd move from positions shown by dotted lines to those shown by solid lines.

At this time, the condensed spots Sa and Sc move in the photodetection parts B and D respectively, to exert no influence on the output signals PA and PC. On the other hand, one of the condensed spots Sb and Sd moves over two photodetection parts provided on both sides of the dividing line LY, to exert influence on the output signals PB and PD.

In this case, the influence exerted by the movement of the condensed spots Sa, Sb, Sc and Sd on the focus error signal FES is not more than half that in the case shown in FIG. 31. In particular, the influence exerted by fluctuation of the lasing wavelength of the semiconductor laser device 2 on the focus error signal FES can be further reduced by setting the optical positional relation between a far-field pattern (beam sectional intensity distribution spot) of the laser beam emitted from the semiconductor laser device 2 and the four-segment holographic surface 40 as follows:

FIG. 21 is a top plan view of the semiconductor laser device 2 in the optical pickup apparatus 100 shown in FIG. 17. FIG. 22 illustrates typical plan views showing the relation between a light spot SP formed on the four-segment holographic surface 40 and the condensed spots Sa, Sb, Sc and Sd formed on the four-segment photodetection part 60.

As shown in FIG. 21, the semiconductor laser device 2 mainly includes a clad layer 21, an active layer 22 and another clad layer 23. In general, the angle of divergence of the laser beam emitted from the active layer 22 of the semiconductor laser device 2 in the vertical direction (perpendicular to the active layer 22) is larger than that in the horizontal direction (parallel to the active layer 22). Therefore, a far-field pattern 20 of the laser beam is in the form of an ellipse having major axis which is perpendicular to the active layer 22.

In the optical pickup apparatus 100 according to this embodiment, the semiconductor laser device 2 is so mounted on the side surface of the heat sink 9 that the active layer 22 is perpendicular to the direction Y. Therefore, the far-field pattern 20 of the laser beam is in the form of an ellipse having a major axis parallel to the direction Y and a minor axis parallel to the direction X.

In this case, the light spot SP of the returned beams formed on the four-segment holographic surface 40 is in the form of an ellipse having a major axis extending in the regions Ha and Hc and a minor axis extending in the regions Hb and Hd. Thus, the light quantities of the parts of the returned beams incident on the regions Ha and Hc are larger than those of the parts of the returned beams incident on the regions Hb and Hd.

Therefore, the condensed spots Sa and Sc formed on the four-segment photodetection part 60 are higher in light intensity than the condensed spots Sb and Sd. Consequently, the influence exerted by the condensed spots Sb and Sd on the focus error signal FES is smaller than that exerted by the condensed spots Sa and Sc, to considerably reduce the influence exerted by fluctuation of the lasing wavelength of the semiconductor laser device 2 on the focus error signal FES.

FIG. 23 illustrates change of the S-curve characteristic of the optical pickup apparatus 100 according to this embodiment resulting from fluctuation of the lasing wavelength of the semiconductor laser device 2.

Referring to FIG. 23, the broken line L1 shows the S-curve characteristic in optical adjustment (initial state), and the solid line L2 shows the S-curve characteristic changed by fluctuation of the lasing wavelength. As shown in FIG. 23, reduction of the amplitude of the S-curve characteristic is small upon fluctuation of the lasing wavelength of the semiconductor laser device 2.

Table 1 shows simulation results of amplitudes of S-curve characteristics in relation to the conventional transmission-type holographic optical element 104 and the transmission-type holographic optical element 4 according to this embodiment. In this simulation, the designed value of the lasing wavelength of the laser beam was 785 nm.

TABLE 1

| Wavelength (nm) | Prior Art | Invention | |
|---|---|---|---|
| | | With far-field pattern in optimum direction | With far-field pattern different from optimum direction by 90° |
| 785 (designed value) | 1.0 | 1.0 | 1.0 |
| 790 (+5) | 0.6 | 0.9 | 0.8 |
| 795 (+10) | 0.1 | 0.8 | 0.5 |

Referring to Table 1, the designed value of the amplitudes of the S-curve characteristics in relation to the conventional transmission-type holographic optical element 104 and the transmission-type holographic optical element 4 was set at 1.0, for normalizing the amplitudes at wavelengths 790 nm and 795 nm.

In the transmission-type holographic optical element 4 according to this embodiment, the direction of the far-field pattern 20 of the semiconductor laser device 2 was optimized as shown in FIG. 22 and rendered to differ from the optimized direction by 90°.

When the lasing wavelength of the laser beam deviates from the designed value by 10 nm due to change of the environmental temperature, the amplitude of the S-curve characteristic reduces to ¹/₁₀ in case of employing the conventional transmission-type holographic optical element 104, as understood from Table 1. In case of employing the transmission-type holographic optical element 4 according to this embodiment, on the other hand, the amplitude of the S-curve characteristic reduces to about half when the direction of the far-field pattern of the laser beam is not optimized, and the amplitude of the S-curve characteristic reduces by only 20% when the direction of the far-field pattern of the laser beam is optimized, even if the lasing wavelength fluctuates by 10 nm.

As hereinabove described, the optical pickup apparatus 100 according to this embodiment further attains such an effect that reduction of the amplitude of the S-curve characteristic is small even if the lasing wavelength of the semiconductor laser device 2 fluctuates, in addition to such an effect that an S curve having a large amplitude is obtained with efficient operation characterizing the conventional optical pickup apparatus employing the astigmatism method. Further, the areas of the four photoreceiving surfaces of the four-segment photodetection part can be equalized with each other, whereby an IC for the photodetector can be readily designed.

FIG. 24 is a block diagram showing the structure of an optical recording medium drive 200 employing the optical pickup apparatus 100 according to the fourth embodiment of the present invention. The optical recording medium drive 200 shown in FIG. 24 is an optical disk drive for reading information from an optical disk 1.

The optical recording medium drive 200 shown in FIG. 24 is different from that shown in FIG. 16 in a point that the optical pickup apparatus 100 according to the fourth embodiment is employed in place of the optical pickup apparatus 100 according to the first, second or third embodiment. The structures and operations of the remaining parts of the optical recording medium drive 200 shown in FIG. 24 are similar to those of the optical recording medium drive 200 shown in FIG. 16.

In this embodiment, a motor 11 and a rotation control system 13 correspond to the rotation driving mechanism, a feed motor 12 and a feed motor control system 16 correspond to the pickup driving mechanism, and a signal processing system 14 corresponds to the signal processing circuit.

The optical recording medium drive 200 shown in FIG. 24 can obtain a correct focus error signal even in wavelength fluctuation of a laser beam, due to the employment of the optical pickup apparatus 100 according to the fourth embodiment. Thus, focus servo control is performed in high accuracy, for obtaining a high-quality reproduction signal.

While the fourth embodiment employs the transmission-type holographic optical element 4 as the diffraction element, a reflection type diffraction element such as a reflection type holographic optical element may be employed in place thereof.

While the fourth embodiment employs the transmission-type diffraction grating 3, the present invention can be similarly applied to an optical pickup apparatus employing a reflection type diffraction grating. Further, a reflection member such as a mirror may be interposed between the light source and the optical recording medium or between the holographic optical element and the photodetector for refracting the optical path.

In addition, the diffraction grating 3 and the transmission-type holographic optical element 4 may be integrated into a single optical element. Further, the tracking servo control may be performed by a method other than the aforementioned three-beam method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical pickup apparatus for irradiating an optical recording medium with a beam and detecting a returned beam from said optical recording medium, comprising:
   a light source for emitting said beam;
   a objective lens for irradiating said optical recording medium with said beam emitted from said light source;
   a first diffraction element for diffracting said returned beam supplied from said optical recording medium through said objective lens; and
   a photodetector having first and second photodetection parts for detecting said returned beam being diffracted by said first diffraction element, wherein
   said first diffraction element has four regions being divided by a first dividing line extending substantially along a radial direction of said optical recording medium and a second dividing line perpendicular to said first dividing line,
   said objective lens is provided to be movable substantially along the radial direction of said optical recording medium for a tracking operation,
   said first photodetection part of said photodetector detects parts of said returned beam being diffracted in two of said four regions of said first diffraction element being located on first diagonal positions and said second photodetection part detects parts of said returned beam being diffracted in remaining two of said four regions of said first diffraction element being located on second diagonal positions, each of said first and second photodetection parts having a length not shorter than the distance of movement of a condensed spot of said diffracted returned beam resulting from wavelength fluctuation of said light source.

2. The optical pickup apparatus in accordance with claim 1, wherein
   said two regions on said first diagonal positions of said first diffraction element and said remaining two regions on said second diagonal positions supply said parts of said returned beam with spatial variation corresponding to a focused state for enabling detection of said focused state by comparing said parts of said returned beam being diffracted in said two regions on said first diagonal positions and said parts of said returned beam being diffracted in said remaining two regions on said second diagonal positions with each other.

3. The optical pickup apparatus in accordance with claim 1, wherein
   each of said first and second photodetection parts includes a plurality of photoreceiving regions being divided by a virtual dividing line substantially along the direction of movement of said condensed spot of said diffracted returned beam resulting from wavelength fluctuation of said light source.

4. The optical pickup apparatus in accordance with claim 3, wherein
   said plurality of photoreceiving regions include a first photoreceiving region and two second photoreceiving regions, wider than said first photoreceiving region, being arranged on both sides of said first photoreceiving region.

5. The optical pickup apparatus in accordance with claim 1, wherein
   a light spot formed on said first diffraction element by said returned beam from said optical recording medium has a substantially symmetrical shape about said first dividing line.

6. The optical pickup apparatus in accordance with claim 1, wherein
   the radial direction of said optical recording medium and the direction of movement of said condensed spot resulting from wavelength fluctuation of said light source are substantially parallel to each other.

7. The optical pickup apparatus in accordance with claim 1, wherein
   the radial direction of said optical recording medium and the direction of movement of said condensed spot resulting from wavelength fluctuation of said light source are substantially perpendicular to each other.

8. The optical pickup apparatus in accordance with claim 1, wherein
   said spatial variation is astigmatism.

9. The optical pickup apparatus in accordance with claim 8, wherein
   said two regions on said first diagonal positions of said first diffraction element and said remaining two regions on said second diagonal positions supply said parts of said returned beam being diffracted in said two regions on said first diagonal positions and said remaining two regions on said second diagonal positions with astigmatism being perpendicular to each other respectively.

10. The optical pickup apparatus in accordance with claim 2, wherein
    said two regions on said first diagonal positions of said first diffraction element and said remaining two regions on said second diagonal positions supply said parts of said returned beam with spatial variation so that the focal positions of said parts of said returned beam being diffracted in said two regions on said first diagonal positions and those of said parts of said returned beam being diffracted in said remaining two regions on said second diagonal positions are located on different heights in focusing.

11. The optical pickup apparatus in accordance with claim 10, wherein
    the focal positions of said parts of said returned beam being diffracted in said two regions on said first diagonal positions of said first diffraction element are located in front of a photoreceiving surface of said photodetector and the focal positions of said parts of said returned beam being diffracted in said remaining two regions on said second diagonal positions of said first diffraction element are located at the back of said photoreceiving surface of said photodetector.

12. The optical pickup apparatus in accordance with claim 1, further comprising a second diffraction element being provided in the optical path between said light source and said first diffraction element for dividing said beam emitted from said light source into a main beam and a subbeam for detecting a tracking state, wherein said objective lens irradiates said optical recording medium with said main beam and said subbeam divided by said second diffraction element, said first diffraction element diffracts said main beam and said subbeam supplied from said optical recording medium through said objective lens, said first photodetection part of said photodetector detects parts of said main beam being diffracted in said two regions on said first diagonal positions of said first diffraction element and said second photodetection part detects parts of said main beam being diffracted in said remaining two regions on said second diagonal positions of said first diffraction element, and said photodetector further includes a third photodetection part for detecting parts of said subbeam being diffracted in said two regions on said first diagonal positions of said first diffraction element and parts of said subbeam being diffracted in said remaining two regions on said second diagonal positions of said first diffraction element, said third photodetection part having a length not shorter than the distance of movement of a condensed spot of diffracted said subbeam resulting from wavelength fluctuation of said light source.

13. The optical pickup apparatus in accordance with claim 12, wherein said first dividing line of said first diffraction element is provided to be at a prescribed angle with respect to a plane including the optical axes of said main beam and said subbeam being divided by said second diffraction element.

14. The optical pickup apparatus in accordance with claim 13, wherein said second diffraction element and said first diffraction element are provided to be rotatable about prescribed axes so that the positional relation of said main beam and said subbeam to the track of said optical recording medium enables detection of said tracking state, and said first dividing line of said first diffraction element is formed to be at an angle with respect to said plane including the optical axes of said main beam and said subbeam before adjustment of said positional relation, to be parallel to the direction of movement of said objective lens after adjustment of said positional relation.

15. The optical pickup apparatus in accordance with claim 13, wherein diffraction grooves of said second diffraction element are formed to be at a prescribed angle with respect to a tangential direction of the track of said optical recording medium so that the positional relation of said main beam and said subbeam with respect to said track enables detection of said tracking state.

16. The optical pickup apparatus in accordance with claim 12, wherein said subbeam includes two subbeams positioned on both sides of said main beam, and said third photodetection part of said photodetector includes two third photodetection parts being arranged to hold said first and second photodetection parts therebetween for detecting said two subbeams respectively.

17. The optical pickup apparatus in accordance with claim 1, wherein said two regions on said first diagonal positions of said first diffraction element have diffraction surface patterns for diffracting said parts of said returned beam so that two condensed spots formed on said first photodetection part of said photodetector align with each other substantially along a direction perpendicular to the direction of movement resulting from wavelength fluctuation of said light source, and said remaining two regions on said second diagonal positions of said first diffraction element have diffraction surface patterns for diffracting said parts of said returned beam so that two condensed spots formed on said first photodetection part of said photodetector align with each other substantially along a direction perpendicular to the direction of movement resulting from wavelength fluctuation of said light source.

18. An optical recording medium drive for driving an optical recording medium, comprising:

a rotation driving mechanism for rotating said optical recording medium;

an optical pickup apparatus for irradiating said optical recording medium with a beam;

a pickup driving mechanism for moving said optical pickup apparatus in the radial direction of said optical recording medium; and a signal processing circuit for processing an output signal from said optical pickup apparatus, wherein said optical pickup apparatus comprises:

a light source for emitting said beam, a objective lens for irradiating said optical recording medium with said beam emitted from said light source, a first diffraction element for diffracting a returned beam supplied from said optical recording medium through said objective lens, and a photodetector having first and second photodetection parts for detecting said returned beam being diffracted by said first diffraction element, said first diffraction element has four regions being divided by a first dividing line extending substantially along the radial direction of said optical recording medium and a second dividing line perpendicular to said first dividing line, said objective lens is provided to be movable substantially along the radial direction of said optical recording medium for a tracking operation, and said first photodetection part of said photodetector detects parts of said returned beam being diffracted in two of said four regions of said first diffraction element located on first diagonal positions and said second photodetection part detects parts of said returned beam being diffracted in remaining two of said four regions of said first diffraction element located on second diagonal positions, each of said first and second photodetection parts having a length not shorter than the distance of movement of a condensed spot of said diffracted returned beam resulting from wavelength fluctuation of said light source.

19. An optical pickup apparatus for driving an optical recording medium, comprising:

a rotation driving mechanism for rotating said optical recording medium;

an optical pickup apparatus for irradiating said optical recording medium with a beam;

a pickup driving mechanism for moving said optical pickup apparatus in the radial direction of said optical recording medium; and a signal processing circuit for processing an output signal from said optical pickup apparatus, wherein said optical pickup apparatus comprises:

a light source for emitting said beam, a diffraction element for diffracting a returned beam being based on said beam emitted from said light source, and said photodetector for detecting said returned beam being diffracted by said diffraction element, said diffraction element has four regions being divided by dividing lines being perpendicular to each other, said photodetector has four photodetection parts being divided by a first dividing line substantially parallel to the direction of movement of a condensed spot of said returned beam being diffracted by said diffraction element resulting from wavelength fluctuation of said light source, and parts of said returned beam being diffracted in two said regions of said diffraction element being located on first diagonal positions form condensed spots on adjacent positions of said second dividing line on opposite sides with reference to the intersection between said first and second dividing lines of said photodetector respectively, and parts of said returned beam being diffracted in remaining two said regions of said diffracted element being located on second diagonal positions form condensed spots on separate positions of said first dividing line on opposite sides with reference to the intersection between said first and second dividing lines of said diffraction element respectively.

20. A holographic optical element comprising a diffraction surface for diffracting an incident beam and forming a condensed spot of diffracted said beam on a virtual plane, wherein said diffraction surface is divided into four regions by dividing lines being perpendicular to each other, two of said four regions being located on first diagonal positions have holographic patterns for forming condensed spots on adjacent positions of a second virtual line on opposite sides with reference to the intersection between a first virtual line on said virtual plane and said second virtual line being perpendicular to said first virtual line respectively, remaining two of said four regions being located on second diagonal positions have holographic patterns for forming condensed spots on separate positions on said first virtual line on opposite sides with reference to said intersection between said first and second virtual lines respectively, and said first virtual line is in a plane including the optical axes of said incident beam and said diffracted beam.

21. An optical pickup apparatus for irradiating an optical recording medium with a beam and detecting a returned beam from said optical recording medium, comprising:

a light source for emitting said beam;

an objective lense for irradiating said optical recording medium with said beam emitted from said light source;

a first diffraction element for diffracting said returned beam supplied from said optical recording medium through said objective lens; and a photodetector for detecting said returned beam being diffracted by said first diffraction element, wherein said objective lens is provided to be movable along a radial direction of said optical recording medium for a tracking operation, said first diffraction element has a plurality of regions being divided by a first dividing line parallel to the direction of movement of said objective lens, said first diffraction element has four regions being divided by said first dividing line and a second dividing line perpendicular to said first dividing line, said photodetector has a plurality of photodetection parts for detecting parts of said returned beam being diffracted in respective said regions of said first diffraction element;

said apparatus further comprising a second diffraction element provided in the optical path between said light source and said first diffraction element for dividing said beam emitted from said light source into a main beam and a subbeam for detecting a tracking state, wherein said objective lens irradiates said optical recording medium with said main beam and said subbeam being divided by said second diffraction element, said first diffraction element diffracts said main beam and said subbeam supplied from said optical recording medium through said objective lens, said plurality of photodectection parts of said photodetector detect parts of said main beam being diffracted by said first diffraction element, and said photodetector further includes a photodectection part for detecting said subbeam being diffracted by said first diffraction element.

22. The optical pickup apparatus in accordance with claim 21, wherein said first dividing line of said first diffraction element is provided to be at a prescribed angle with respect to a plane including the optical axes of said main beam and said subbeam being divided by said second diffraction element.

23. The optical pickup apparatus in accordance with claim 22, wherein said second diffraction element and said first diffraction element are provided to be rotatable about prescribed axes so that the positional relation of said main beam and said subbeam to the track of said optical recording medium enables detection of said tracking state, and said first dividing line of said first diffraction element is formed to be at a prescribed angle with respect to a plane including the optical axes of said main beam and said subbeam before adjustment of said positional relation to be parallel to the direction of movement of said objective lens after adjustment of said positional relation.

24. The optical pickup apparatus in accordance with claim 22, wherein diffraction grooves of said second diffraction element are formed to be at a prescribed angle with respect to a tangential direction of the track of said optical recording medium so that the positional relation of said main beam and said subbeam with respect to said track enables detection of said tracking state.

25. An optical recording medium drive for driving an optical recording medium, comprising:

a rotation driving mechanism for rotating said optical recording medium;

an optical pickup apparatus for irradiating said optical recording medium with a beam;

a pickup driving mechanism for moving said optical pickup apparatus in the radial direction of said optical recording medium; and a signal processing circuit for processing an output signal from said optical pickup apparatus, wherein said optical pickup apparatus comprises:

a light source for emitting said beam, a objective lens for irradiating said optical recording medium with said beam emitted from said light source, a first diffraction element for diffracting a returned beam supplied from said optical recording medium through said objective lens, and said photodetector for detecting said returned beam being diffracted by said first diffraction element, said objective lens is provided to be movable along a radial direction of said optical recording medium for a tracking operation, and said first diffraction element has a plurality of regions being divided by a first dividing line parallel to the direction of movement of said objective lens, wherein said photodetector has a plurality of photodetection parts for detecting parts of said returned beam being diffracted in respective said regions of said first diffraction element; and said apparatus further comprising a second diffraction element provided in the optical path between said light source and said first diffraction element for dividing said beam emitted from said light source into a main beam and a subbeam for detecting a tracking state, wherein said objective lens irradiates said optical recording medium with said main beam and said subbeam being divided by said second diffraction element, said first diffraction element diffracts said main beam and said subbeam supplied from said optical recording medium through said objective lens, said plurality of photodectection parts of said photodetector detect parts of said main beam being diffracted by said first diffraction element, and said photodetector further includes a photodectection part for detecting said subbeam being diffracted by said first diffraction element.

26. An optical pickup apparatus for irradiating an optical recording medium with a beam and detecting a returned beam from said optical recording medium, comprising:

a light source for emitting said beam;

a diffraction element for diffracting said returned beam being based on said beam emitted from said light source; and a photodetector for detecting said returned beam being diffracted by said diffraction element, wherein said diffraction element has four regions being divided by dividing lines being perpendicular to each other, said photodetector has four photodetection parts divided by a first dividing line being substantially parallel to the direction of movement of a condensed spot of said returned beam being diffracted by said diffraction element resulting from wavelength fluctuation of said light source and a second dividing line perpendicular to said first dividing line, and parts of said returned beam being diffracted in two said regions of said diffraction element being located on first diagonal positions form condensed spots on adjacent positions of said second dividing line being opposite to each other with reference to the intersection between said fist and second dividing lines of said photodetector respectively and parts of said returned beam being diffracted in remaining two said regions of said diffraction element being located on second diagonal positions form condensed spots on separate positions on said first dividing line on opposite sides with reference to the intersection between said first and second dividing lines of said photodetector.

27. The optical pickup apparatus in accordance with claim 26, wherein said two regions on said first diagonal positions of said diffraction element and said remaining two regions on said second diagonal positions supply respective said parts of said returned beam with spatial variation corresponding to a focused state on said optical recording medium for enabling detection of said focused state by operation of outputs from said four photodetection parts.

28. The optical pickup apparatus in accordance with claim 27, wherein said spatial variation corresponding to said focused state is astigmatism.

29. The optical pickup apparatus in accordance with claim 28, wherein said astigmatism is supplied in a direction of about 45° with respect to said first and second dividing lines of said photodetector.

30. The optical pickup apparatus in accordance with claim 26, wherein said four regions of said diffraction element are formed to share the intersection of said dividing lines of said diffraction element as a common origin, said two regions on said first diagonal positions of said diffraction element have holographic patterns being set with reference to said intersection between said first and second dividing lines of said photodetector, and said remaining two regions on said second diagonal positions of said diffraction element have holographic patterns being set with reference to two points on said first dividing line separating from said intersection between said first and second dividing lines of said photodetector.

31. The optical pickup apparatus in accordance with claim 26, wherein said two regions on said first diagonal positions of said diffraction element are arranged along a direction substantially parallel to the direction of movement of a condensed spot of said returned beam being diffracted by said diffraction element resulting from wavelength fluctuation of said light source, and said remaining two regions on said second diagonal positions of said diffraction element are arranged in a direction substantially perpendicular to the direction of movement of said condensed spot of said returned beam being diffracted by said diffraction element resulting from wavelength fluctuation of said light source.

32. The optical pickup apparatus in accordance with claim 31, wherein said dividing lines of said diffraction element are at an angle of about 45° with respect to said first and second dividing lines of said photodetector.

33. The optical pickup apparatus in accordance with claim 26, wherein said light source emits a beam having an elliptic far-field pattern and said returned beam forms an elliptic light spot on said diffraction element, and the positional relation between said light source and said diffraction element is so set that the minor axis of said elliptic light spot extends in said two regions on said first diagonal positions and the major axis extends in said remaining two regions on said second diagonal positions.

34. A holographic optical element comprising a diffraction surface for diffracting an incident beam and forming a condensed spot of diffracted said beam on a virtual plane, wherein said diffraction surface is divided into four regions by dividing lines being perpendicular to each other, said perpendicular dividing lines are at an angle of about 45° with respect to the intersectional line between a plane including the optical axes of said incident beam and said diffracted beam and said diffraction surface, and said diffraction surface supplies said diffracted beam with astigmatism.

* * * * *